(12) United States Patent
Ueno et al.

(10) Patent No.: US 9,778,739 B2
(45) Date of Patent: Oct. 3, 2017

(54) DISPLAY DEVICE, CONTROL METHOD, AND CONTROL PROGRAM FOR STEREOSCOPICALLY DISPLAYING THREE-DIMENSIONAL OBJECT

(71) Applicant: KYOCERA Corporation, Kyoto-shi, Kyoto (JP)

(72) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/431,636

(22) PCT Filed: Sep. 27, 2013

(86) PCT No.: PCT/JP2013/076371
§ 371 (c)(1),
(2) Date: Mar. 26, 2015

(87) PCT Pub. No.: WO2014/051092
PCT Pub. Date: Apr. 3, 2014

(65) Prior Publication Data
US 2015/0253844 A1    Sep. 10, 2015

(30) Foreign Application Priority Data

Sep. 28, 2012 (JP) .................................. 2012-218160
Sep. 28, 2012 (JP) .................................. 2012-218227

(51) Int. Cl.
*G06F 3/01* (2006.01)
*G02B 27/01* (2006.01)
(Continued)

(52) U.S. Cl.
CPC ............ *G06F 3/011* (2013.01); *G02B 27/017* (2013.01); *G06F 3/01* (2013.01); *G06F 3/012* (2013.01);
(Continued)

(58) Field of Classification Search
None
See application file for complete search history.

(56) References Cited

U.S. PATENT DOCUMENTS

| | | | |
|---|---|---|---|
| 5,848,425 | A | 12/1998 | Lowry et al. |
| 2004/0164957 | A1* | 8/2004 | Yamaguchi ......... G06F 3/04815 345/156 |

(Continued)

FOREIGN PATENT DOCUMENTS

| | | |
|---|---|---|
| CN | 102405485 A | 4/2012 |
| JP | 2011-95547 A | 5/2011 |

OTHER PUBLICATIONS

O'Reilly "Enter Data into Multiple Worksheets Simultaneously" © 2007 O'Reilly Media, Inc downloaded from: http://archive.oreilly.com/pub/h/1209.*

(Continued)

*Primary Examiner* — Saptarshi Mazumder
(74) *Attorney, Agent, or Firm* — Hauptman Ham, LLP

(57) ABSTRACT

According to one of aspects, a display device includes: a display unit configured to three-dimensionally display a planar object for executing processings related to spreadsheet, by displaying images respectively corresponding to both eyes of a user by being worn; a storage unit configured to store a rule in which operation to the object and a processing included in the processings are associated with each other; a detection unit configured to detect the operation; and a control unit configured to determine the process- (Continued)

ing to be executed according to the operation detected by the detection unit, based on the rule.

7 Claims, 67 Drawing Sheets

(51) Int. Cl.
G06Q 10/10 (2012.01)
G06F 3/0346 (2013.01)
H04N 13/00 (2006.01)
H04N 13/02 (2006.01)
H04N 13/04 (2006.01)
G06F 3/0481 (2013.01)
G06T 19/00 (2011.01)
G06F 17/24 (2006.01)

(52) U.S. Cl.
CPC ............ *G06F 3/017* (2013.01); *G06F 3/0346* (2013.01); *G06F 3/04815* (2013.01); *G06F 17/246* (2013.01); *G06Q 10/10* (2013.01); *G06T 19/00* (2013.01); *H04N 13/00* (2013.01); *H04N 13/0271* (2013.01); *H04N 13/044* (2013.01); *G02B 2027/014* (2013.01); *G02B 2027/0134* (2013.01); *G02B 2027/0138* (2013.01); *G02B 2027/0178* (2013.01); *G02B 2027/0187* (2013.01); *G06F 2203/04802* (2013.01)

(56) References Cited

U.S. PATENT DOCUMENTS

| 2010/0325564 | A1 | 12/2010 | Mital et al. |
| 2011/0140994 | A1* | 6/2011 | Noma ............ G02B 27/017 345/8 |
| 2011/0179368 | A1* | 7/2011 | King ............ G06F 3/04815 715/769 |
| 2011/0304692 | A1 | 12/2011 | Ha et al. |
| 2012/0254782 | A1* | 10/2012 | Van Ieperen ....... G06F 3/04883 715/765 |
| 2012/0260152 | A1* | 10/2012 | Shimizu ............ G06F 3/04883 715/217 |

OTHER PUBLICATIONS

International Search Report and Written Opinion dated Jan. 7, 2014 in corresponding International Application No. PCT/JP2013/076371.

Extended European Search Report in EP Application No: 13840943.8 dated May 17, 2016.

Office Action in CN Application No. 201380050351.7 dated Nov. 28, 2016.

* cited by examiner

FIG.9

| TYPE | | FULCRUM | OBSTACLE | SPEED OF PRESSING | CHANGE |
|---|---|---|---|---|---|
| RIGID BODY | | ABSENT | ABSENT | * | MOVED IN DIRECTION OF PRESSING ACCORDING TO AMOUNT OF PRESSING |
| | | | FIXED OBSTACLE | * | MOVED IN DIRECTION OF PRESSING ACCORDING TO AMOUNT OF PRESSING NOT MOVED AFTER COMING IN CONTACT WITH OBSTACLE |
| | | | ANOTHER RIGID BODY | SLOW | MOVED IN DIRECTION OF PRESSING ACCORDING TO AMOUNT OF PRESSING MOVED TOGETHER WITH ANOTHER RIGID BODY AFTER COMING IN CONTACT WITH ANOTHER RIGID BODY |
| | | | | FAST | MOVED IN DIRECTION OF PRESSING ACCORDING TO AMOUNT OF PRESSING MOVED SUCH THAT ANOTHER RIGID BODY IS FLICKED WHEN COMING IN CONTACT WITH ANOTHER RIGID BODY |
| | | | ANOTHER RIGID BODY (CAPABLE OF BEING PASSED THROUGH) | * | MOVED IN DIRECTION OF PRESSING ACCORDING TO AMOUNT OF PRESSING MOVED TO PASS THROUGH ANOTHER RIGID BODY WHEN COMING IN CONTACT WITH ANOTHER RIGID BODY |
| | | PRESENT | ABSENT | * | ROTATED AROUND FULCRUM |

FIG.10

| TYPE | MATERIAL | AMOUNT OF CHANGE | SPEED OF PRESSING | CHANGE |
|---|---|---|---|---|
| ELASTIC BODY | RUBBER BASE | NO LIMITATION | SLOW | DEFORMED IN DIRECTION OF PRESSING ACCORDING TO AMOUNT OF PRESSING RETURNED TO ORIGINAL SHAPE WHEN BEING RELEASED |
| | | | FAST | DEFORMED IN DIRECTION OF PRESSING ACCORDING TO AMOUNT OF PRESSING AFTER THAT, MOVED WHILE RETURNING TO ORIGINAL SHAPE |
| | METAL BASE | LIMITED | * | DEFORMED IN DIRECTION OF PRESSING ACCORDING TO AMOUNT OF PRESSING UP TO DEFORMABLE RANGE AFTER THAT, MOVED WHILE RETURNING TO ORIGINAL SHAPE |
| | | LIMITED | * | WHEN BEING PRESSED IN DEFORMABLE DIRECTION, DEFORMED IN DIRECTION OF PRESSING ACCORDING TO AMOUNT OF PRESSING UP TO DEFORMABLE RANGE WHEN BEING RELEASED, REPEATEDLY RETURNED TO ORIGINAL SHAPE AND DEFORMED (VIBRATE) WHEN BEING PRESSED IN DIRECTION OTHER THAN DEFORMABLE DIRECTION, MOVED SIMILARLY TO RIGID BODY |

| TYPE | SPEED OF PRESSING | CHANGE |
|---|---|---|
| GAS | SLOW | INTERRUPTED BY BODY (HANG AROUND) |
| | MEDIUM | SCATTERED |
| | FAST | CAUSE WHIRL BY TURBULENCE AT REAR SIDE IN MOVING DIRECTION OF BODY |

| TYPE | BONDING OF ELEMENTS | CHANGE |
|---|---|---|
| AG-GREGA-TION | NOT BONDED | ENTIRE SHAPE AS AGGREGATION IS DEFORMED SUCH THAT PRESSED PORTION IS RECESSED |
| | BONDED | ENTIRE SHAPE AS AGGREGATION IS DEFORMED SUCH THAT PRESSED PORTION IS RECESSED ELEMENTS OTHER THAN PRESSED PORTION ARE PULLED BY ELEMENTS IN PRESSED PORTION AND MOVED |
| | NOT BONDED (ATTRACTIVE FORCE OR REPULSIVE FORCE IS WORKING BETWEEN THREE-DIMENSIONAL OBJECT AND BODY) | WHEN ATTRACTIVE FORCE ACTS, ELEMENTS ARE ATTRACTED BY BODY WHEN ENTERING WITHIN PREDETERMINED DISTANCE TO BODY WITHOUT BEING IN CONTACT WITH BODY WHEN REPULSIVE FORCE ACTS, ELEMENTS ARE MOVED AWAY FROM BODY WHEN ENTERING WITHIN PREDETERMINED DISTANCE TO BODY WITHOUT BEING IN CONTACT WITH BODY |

24c

FIG.28
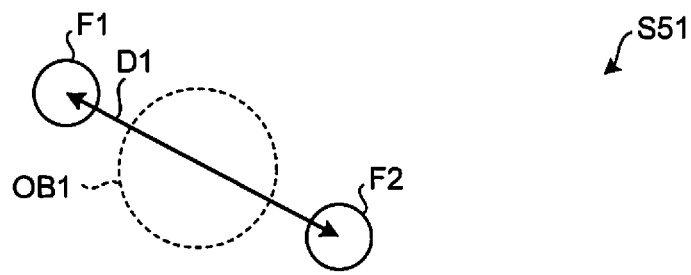
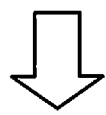
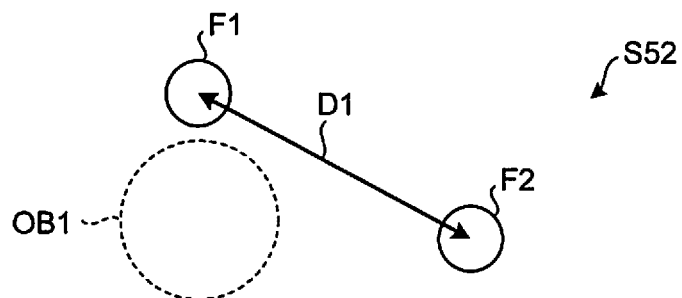
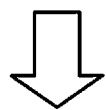
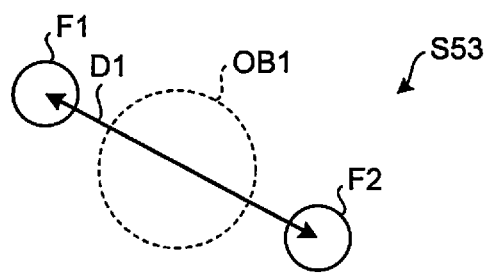

FIG.30
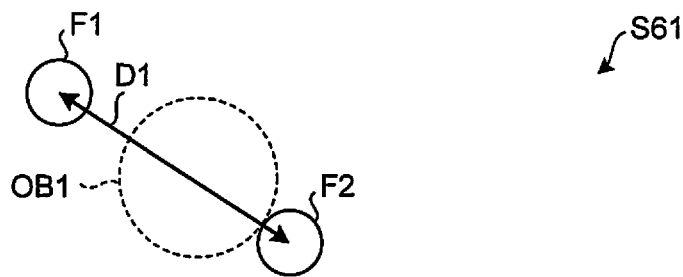
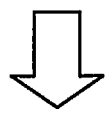
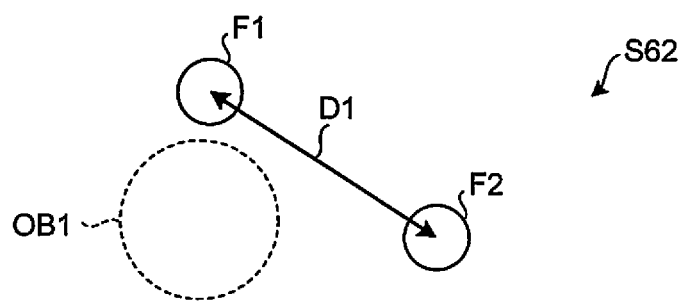
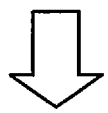
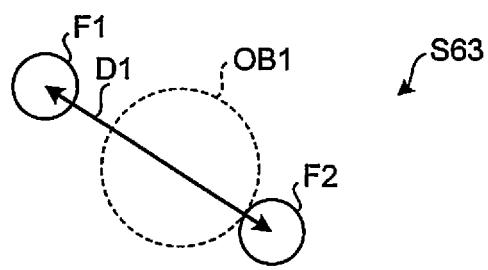

FIG.31
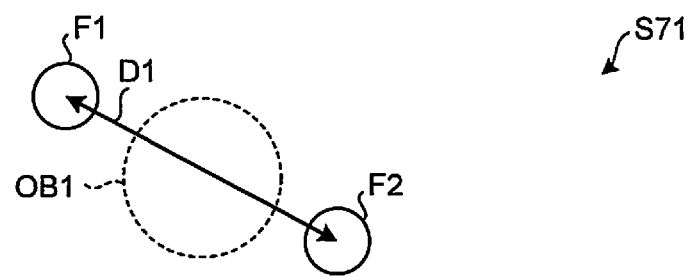
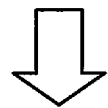
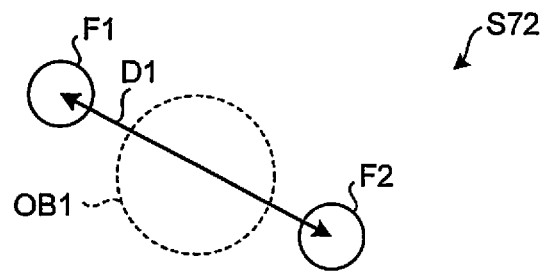
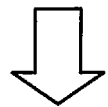
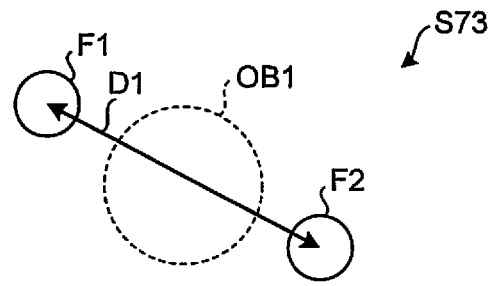

FIG.32
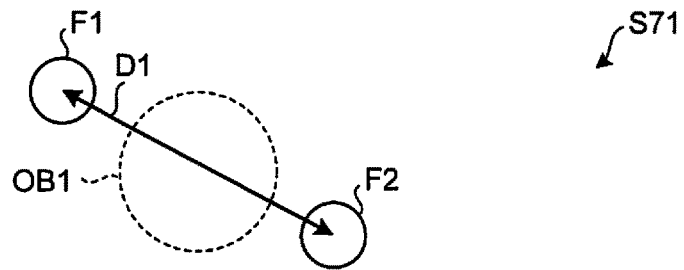
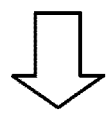
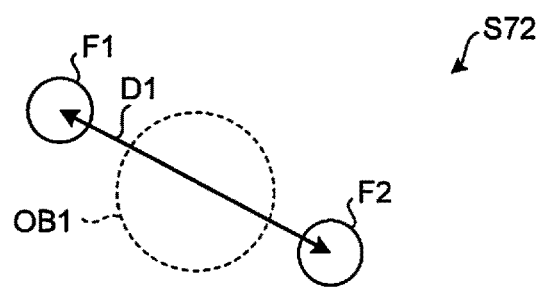
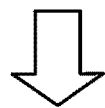
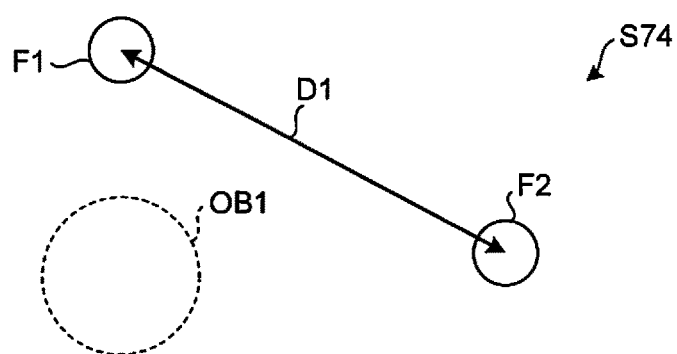

FIG.35
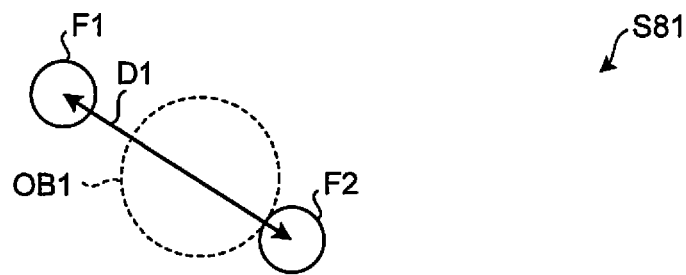
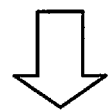
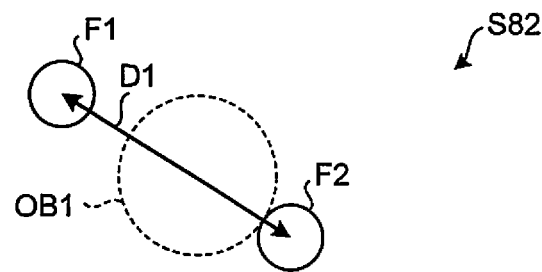
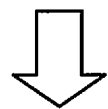
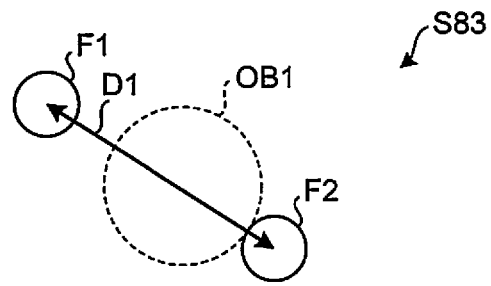

FIG.39

| No | DETECTED OPERATION | PROCESSING |
|---|---|---|
| 1 | MOVE FINGER IN Z-AXIS DIRECTION | SWITCH WORKSHEET CORRESPONDING TO POSITION OF FINGER TO BE IN PROCESSING EFFECTIVE STATE |
| 2 | PUSH WORKSHEET WITH PALM OF HAND | DELETE DATA OF CORRESPONDING WORKSHEET |
| 3 | HOLD CELL AND MOVE CELL IN Z-AXIS DIRECTION | OVERWRITE CORRESPONDING CELL OF ANOTHER WORKSHEET WITH DATA OF HELD CELL |
| 4 | MOVE TWO HELD CELLS IN X-AXIS DIRECTION AND CAUSE TWO CELLS TO COLLIDE WITH EACH OTHER | MULTIPLY NUMERICAL DATA OF CELLS |
| 5 | MOVE TWO HELD CELLS IN Y-AXIS DIRECTION AND CAUSE TWO CELLS TO COLLIDE WITH EACH OTHER | DIVIDE NUMERICAL DATA OF CELL IN Y-AXIS DIRECTION (+) BY NUMERICAL DATA OF CELL IN Y-AXIS DIRECTION (-) |
| 6 | LAY PIECE OF WORKSHEET CUT OFF FROM FIRST WORKSHEET OVER SECOND WORKSHEET | DELETE DATA OF CELLS CORRESPONDING TO CUT-OFF PIECE IN FIRST WORKSHEET AND UPDATE DATA OF CELLS OF SECOND WORKSHEET OVER WHICH CUT-OFF PIECE IS LAID |
| 7 | MOVE TWO FINGERS FROM STATE WHERE TWO FINGERS ARE SEPARATED AND CAUSE TWO FINGERS TO COME IN CONTACT WITH EACH OTHER | DELETE INFORMATION OF CELLS SURROUNDED BY TWO FINGERS BEFORE MOVEMENT |
| 8 | MOVE TWO FINGERS WHILE KEEPING STATE WHERE TWO FINGERS ARE SEPARATED | COPY INFORMATION OF CELLS SURROUNDED BY TWO FINGERS BEFORE MOVEMENT TO CELLS SURROUNDED BY TWO FINGERS AFTER MOVEMENT |
| 9 | HOLD CELL AND MOVE CELL IN X-AXIS DIRECTION PROCESSING | CHANGE WORKSHEET IN BACK OF HELD WORKSHEET TO BE IN VISIBLE STATE |
| ⋮ | ⋮ | ⋮ |

FIG.57
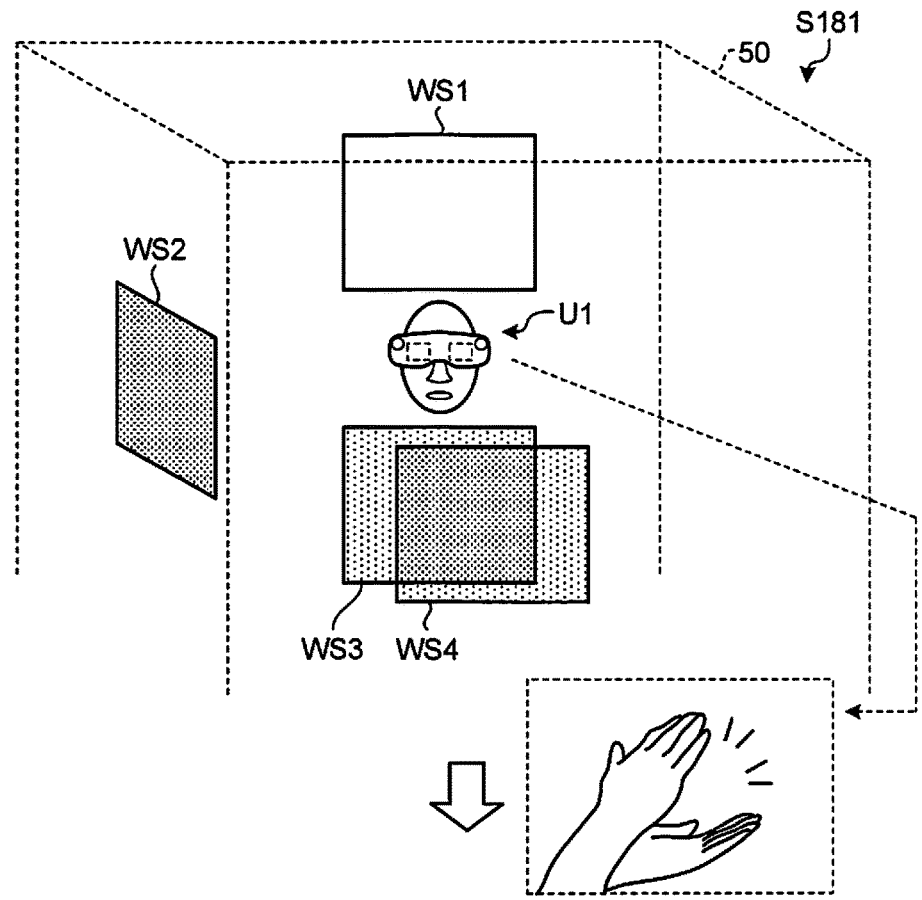
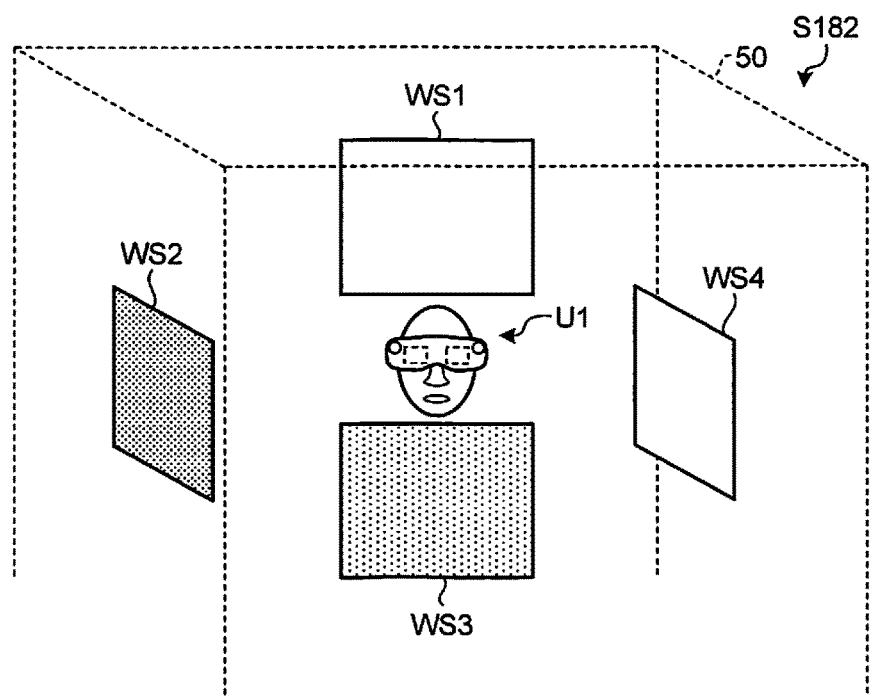

FIG.61

| No | DETECTED OPERATION | PROCESSING |
|---|---|---|
| 1 | MOVE ONE FACE OF CUBE IN Z-AXIS DIRECTION (+) | UPDATE CALCULATION RESULT WHEN CALCULATION IS DEFINED IN PORTION WHERE FACES THAT CONFIGURE CUBE ARE IN CONTACT WITH EACH OTHER WITH RIGHT ANGLE (PORTION WHERE CELLS OF DIFFERENT WORKSHEETS ARE ADJACENT TO EACH OTHER) |
| 2 | ROTATE COLUMN OR ROW OF CUBE | UPDATE CALCULATION RESULT AND GRAPH WHEN THERE IS CALCULATION AND GRAPH THAT REFER TO COLUMN OR ROW TO BE ROTATED |
| 3 | CUT CUBE WITH HAND | UPDATE CONFIGURATION INFORMATION OF WORKSHEETS ACCORDING TO DIVISION OF CUBE |
| 4 | MOVE TWO CELLS IN X-AXIS DIRECTION AND CAUSE TWO CELLS TO COLLIDE WITH EACH OTHER | MULTIPLY NUMERICAL DATA OF CELLS |
| 5 | MOVE TWO CELLS IN Y-AXIS DIRECTION AND CAUSE TWO CELLS TO COLLIDE WITH EACH OTHER | DIVIDE DATA OF CELL AT Y-AXIS DIRECTION (+) SIDE BY DATA OF CELL AT Y-AXIS DIRECTION (-) SIDE |
| 6 | SQUASH CUBE IN Y-AXIS DIRECTION (-) | DELETE DATA OF WORKSHEET ACCORDING TO MOVING AMOUNT IN Y-AXIS DIRECTION (-) |
| 7 | PUSH SPECIFIC CELL IN CUBE | DELETE DATA OF CELLS OF PUSHED SPECIFIC COLUMN OR ROW |
| 8 | CAUSE CELL SEPARATED FROM FIRST WORKSHEET TO COLLIDE WITH SECOND WORKSHEET | UPDATE CONFIGURATION INFORMATION OF WORKSHEET FROM WHICH CELL IS SEPARATED AND CONFIGURATION INFORMATION OF WORKSHEET WITH WHICH CELL HAS COLLIDED |
| ... | ... | ... |

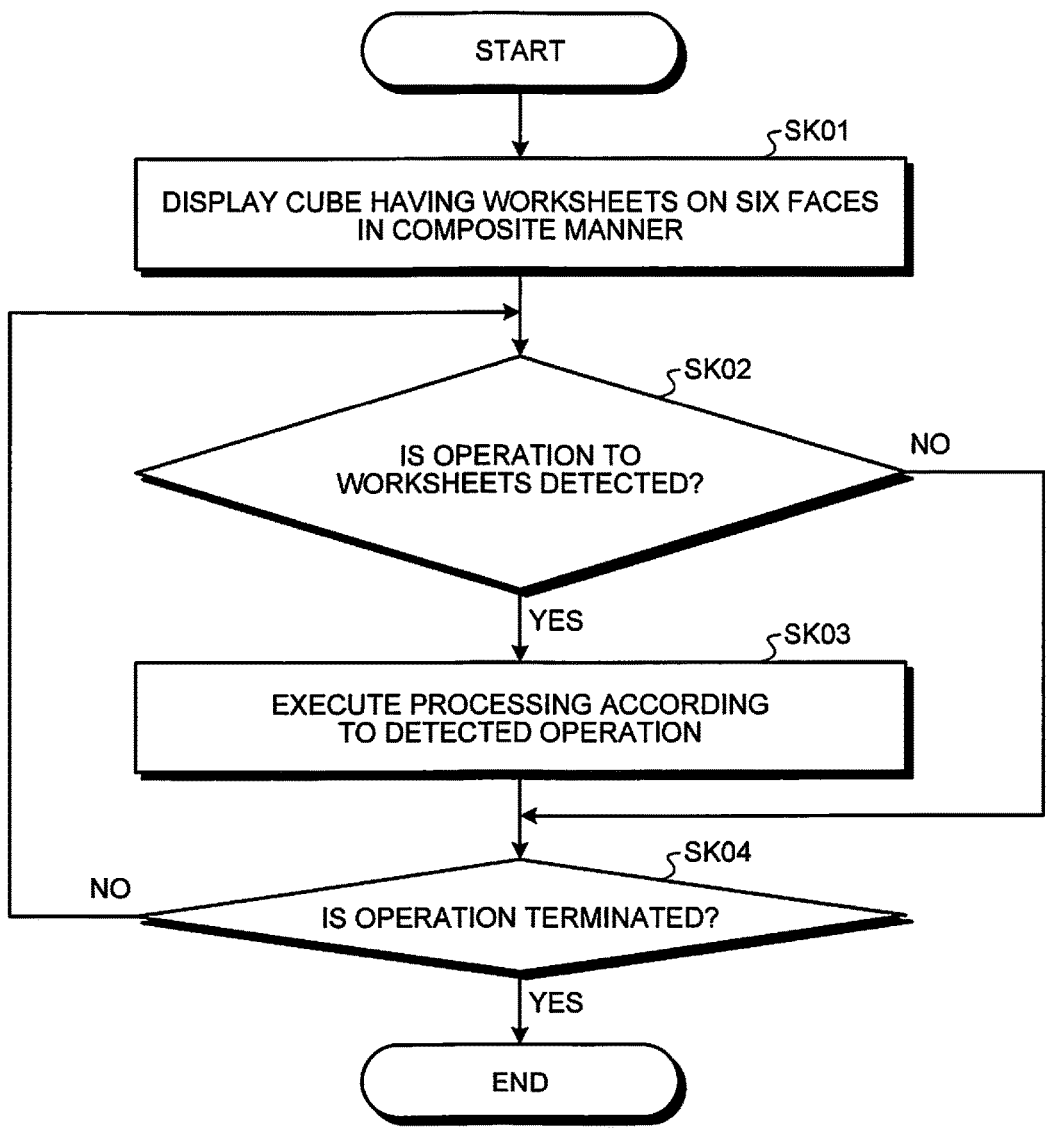

DISPLAY DEVICE, CONTROL METHOD, AND CONTROL PROGRAM FOR STEREOSCOPICALLY DISPLAYING THREE-DIMENSIONAL OBJECT

CROSS-REFERENCE TO RELATED APPLICATION

This application is a National Stage of PCT international application Ser. No. PCT/JP2013/076371 filed on Sep. 27, 2013 which designates the United States, incorporated herein by reference, and which is based upon and claims the benefit of priority from Japanese Patent Applications No. 2012-218160, and No. 2012-218227 filed on Sep. 28, 2012, the entire contents of which are incorporated herein by reference.

FIELD

The present application relates to a display device, a control method, and a control program.

BACKGROUND

Among display devices that include a display unit, there are ones that can stereoscopically display images and the like (for example, see Patent Literature 1). The stereoscopic display is realized using binocular parallax.

CITATION LIST

Patent Literature

Patent Literature 1: JP 2011-95547 A

Technical Problem

Although the stereoscopic display is a display format that is friendly to users, the stereoscopic display is used only for the purpose of viewing and is not used for improving convenience of operations in the conventional display devices. For the foregoing reasons, there is a need for a display device, a control method, and a control program, which can provide the users with a highly convenient operation method.

SUMMARY

According to one of aspects, a display device includes: a display unit configured to three-dimensionally display a planar object for executing processings related to spreadsheet, by displaying images respectively corresponding to both eyes of a user by being worn; a storage unit configured to store a rule in which operation to the object and a processing included in the processings are associated with each other; a detection unit configured to detect the operation; and a control unit configured to determine the processing to be executed according to the operation detected by the detection unit, based on the rule.

According to one of aspects, a control method is executed by a display device that three-dimensionally displays an object for executing processings related to spreadsheet, by displaying images respectively corresponding to both eyes of a user by being worn. The method comprising: three-dimensionally displaying the planar object in the display device; detecting operation to the object; and referring to a storage unit that stores a rule in which the operation and a processing included in the processings are associated with each other to determine the processing to be executed according to the detected operation.

According to one of aspects, a control program causes a display device that three-dimensionally displays an object for executing processings related to spreadsheet, by displaying images respectively corresponding to both eyes of a user by being worn, to execute: three-dimensionally displaying the planar object in the display device; detecting operation to the object; and referring to a storage unit that stores a rule in which the operation and a processing included in the processings are associated with each other to determine the processing to be executed according to the detected operation.

BRIEF DESCRIPTION OF DRAWINGS

FIG. 9 is a diagram illustrating one of examples of information stored in acting data.

FIG. 10 is a diagram illustrating one of examples of the information stored in the acting data.

FIG. 13 is a diagram illustrating one of examples of the information stored in the acting data.

FIG. 14 is a diagram illustrating one of examples of the information stored in the acting data.

FIG. 28 is a diagram for describing a second example of detection of operation performed by holding a three-dimensional object.

FIG. 30 is a diagram for describing a modification of the second example of detection of operation performed by holding a three-dimensional object.

FIG. 31 is a diagram for describing a third example of detection of operation performed by holding a three-dimensional object.

FIG. 32 is a diagram for describing the third example of detection of operation performed by holding a three-dimensional object.

FIG. 35 is a diagram for describing a modification of the third example of detection of operation performed by holding a three-dimensional object.

FIG. 39 is a diagram illustrating one of examples of processing determination rules in which operation detected with respect to the worksheet and a processing included in the processings related to spreadsheet are associated with each other in advance.

FIG. 57 is a diagram illustrating one of rearrangement examples of display positions of the worksheets.

FIG. 61 is a diagram illustrating one of examples of processing determination rules in which operation detected with respect to a cube or a worksheet, and a processing included in processings related to spreadsheet are associated with each other in advance.

FIG. 75 is a flowchart illustrating a processing procedure according to the third embodiment.

DESCRIPTION OF EMBODIMENTS

Hereinafter, embodiments will be described in details with reference to the drawings. The present invention is not limited by the description below. Configuration elements in the description below include things which can be easily conceived by a person skilled in the art, which are substantially the same, and which are so-called equivalents.

Embodiment 1

Figure 1:
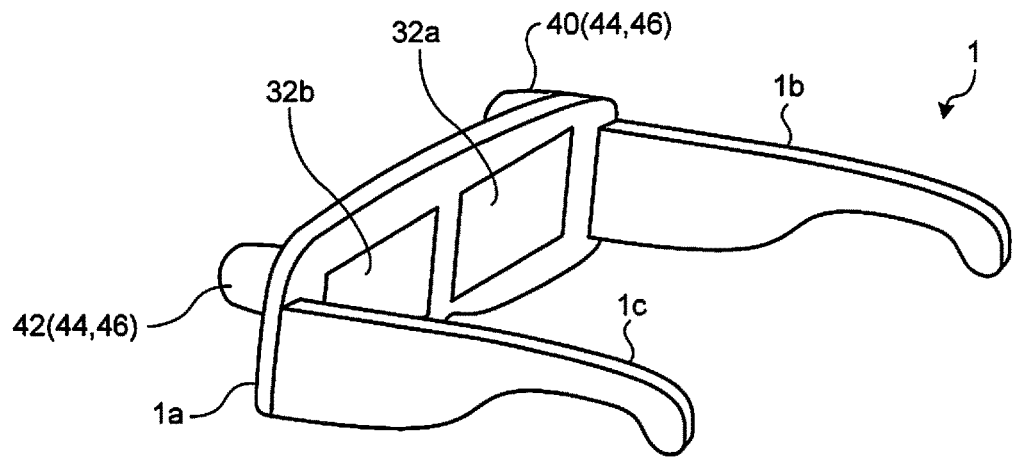
FIG. 1 is a perspective view of a display device according to a first embodiment.
Figure 2:
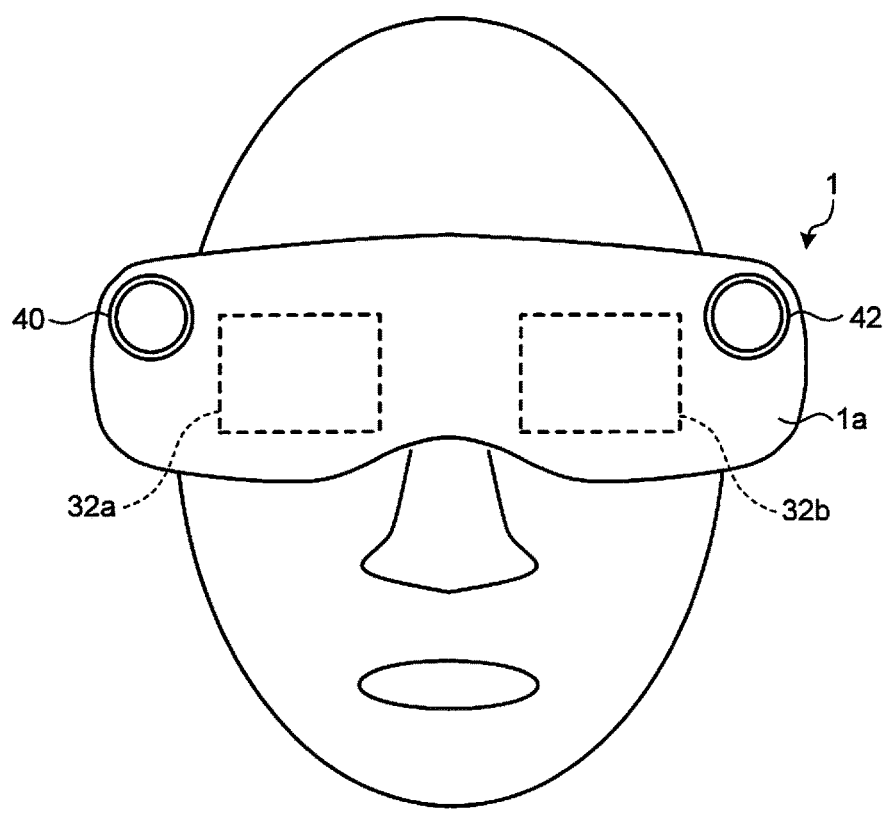
FIG. 2 is a diagram of the display device worn by a user as viewed from the front.

First of all, an overall configuration of a display device 1 according to a first embodiment will be described with reference to FIGS. 1 and 2. FIG. 1 is a perspective view of the display device 1. FIG. 2 is a diagram of the display device 1 worn by a user as viewed from the front. As illustrated in FIGS. 1 and 2, the display device 1 is a head mount-type device that is worn on the head of the user.

The display device 1 includes a front portion 1a, a side portion 1b, and a side portion 1c. The front portion 1a is arranged in front of the user to cover both eyes of the user when being worn by the user. The side portion 1b is connected to one end portion of the front portion 1a, and the side portion 1c is connected to the other end portion of the front portion 1a. The side portion 1b and the side portion 1c are supported by ears of the user like temples of eyeglasses when being worn, and stabilize the display device 1. The side portion 1b and the side portion 1c may be configured to be connected at the rear of the head of the user when being worn.

The front portion 1a includes a display unit 32a and a display unit 32b on a side facing the eyes of the user when being worn. The display unit 32a is arranged at a position facing a right eye of the user when being worn, and the display unit 32b is arranged at a position facing a left eye of the user when being worn. The display unit 32a displays an image for the right eye, and the display unit 32b displays an image for the left eye. As described above, the display device 1 can realize three-dimensional display using binocular parallax by including the display units 32a and 32b that display the images corresponding to the respective eyes of the user when being worn.

The display units 32a and 32b may be configured from one display device as long as the device can independently provide different images for the right eye and the left eye of the user. For example, the one display device may be configured to independently provide the different images for the right eye and the left eye by quickly switching a shutter that shields one eye so that only the other eye can see a displayed image. The front portion 1a may be configured to cover the eyes of the user so that light from outside does not enter the eyes of the user when being worn.

The front portion 1a includes an imaging unit 40 and an imaging unit 42 on a face opposite to the face where the display unit 32a and the display unit 32b are provided. The imaging unit 40 is arranged near one end portion (a right eye side when being worn) of the front portion 1a, and the imaging unit 42 is arranged near the other end portion (a left eye side when being worn) of the front portion 1a. The imaging unit 40 acquires an image in a range corresponding to a field of view of the right eye of the user. The imaging unit 42 acquires an image in a range corresponding to a field of view of the left eye of the user. The field of view referred to here is, for example, a field of view of when the user sees the front.

The display device 1 displays an image captured by the imaging unit 40 in the display unit 32a as an image for the right eye, and displays an image captured by the imaging unit 42 in the display unit 32b as an image for the left eye. Therefore, the display device 1 can provide the user who wears the display device 1 with a scene similar to a scene that is viewed by the user who does not wear the display device 1, even if the field of view is shielded by the front portion 1a.

The display device 1 has a function to three-dimensionally display virtual information, and to enable the user to operate the virtual information, in addition to the function to provide the user with a real scene as described above. According to the display device 1, the virtual information is superimposed on the real scene and displayed as if actually existed. The user can operate the virtual information as if the user actually touched the virtual information using a hand, for example, and apply change such as movement, rotation, deformation, or the like to the virtual information. As described above, the display device 1 provides an intuitive and highly convenient operation method in regard to the virtual information. In the description below, the virtual information that is three-dimensionally displayed by the display device 1 may be called "three-dimensional object".

The display device 1 provides the user with a wide field of view similar to a case where the user does not wear the display device 1. Further, the display device 1 can arrange a three-dimensional object with an arbitrary size in an arbitrary position in the wide field of view. As described above, the display device 1 can display three-dimensional objects having various sizes in various positions in a wide space without limitation due to size of the display device.

Figure 3:
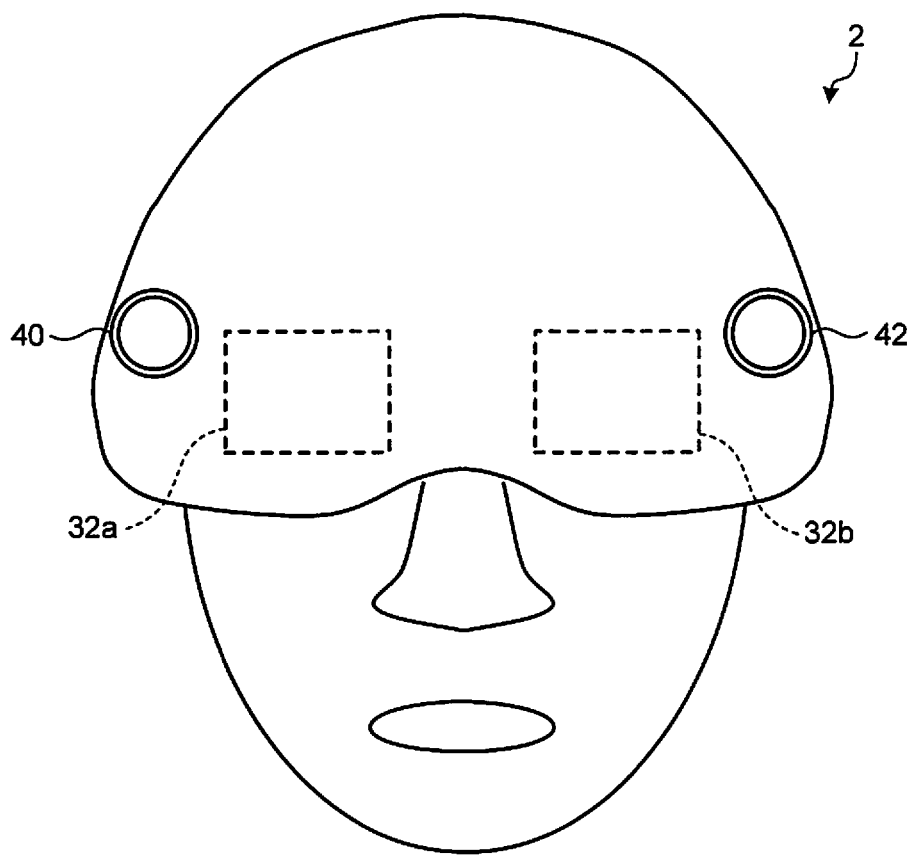
FIG. 3 is a diagram illustrating a modification of the display device.
Figure 4:
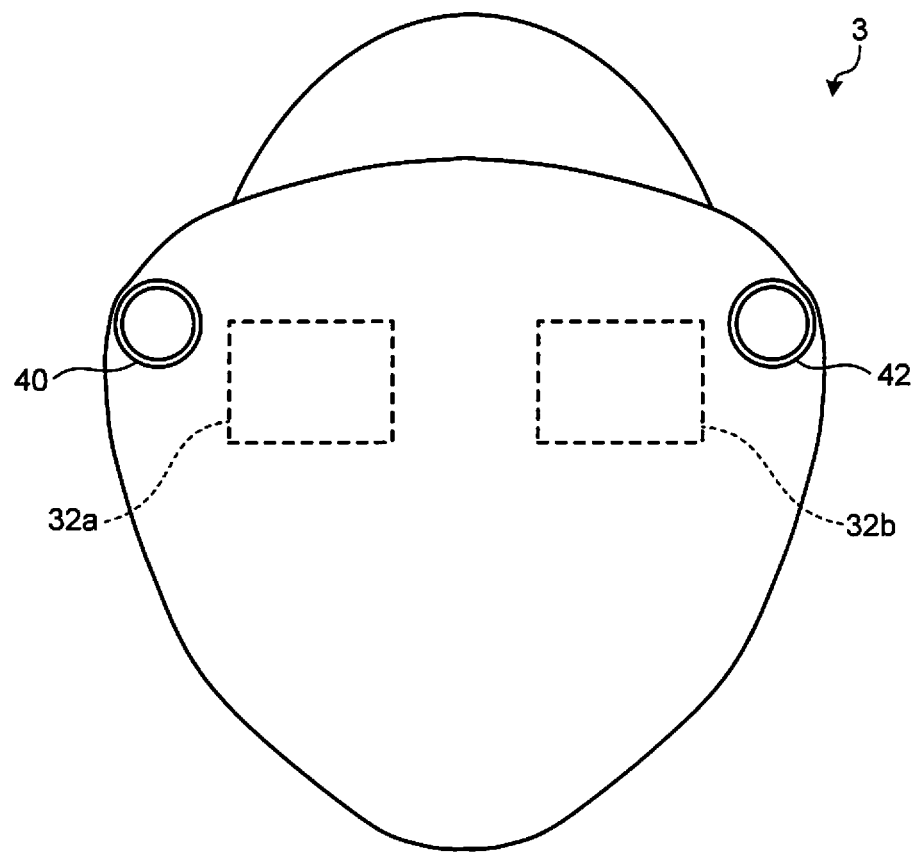
FIG. 4 is a diagram illustrating another modification of the display device.
Figure 5:
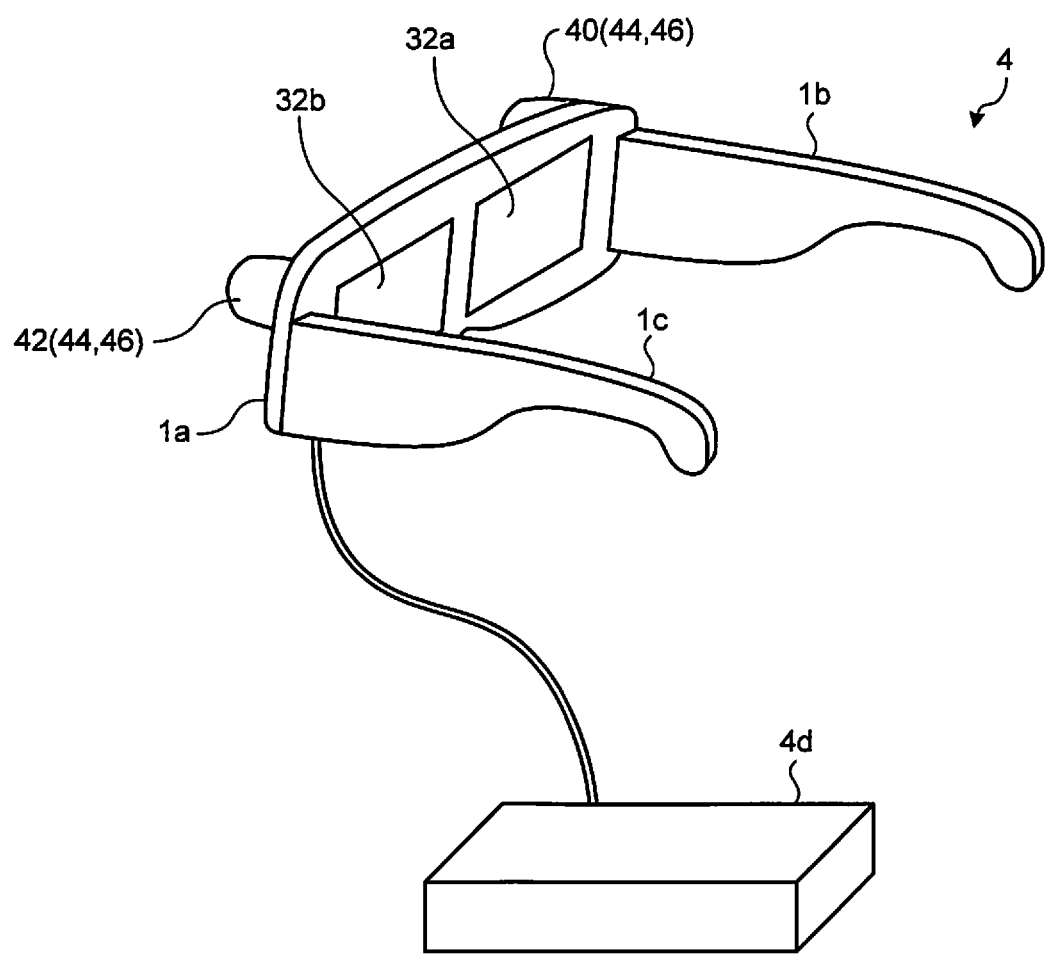
FIG. 5 is a diagram illustrating still another modification of the display device.

While, in FIGS. 1 and 2, one of examples in which the display device 1 has a shape of eyeglasses (goggles) has been described, the shape of the display device 1 is not limited thereto. For example, the display device 1 may have a helmet-type shape that substantially covers an upper half of the head of the user, like a display device 2 illustrated in FIG. 3. Alternatively, the display device 1 may have a mask-type shape that substantially covers the entire face of the user, like a display device 3 illustrated in FIG. 4. The display device 1 may be configured to be connected with an external device 4d such as an information processing device or a battery device in a wireless or wired manner, like a display device 4 illustrated in FIG. 5.

Figure 6:
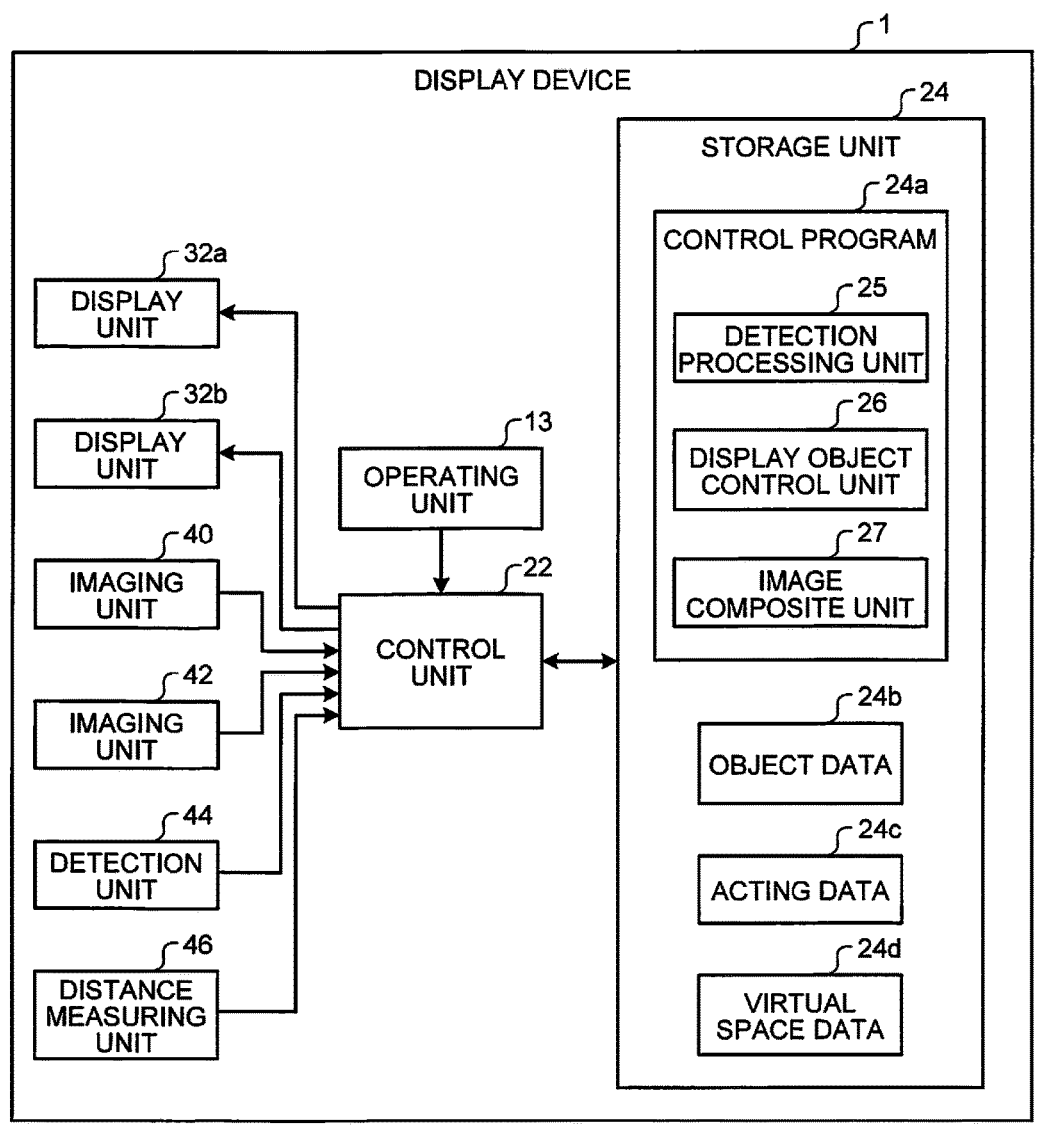
FIG. 6 is a block diagram of the display device according to the first embodiment.

Then, a functional configuration of the display device 1 will be described with reference to FIG. 6. FIG. 6 is a block diagram of the display device 1 according to the first embodiment. As illustrated in FIG. 6, the display device 1 includes an operating unit 13, a control unit 22, a storage unit 24, the display units 32a and 32b, the imaging units 40 and 42, a detection unit 44, and a distance measuring unit 46. The operating unit 13 receives basic operations such as activation, stop, and change of an operation mode of the display device 1.

The display units 32a and 32b include a display device such as a liquid crystal display or an organic electroluminescence panel, and displays various types of information according to a control signal input from the control unit 22. The display units 32a and 32b may be projection devices that project images on retinas of the user using a light source such as a laser beam or the like.

The imaging units 40 and 42 electronically capture images using an image sensor such as a charge coupled device image sensor (CCD) or a complementary metal oxide semiconductor (CMOS). The imaging units 40 and 42 convert the captured images into signals, and output the signals to the control unit 22.

The detection unit 44 detects a real body existing in image ranges of the imaging units 40 and 42. For example, the detection unit 44 detects a body that is matched with a shape registered in advance (for example, a shape of a hand of a human), among real bodies existing in the image ranges. Even about a body, the shape of which is not registered in advance, the detection unit 44 may detect a range (the shape and the size) of the real body in the image based on brightness and/or chroma of pixels, edges of hue, and the like.

The distance measuring unit 46 measures distances to the real body existing in the image ranges of the imaging units 40 and 42. The distances to the real body are measured, for respective eyes, with respect to the positions of the respective eyes of the user who wears the display device 1. Therefore, when reference positions with which the distance measuring unit 46 measures the distances are deviated from the positions of the respective eyes, measured values of the distance measuring unit 46 are corrected to express the distances to the positions of the eyes according to the deviation.

In the present embodiment, the imaging units 40 and 42 function as both of the detection unit 44 and the distance measuring unit 46. That is, in the present embodiment, the imaging units 40 and 42 detect the body in the image ranges by analyzing the images captured by the imaging units 40 and 42. Further, the imaging units 40 and 42 measure (calculate) the distance to the body by comparing the body included in the image captured by the imaging unit 40 and the body included in the image captured by the imaging unit 42.

The display device 1 may include the detection unit 44 separately from the imaging units 40 and 42. The detection unit 44 may be a sensor that detects the real body existing in the image ranges using at least one of visible light, infrared light, ultraviolet rays, a radio wave, a sound wave, magnetism, and capacitance, for example. The display device 1 may include the distance measuring unit 46 separately from the imaging units 40 and 42. The distance measuring unit 46 may be a sensor that detects the distance to the real body existing in the image ranges using at least one of the visible light, infrared light, ultraviolet rays, a radio wave, a sound wave, magnetism, and capacitance, for example. The display device 1 may include a sensor that can function as both of the detection unit 44 and the distance measuring unit 46, like a sensor using a time-of-flight (TOF) method.

The control unit 22 includes a central processing unit (CPU) as calculation means, and a memory as storage means, and realizes various functions by executing a program using these hardware resources. To be specific, the control unit 22 reads out a program and data stored in the storage unit 24 and loads the program and data to the memory, and causes the CPU to execute instructions included in the program loaded to the memory. The control unit 22 then reads/writes data from/to the memory and the storage unit 24, and controls operations of the display unit 32*a* and the like, according to execution results of the instructions by the CPU. When the CPU executes the instructions, the data loaded to the memory, and the operation detected through the detection unit 44 are used as a part of parameters or determination conditions.

The storage unit 24 is constituted of a non-volatile storage device such as a flash memory, and stores therein various programs and data. The programs stored in the storage unit 24 include a control program 24*a*. The data stored in the storage unit 24 include object data 24*b*, acting data 24*c*, and virtual space data 24*d*. The storage unit 24 may be configured by a combination of a portable storage medium such as a memory card, and a read/write device that perform reading/writing from/to the storage medium. In this case, the control program 24*a*, the object data 24*b*, the acting data 24*c*, and the virtual space data 24*d* may be stored in the storage medium. The control program 24*a*, the object data 24*b*, the acting data 24*c*, and the virtual space data 24*d* may be acquired from another device such as a server via wireless or wired communication.

The control program 24*a* provides functions related to various types of control for operating the display device 1. The functions provided by the control program 24*a* include a function to superimpose a three-dimensional object on the images acquired by the imaging units 40 and 42 and display the superimposed images in the display units 32*a* and 32*b*, a function to detect operation to the three-dimensional object, a function to change the three-dimensional object according to the detected operation, and the like.

The control program 24*a* includes a detection processing unit 25, a display object control unit 26, and an image composite unit 27. The detection processing unit 25 provides a function for detecting the real body existing in the image ranges of the imaging units 40 and 42. The function provided by the detection processing unit 25 includes a function to measure the distances to the detected respective bodies.

The display object control unit 26 provides a function for managing what types of three-dimensional objects are arranged in a virtual space, and in what state each of the three-dimensional objects is. The function provided by the display object control unit 26 includes a function to detect the operation to the three-dimensional object based on movement of the real body detected by the function of the detection processing unit 25, and change the three-dimensional object based on the detected operation.

The image composite unit 27 provides a function for generating an image to be displayed in the display unit 32*a* and an image to be displayed in the display unit 32*b* by compositing an image in a real space and an image in the virtual space. The function provided by the image composite unit 27 includes a function to determine front and rear relationship between the real body and the three-dimensional object, based on the distance to the real body measured by the function of the detection processing unit 25, and the distance from a view point to the three-dimensional object in the virtual space, and to adjust overlapping.

The object data 24*b* includes information related to the shape and the properties of the three-dimensional object. The object data 24*b* is used for displaying the three-dimensional object. The acting data 24*c* includes information related to how operation to the displayed three-dimensional object acts on the three-dimensional object. The acting data 24*c* is used for determining how to change the three-dimensional object when the operation to the displayed three-dimensional object is detected. Examples of the change referred to here include movement, rotation, deformation, disappearance, and replacement. The virtual space data 24*d* holds information related to a state of the three-dimensional object arranged in the virtual space. Examples of the state of the three-dimensional object include a position, an attitude, and a status of deformation. The replacement means replacing one object with another object.

Then, one of examples of control based on the functions provided by the control program 24*a* will be described with reference to FIG. 7. An image P1*a* is an image obtained by the imaging unit 40, that is, an image corresponding to a scene of the real space viewed by the right eye. In the image P1*a*, a table T1 and a hand H1 of the user appear. The display device 1 also acquires an image of the same scene imaged by the imaging unit 42, that is, an image corresponding to a scene of the real space viewed by the left eye.

An image P2*a* is an image for the right eye generated based on the virtual space data 24*d* and the object data 24*b*. In this example, the virtual space data 24*d* holds information related to a state of a block-like three-dimensional object BL1 existing in the virtual space, and the object data 24*b* holds information related to the shape and the properties of the three-dimensional object BL1. The display device 1 reproduces a virtual space based on these pieces of information, and generates the image P2*a* that is the reproduced virtual space viewed from a view point of the right eye. The position of the right eye (view point) in the virtual space is determined based on a predetermined rule. Similarly, the display device 1 also generates an image that is the reproduced virtual space viewed from a view point of the left eye. That is, the display device 1 also generates an image that causes the three-dimensional object BL1 to be three-dimensionally displayed in combination with the image P2a.

Figure 7:
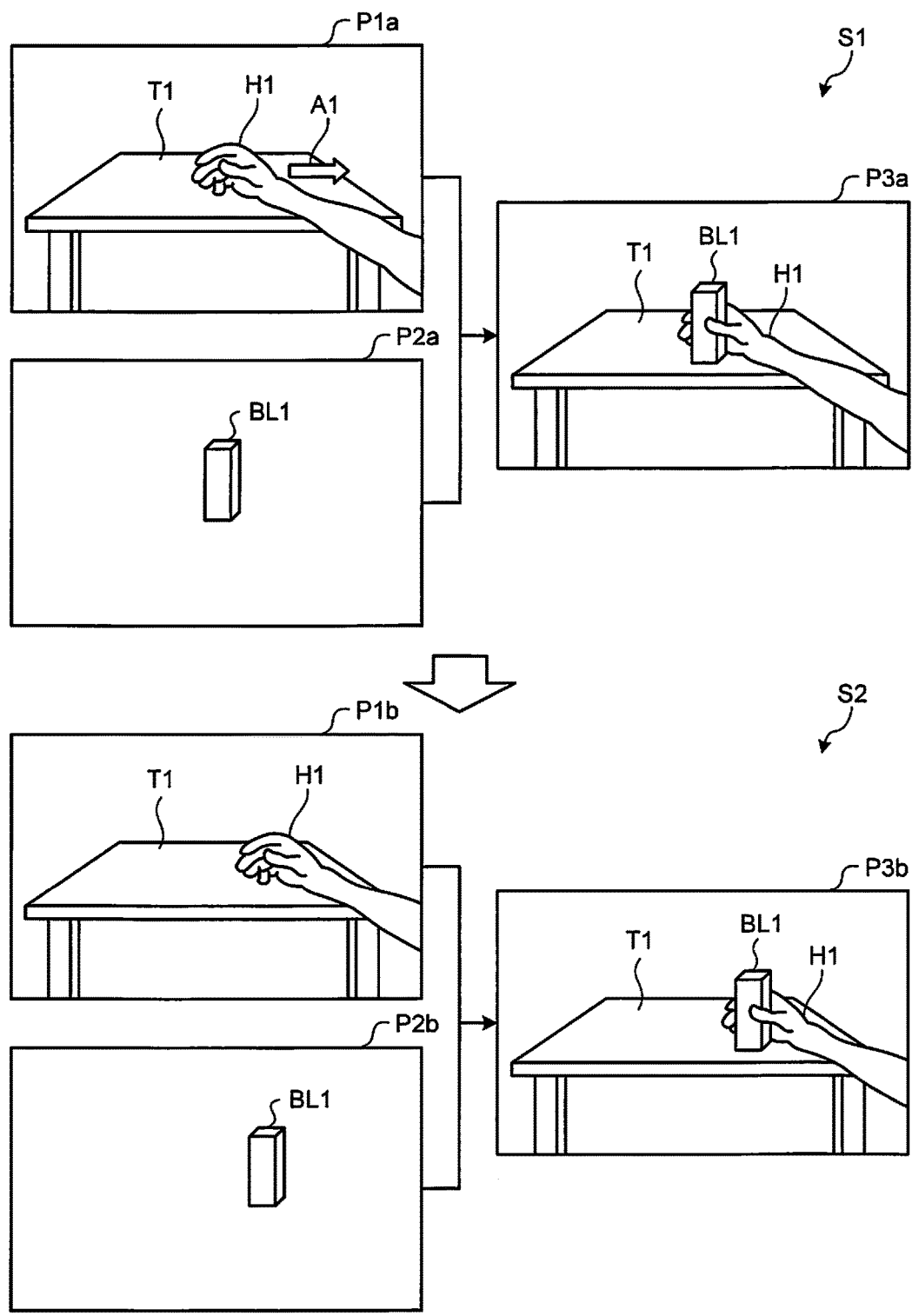
FIG. 7 is a diagram illustrating one of examples of control based on a function provided by a control program.

At Step S1 illustrated in FIG. 7, the display device 1 composites the image P1a and the image P2a to generate an image P3a. The image P3a is an image displayed in the display unit 32a as an image for the right eye. At this time, the display device 1 determines the front and rear relationship between the real body existing in the image range of the imaging unit 40 and the three-dimensional object existing in the virtual space using the position of the right eye of the user as a reference point. Then, when the real body and the three-dimensional object overlap with each other, the display device 1 adjusts the overlapping such that one closer to the right eye of the user can be seen in front.

Such adjustment of overlapping is performed for each range (for example, for each pixel) of a predetermined size within a region on the image where the real body and the three-dimensional object overlap with each other. Therefore, the distance from a view point to the real body in the real space is measured for each range of a predetermined size on the image. Further, the distance from the view point to the three-dimensional object in the virtual space is calculated for each range of a predetermined size on the image in consideration of the position, the shape, the attitude, and the like of the three-dimensional object.

In the scene of Step S1 illustrated in FIG. 7, in the virtual space, the three-dimensional object BL1 is arranged at a position corresponding to right above a position where the table T1 exists in the real space. Further, in the scene of Step S1 illustrated in FIG. 7, the hand H1 of the user and the three-dimensional object BL1 exist in substantially the same distance in substantially the same direction, using the position of the right eye of the user as a reference point. Therefore, the overlapping is adjusted for each range of a predetermined size, so that the hand H1 appears in front in a portion corresponding to the thumb of the hand H1, and the three-dimensional object BL1 appears in front in other portions, of a region where the hand H1 and the three-dimensional object BL1 overlap with each other, in the composited image P3a. Further, the three-dimensional object BL1 appears in front in a region where the table T1 and the three-dimensional object BL1 overlap with each other.

With such adjustment of overlapping, at Step S1 illustrated in FIG. 7, the image P3a that can be seen as if the three-dimensional object BL1 were placed on the table T1 and the user held the three-dimensional object BL1 by hand H1 is obtained. By similar processing, the display device 1 composites the image captured by the imaging unit 42, and the image of the virtual space viewed from the view point of the left eye to generate an image to be displayed in the display unit 32b as an image for the left eye. When the image for the left eye is generated, the overlapping of the real body and the three-dimensional object is adjusted using the position of the left eye of the user as a reference point.

The display device 1 displays the composite images generated as described above in the display units 32a and 32b. As a result, the user can see the scene that is as if the three-dimensional object BL1 were placed on the table T1, and the user held the three-dimensional object BL1 with own hand H1.

In the scene of Step S2 illustrated in FIG. 7, the user moves the hand H1 in the direction of an arrow A1. In this case, an image obtained by the imaging unit 40 is changed to an image P1b in which the position of the hand H1 is moved to the right. Further, the display device 1 determines that the movement of the hand H1 is operation to move the three-dimensional object to the right while holding the three-dimensional object, and moves the position of the three-dimensional object to the right in the virtual space according to the operation. The movement of the three-dimensional object in the virtual space is reflected in the virtual space data 24d. As a result, the image for the right eye generated based on the virtual space data 24d and the object data 24b is changed to an image P2b in which the position of the three-dimensional object BL1 is moved in the right. Details of detection of the operation by the display device 1 will be described below.

The display device 1 composites the image P1b and the image P2b to generate an image P3b for the right eye. The image P3b is an image that can be seen as if the user held the three-dimensional object BL1 with the hand H1 at a more right side on the table T1 than the image P3a. Similarly, the display device 1 generates a composite image for the left eye. The display device 1 then displays the composite images generated as described above in the display units 32a and 32b. As a result, the user can see the scene that is as if the own hand H1 had held the three-dimensional object BL1 and moved it to the right.

Such update of the composite images for display is executed at a frequency (for example, 30 times per second) equivalent to a typical frame rate of a moving image. As a result, the change of the three-dimensional object according to the operation of the user is reflected to the image to be displayed in the display device 1 substantially in real time, and the user can operate the three-dimensional object as if the object actually existed, without a feeling of strangeness. Further, in the configuration according to the present embodiment, the hand of the user, which operates the three-dimensional object, is not positioned between the eyes of the user and the display units 32a and 32b, and thus the user can perform operation without caring about the display of the three-dimensional object being shielded by the hand.

Figure 8:
FIG. 8 is a diagram illustrating one of examples of information stored in object data.

Then, the object data 24b and the acting data 24c illustrated in FIG. 6 will be described in more detail with reference to FIGS. 8 to 14. FIG. 8 is a diagram illustrating one of examples of information stored in the object data 24b. FIGS. 9 to 14 are diagrams illustrating examples of information stored in the acting data 24c.

As illustrated in FIG. 8, in the object data 24b, information including a type, shape information, a color, the degree of transparency, and the like is stored for each three-dimensional object. The type indicates a physical property of the three-dimensional object. The type takes a value of a "rigid body", an "elastic body", or the like, for example. The shape information is information indicating a shape of the three-dimensional object. The shape information is, for example, a collection of vertex coordinates of faces that constitute the three-dimensional object. The color is a color of a surface of the three-dimensional object. The degree of transparency is a degree by which the three-dimensional object transmits light. The object data 24b can hold information related to a plurality of three-dimensional objects.

In examples illustrated in FIGS. 9 to 14, the information related to change of when pressing operation is detected is stored in the acting data 24c for each type of the three-dimensional object. As illustrated in FIG. 9, when the type of the three-dimensional object is "rigid body", change of when the pressing operation is detected differs depending on presence of a fulcrum, presence of an obstacle in the direction of pressing, and a speed of pressing. The obstacle referred to here may be another three-dimensional object, or may be a real body. Whether the speed of pressing is fast or slow is determined based on a threshold.

When there is no fulcrum in the three-dimensional object, and no obstacle in the direction of pressing, the three-dimensional object is displayed in such a manner as to be moved in the direction of pressing according to an amount of pressing. The three-dimensional object displayed in this way is, for example, a block, a pen, or a book. As for the way of moving, whether being slipped or rotated may be determined based on the shape of the three-dimensional object. Further, whether the three-dimensional object is moved together with a pressing body, or the three-dimensional object is moved away from the pressing body such that the three-dimensional object is flicked by the pressing body may be determined based on the speed of pressing, or may be determined based on a calculated value or a set value of frictional resistance between the three-dimensional object and a bottom surface.

When there is no fulcrum in the three-dimensional object, and there is a fixed obstacle in the direction of pressing, the three-dimensional object is displayed in such a manner as to be moved in the direction of pressing according to the amount of pressing, and to stop the movement at the timing when coming in contact with the obstacle. The three-dimensional object displayed in this way is, for example, a block, a pen, or a book. When the speed of pressing is fast, the three-dimensional object may destroy the obstacle and continue the movement. When the three-dimensional object comes in contact with the obstacle while being moved away from the pressing body such that the three-dimensional object is flicked by the pressing body, the three-dimensional object may be moved in the reverse direction such that the three-dimensional object rebounds.

When there is no fulcrum in the three-dimensional object, there is another unfixed rigid body in the direction of pressing, and the speed of pressing is slow, the three-dimensional object is displayed in such a manner as to be moved in the direction of pressing according to the amount of pressing, and to be moved together with another rigid body after coming in contact with another rigid body. When there is no fulcrum in the three-dimensional object, there is another unfixed rigid body in the direction of pressing, and the speed of pressing is fast, the three-dimensional object is displayed in such a manner as to be moved in the direction of pressing according to the amount of pressing. Then, after the three-dimensional object comes in contact with another rigid body, another rigid body is displayed in such a manner as to be flicked and to be moved. After coming in contact with another rigid body, the three-dimensional object may be stopped on site, or may reduce the speed and continue the movement. The combination of the three-dimensional object and another rigid body displayed in this way is, for example, a combination of a ball and pins in bowling, or a combination of marbles.

When there is no fulcrum in the three-dimensional object, and there is another unfixed rigid body in the direction of pressing, but the three-dimensional object can slip through another rigid body, the three-dimensional object is displayed in such a manner as to be moved in the direction of pressing according to the amount of pressing, and to pass through another rigid body and continue the movement after coming in contact with another rigid body. In reality, a rigid body does not pass through a rigid body, but if such passing through is available, the user can be provided with a novel experience. The combination of the three-dimensional object and another rigid body is, for example, a combination of a ball and pins in bowling, or a combination of marbles. A threshold may be provided to the speed of pressing, and when the speed of pressing is the threshold or less, the three-dimensional object may not path through another rigid body.

When there is a fulcrum in the three-dimensional object, the three-dimensional object is displayed in such a manner as to be rotated around the fulcrum according to the amount and the direction of pressing. The rotation referred to here may be rotation of 360 degrees, or may be rotation reciprocating within a predetermined rotation range. The three-dimensional object displayed in this way is, for example, a pendulum, a sandbag of boxing, or a windmill.

As illustrated in FIG. 10, when the type of the three-dimensional object is "elastic body", the change of when the pressing operation is detected differs depending on the material, the presence of limitation on the amount of change, and the speed of pressing. The material referred to here is an assumed material of the three-dimensional object, and is defined in the object data 24*b*.

When the material of the three-dimensional object is a rubber-based material, there is no limitation on the amount of change, and the speed of pressing is slow, the three-dimensional object is displayed in such a manner as to be deformed in the direction of pressing according to the amount of pressing, and to return to an original shape when being released from the pressed state. When the material of the three-dimensional object is a rubber-based material, there is no limitation on the amount of change, and the speed of pressing is fast, the three-dimensional object is displayed in such a manner as to be deformed in the direction of pressing according to the amount of pressing, and then to be flicked and moved in the direction of pressing while returning to the original shape. The three-dimensional object displayed in this way is, for example, a rubber ball, or an eraser.

When the material of the three-dimensional object is a rubber-based material, and there is a limitation on the amount of change, the three-dimensional object is displayed in such a manner as to be deformed in the direction of pressing according to the amount of pressing, up to a deformable range, and, when the pressing operation continues to be detected after that, to be moved in the direction of pressing while returning to the original shape. The three-dimensional object displayed in this way is, for example, a rubber ball, or an eraser.

When the material of the three-dimensional object is a metal-based material, the three-dimensional object is displayed in such a manner as to be deformed in the direction of pressing according to the amount of pressing, up to the deformable range, and to repeat returning to the original shape and deforming (vibrates) when being released from the pressed state. When the three-dimensional object is pressed in a direction other than the deformable direction, the three-dimensional object is moved similarly to the rigid body. The three-dimensional object displayed in this way is, for example, a plate spring or a helical spring.

Figure 11:
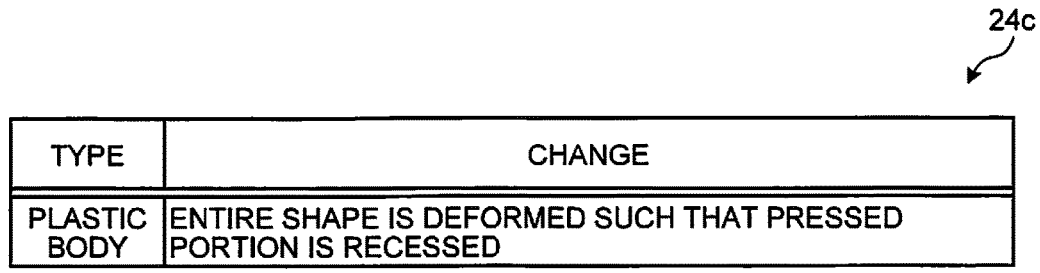
FIG. 11 is a diagram illustrating one of examples of the information stored in the acting data.

As illustrated in FIG. 11, when the type of the three-dimensional object is "plastic body", the three-dimensional object is displayed such that a pressed portion is recessed and the entire shape is changed. The three-dimensional object displayed in this way is, for example, clay.

Figure 12:
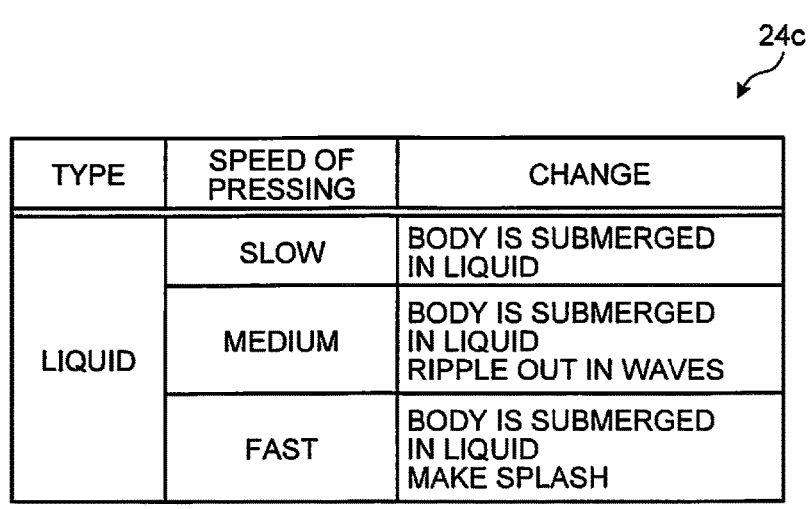
FIG. 12 is a diagram illustrating one of examples of the information stored in the acting data.

As illustrated in FIG. 12, when the type of the three-dimensional object is "liquid", the change of when the pressing operation is detected differs depending on the speed of pressing. When the speed of pressing is slow, the three-dimensional object is displayed such that the pressing body is submerged in the three-dimensional object, that is, in the liquid. When the speed of pressing is a medium speed, the three-dimensional object is displayed such that the pressing body is submerged in the liquid, and the liquid ripples out in waves. When the speed of pressing is fast, the three-dimensional object is displayed such that the pressing body is submerged in the liquid, and the liquid makes a splash. The three-dimensional object displayed in this way is, for example, water in a glass.

As illustrated in FIG. 13, when the type of the three-dimensional object is "gas", the change of when the pressing operation is detected differs depending on the speed of pressing. When the speed of pressing is slow, the three-dimensional object, that is, the gas is displayed in such a manner as to be interrupted by the pressing body, and to hang around the pressing body. When the speed of pressing is a medium speed, the gas is displayed in such a manner as to be scattered by the pressing body. When the speed of pressing is fast, the gas is displayed in such a manner as to cause a whirl by turbulence in the rear side of the moving direction of the pressing body. The three-dimensional object displayed in this way is, for example, smoke.

As illustrated in FIG. 14, when the type of the three-dimensional object is "aggregation", the change of when the pressing operation is detected differs depending on a bonding state of elements of the aggregation. When there is no bonding between the elements of the aggregation, the three-dimensional object is displayed such that a pressed portion is recessed, and the entire shape of the aggregation is changed. The three-dimensional object displayed in this way is, for example, sand, or sugar.

When there is bonding between the elements of the aggregation, the three-dimensional object is displayed such that the pressed portion is recessed, and the entire shape of the aggregation is changed. Further, elements other than the pressed portion are displayed in such a manner as to be pulled and moved by the elements in the pressed portion. The three-dimensional object displayed in this way is, for example, a chain.

When there is no bonding between the elements of the aggregation, but attraction force or repulsive force acts between the three-dimensional object and the pressing body, the three-dimensional object is displayed in such a manner as to be moved without being in contact with the pressing body. When the attraction force acts between the three-dimensional object and the pressing body, the three-dimensional object is attracted by the pressing body when entering within a predetermined distance to the pressing body without being in contact with the pressing body. When the repulsive force acts between the three-dimensional object and the pressing body, the three-dimensional object is moved away from the pressing body when entering within a predetermined distance to the pressing body without being in contact with the pressing body. The combination of the three-dimensional object and the pressing body is, for example, a combination of iron powder and a magnet.

As described above, the three-dimensional object is changed based on the information stored in the object data 24b and the information stored in the acting data 24c, whereby the three-dimensional object can be changed in various manners according to the pressing operation. The information stored in the object data 24b and in the acting data 24c is not limited to the above examples, and may be appropriately changed according to use or the like. For example, the way of changing the three-dimensional object may be set to be switched according to the type and the size of the pressing body, or the size of a contact area of the pressing body and the three-dimensional object.

Then, detection of operation to press the three-dimensional object, and change of the three-dimensional object according to detected operation will be described with reference to FIGS. 15 and 16. In the description below, a space viewed by the user who wears the display device 1 may be called display space. The display device 1 provides images respectively corresponding to the right eye and the left eye of the user, thereby to three-dimensionally (stereoscopically) display the real body and the three-dimensional object in the display space. The display device 1 associates the virtual space reproduced based on the virtual space data 24d, and the real space imaged by the imaging units 40 and 42, based on a predetermined rule, and displays a space in which these spaces are overlapped, as the display space.

Figure 15:
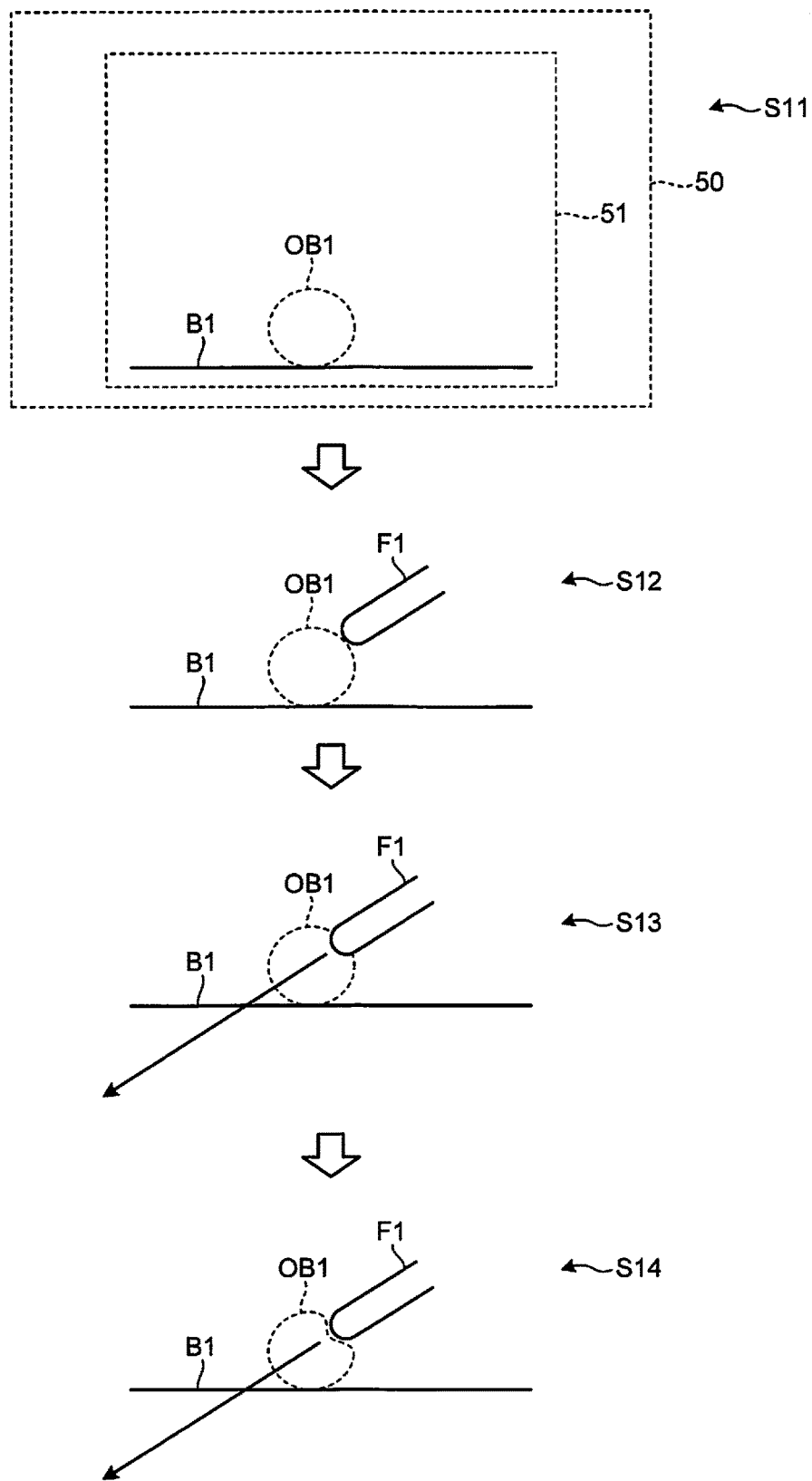
FIG. 15 is a diagram for describing a first example of detection of operation to press a three-dimensional object, and change of the three-dimensional object according to the detected operation.
Figure 16:
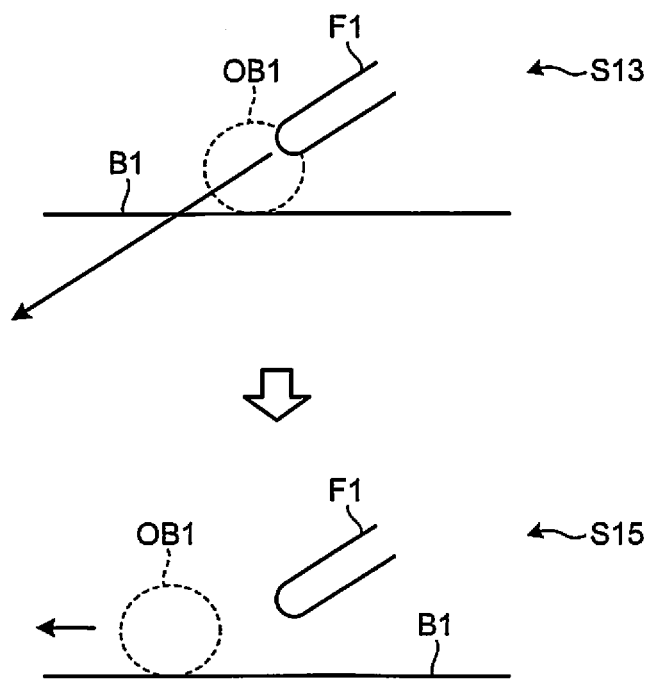
FIG. 16 is a diagram for describing the first example of detection of operation to press a three-dimensional object, and change of the three-dimensional object according to the detected operation.

FIGS. 15 and 16 are diagrams for describing detection of operation to press a three-dimensional object, and change of the three-dimensional object according to the detected operation. At Step S11 illustrated in FIG. 15, the display device 1 stereoscopically displays a three-dimensional object OB1 in a display space 50. The three-dimensional object OB1 is, for example, an object that is modeled on a ball. At Step S11, a bottom surface B1 that supports the three-dimensional object OB1 is displayed.

At Step S12, the user places a finger F1 at a position at which the finger F1 is in contact with the three-dimensional object OB1, and keeps the finger F1 to stand still. When the real body is detected in the display space, and the state in which the real body is in contact with the three-dimensional object OB1 is continued for a predetermined time or more, the display device 1 determines that the three-dimensional object OB1 has been selected as an object to be operated. Then, the display device 1 notifies the user of the fact that the three-dimensional object OB1 has been selected as the object to be operated, by changing a display style of the three-dimensional object OB1, or the like.

Determination of whether the body is in contact with the three-dimensional object OB1 is made based on the position of the body in the real space, and the shape, the attitude, and the position in the virtual space of the three-dimensional object OB1, and the like. Comparison between the position in the real space and the position in the virtual space may be performed by converting a position in one space into a position in the other space based on the above-described predetermined rule, or may be performed by converting the positions in both spaces into positions in a space for comparison. When a finger is detected as the real body, the position of a tip of the finger may be processed as the position of the body. Humans often use a tip of a finger when operating something. Therefore, the position of the tip of the finger is processed as the position of the body, whereby more natural operation feeling can be provided to the user.

The notification of the fact that the three-dimensional object has been selected as the object to be operated is realized by, for example, changing the entire color of the three-dimensional object OB1, or changing the color of a vicinity of the position that is in contact with the body, of a surface of the three-dimensional object OB1. The display device 1 may perform notification with a sound and/or vibration, in place of, or in addition to such visual notification.

As described above, when the state in which the real body such as the finger is in contact with the three-dimensional object OB1 is continuously detected for a predetermined time or more, the display device 1 determines that the three-dimensional object OB1 has been selected as the object to be operated. The continuous detection of the contact state for the predetermined time or more is added as one of conditions, whereby a possibility of selecting an unintended three-dimensional object as the object to be operated in the process of moving the finger to operate another three-dimensional object can be reduced.

Assume that, after the three-dimensional object OB1 is selected as the object to be operated, the user enters the finger F1 into an inner side of the three-dimensional object OB1 such that he/she presses the three-dimensional object OB1, as illustrated in Step S13. When the operation of entering the body into the three-dimensional object selected as the object to be operated has been detected, the display device 1 changes the three-dimensional object according to the operation. How to change the three-dimensional object is determined based on the type of the three-dimensional object defined in the object data 24b, and a rule of change associated with the type defined in the acting data 24c.

For example, assume that the three-dimensional object OB1 is defined as an elastic body in the object data 24b, and it is defined in the acting data 24c that the elastic body is deformed in the direction of pressing according to the amount of pressing when pressed. In this case, as illustrated in Step S14, the display device 1 changes the three-dimensional object OB1 such that a portion into which the finger F1 enters is pressed and recessed.

Assume that the three-dimensional object OB1 is defined as a rigid body in the object data 24b, and it is defined in the acting data 24c that the rigid body is moved in the direction of pressing according to the amount of pressing when pressed. In this case, as illustrated in Step S15 of FIG. 16, the display device 1 moves the three-dimensional object OB1 into a direction of travel of the finger F1 such that the three-dimensional object OB1 is pressed by the finger F1. At Step S15 of FIG. 16, the three-dimensional object OB1 is supported by a bottom surface B1, and is thus moved according to a component of force applied to the rigid body in a direction horizontal to the bottom surface B1.

As described above, when the operation to press the three-dimensional object has been detected, the three-dimensional object OB1 is changed based on the object data 24b and the acting data 24c, whereby the three-dimensional object can be changed in various manners according to the operation. The pressing operation is operation used in various scenes in the real world. Therefore, the operation to press the three-dimensional object OB1 is detected and corresponding processing is executed, whereby intuitive and highly convenient operability can be realized.

The body used for operating the three-dimensional object is not limited to the finger, and may be a hand, a foot, a stick, a tool, or the like. A manner in which the three-dimensional object is changed according to the pressing operation may conform to a real physical rule, or may be one that is unlikely to happen in reality.

The display device 1 may limit the space in which the display device 1 detects the operation to the three-dimensional object, to an operable range 51. The operable range 51 is a range that can be reached by the hand of the user who wears the display device 1. In this way, the space in which the display device 1 detects the operation to the three-dimensional object is limited, whereby a load of calculation processing executed by the display device 1 in order to detect the operation can be reduced.

Figure 17:
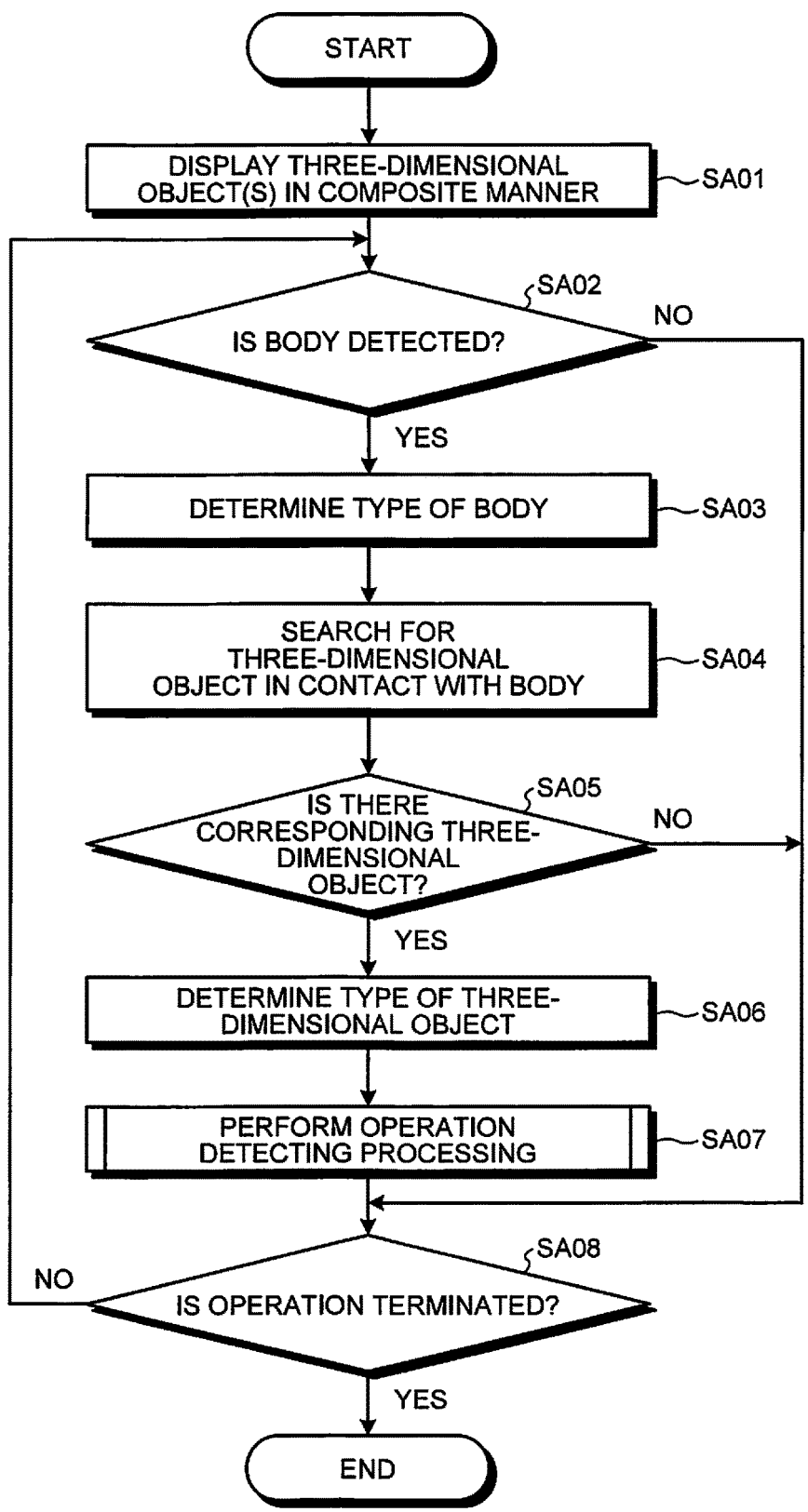
FIG. 17 is a flowchart illustrating a processing procedure of contact detecting processing in the first example.

Then, a first example of a processing procedure executed by the display device 1 with respect to the operation to press the three-dimensional object will be described with reference to FIGS. 17 and 18. FIG. 17 is a flowchart illustrating a processing procedure of contact detecting processing of the three-dimensional object. The processing procedure illustrated in FIG. 17 is realized by the control unit 22 executing the control program 24a.

As illustrated in FIG. 17, first of all, at Step SA01, the control unit 22 composites and displays an image of the virtual space including the three-dimensional object(s) and an image of the real space.

Subsequently, then at Step SA02, the control unit 22 determines whether a predetermined body has been detected by the detection unit 44, that is, by the imaging units 40 and 42. The predetermined body is, for example, a finger of the user. When the predetermined body has not been detected (No at Step SA02), then at Step SA08, the control unit 22 determines whether operation termination has been detected.

The operation termination is detected, for example, when predetermined operation with respect to the operating unit 13 has been performed. When the operation termination has been detected (Yes at Step SA08), the control unit 22 terminates the contact detecting processing. When the operation termination has not been detected (No at Step SA08), the control unit 22 re-executes Step SA02 and the subsequent steps.

When the predetermined body has been detected (Yes at Step SA02), then at Step SA03, the control unit 22 determines the type of the predetermined body. The type of the predetermined body is determined based on, for example, the size, the shape, the color, or the like of the body in the images captured by the imaging units 40 and 42. Subsequently, at Step SA04, the control unit 22 searches for a three-dimensional object that is in contact with the predetermined body. When there is no three-dimensional object that is in contact with the predetermined body (No at Step SA05), the control unit 22 proceeds to Step SA08.

When the three-dimensional object that is in contact with the predetermined body is found (Yes at Step SA05), then at Step SA06, the control unit 22 determines the type of the three-dimensional object that is in contact with the predetermined body, based on the object data 24b. Then, at Step SA07, the control unit 22 executes operation detecting processing described below. Subsequently, the control unit 22 proceeds to Step SA08.

Figure 18:
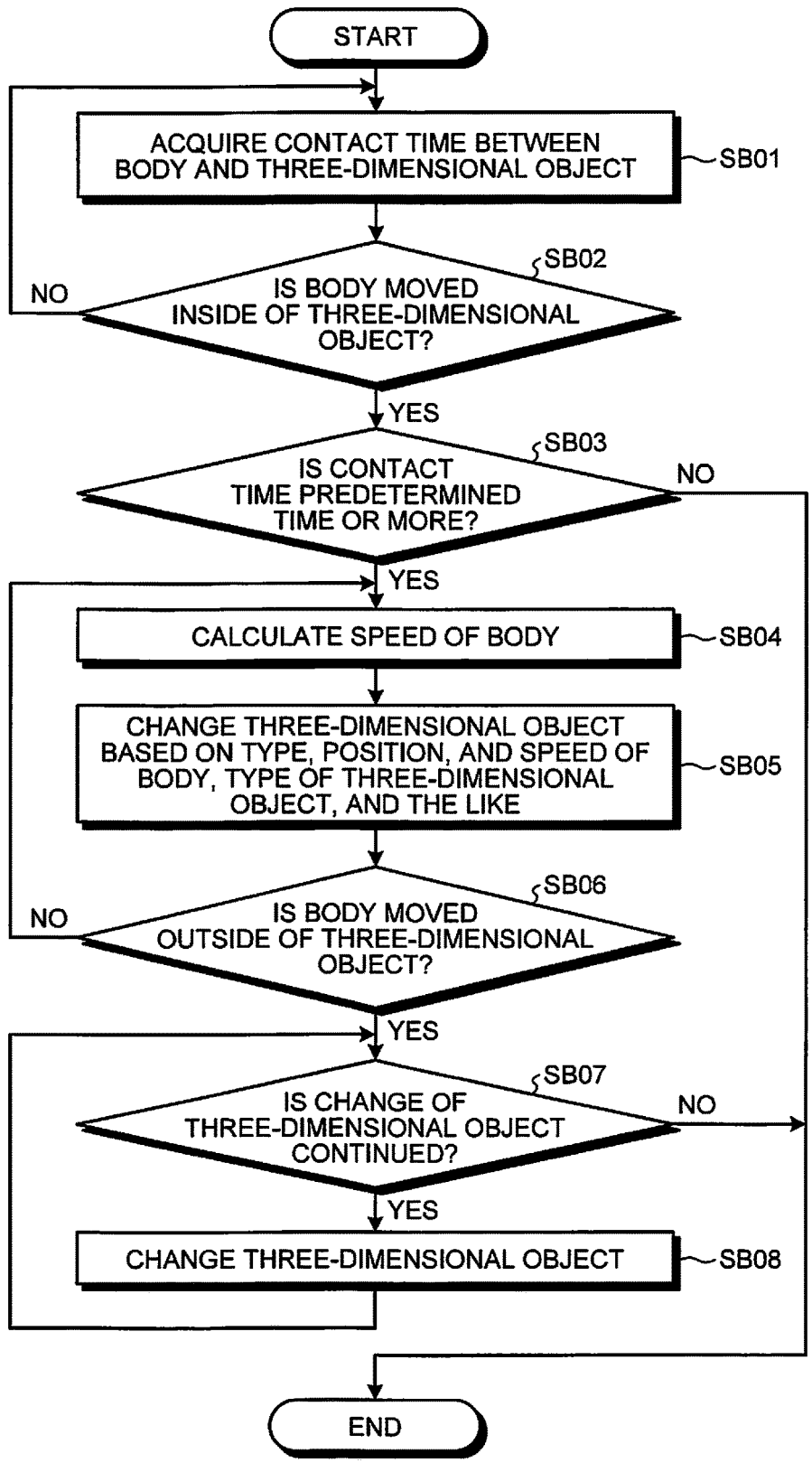
FIG. 18 is a flowchart illustrating a processing procedure of operation detecting processing in the first example.

FIG. 18 is a flowchart illustrating a processing procedure of the operation detecting processing. The processing procedure illustrated in FIG. 18 is realized by the control unit 22 executing the control program 24a.

As illustrated in FIG. 18, first of all, at Step SB01, the control unit 22 acquires a contact time of the predetermined body and the three-dimensional object. Then, at Step SB02, the control unit 22 determines whether the predetermined body has been moved to an inside of the three-dimensional object. When the predetermined body has not been moved to the inside of the three-dimensional object (No at Step SB02), the control unit 22 re-executes Step SB01 and the subsequent steps.

When the predetermined body has been moved to the inside of the three-dimensional object (Yes at Step SB02), then at Step SB03, the control unit 22 determines whether the contact time is a predetermined time or more. When the contact time is shorter than the predetermined time (No at Step SB03), the three-dimensional object is determined not to be the object to be operated, and thus the control unit 22 terminates the operation detecting processing.

When the contact time is the predetermined time or more (Yes at Step SB03), then at Step SB04, the control unit 22 calculates the speed of the predetermined body. Then, at Step SB05, the control unit 22 changes the three-dimensional object based on the type, the position, and the speed of the predetermined body, the type of the three-dimensional object, and the like. A specific way of changing the three-dimensional object is determined according to the acting data 24c.

Subsequently, at Step SB06, the control unit 22 determines whether the predetermined body has been moved to an outside of the three-dimensional object. When the predetermined body has not been moved to the outside of the three-dimensional object, that is, when the pressing operation is continued (No at Step SB06), the control unit 22 re-executes Step SB04 and the subsequent steps.

When the predetermined body has been moved to the outside of the three-dimensional object, that is, when the three-dimensional object has been released (Yes at Step SB06), then at Step SB07, the control unit 22 determines whether the change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SB07), then at Step SB08, the control unit 22 changes the three-dimensional object, and then re-executes Step SB07 and the subsequent steps. When the change of the three-dimensional object is not continued (No at Step SB07), the control unit 22 terminates the operation detecting processing.

As described above, in the first example, the three-dimensional object is changed in various manners according to the pressing operation, whereby a highly convenient operation method can be provided to the user.

A second example of a processing procedure related to the operation to press the three-dimensional object will be described. The contact detecting processing in the second example is the same as the contact detecting processing in the first example. Therefore, in the second example, description overlapping with the first example is not repeated, and the operation detecting processing will be mainly described.

Figure 19:
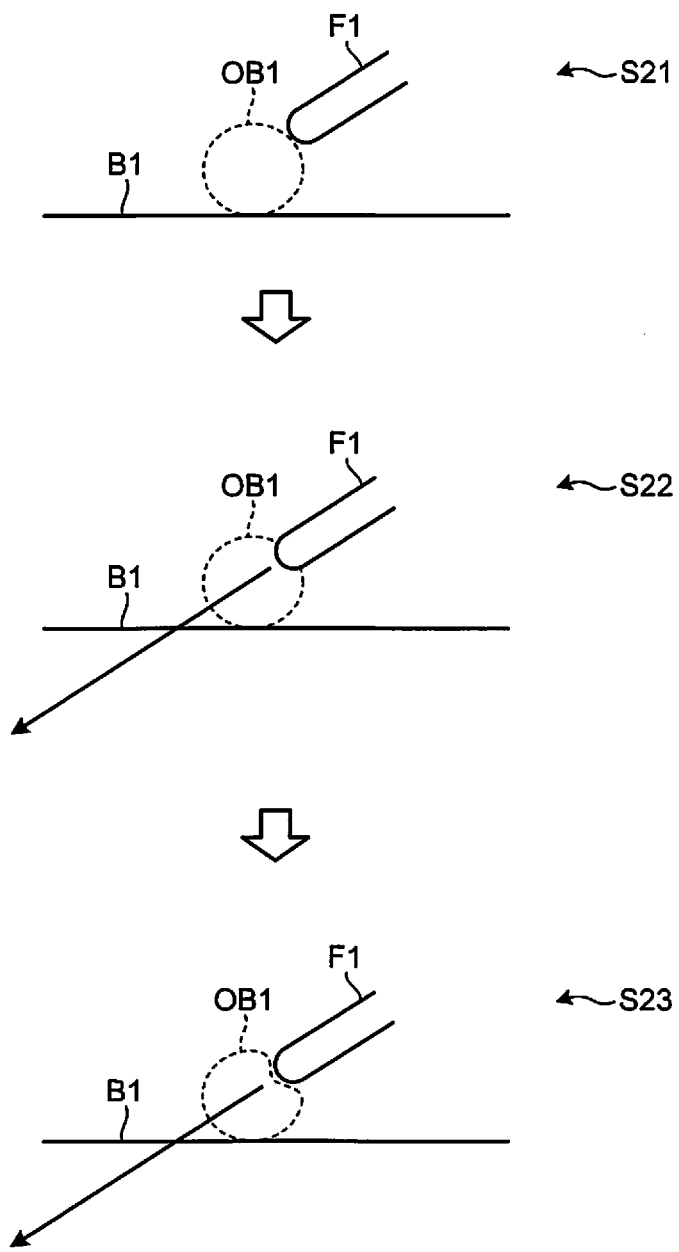
FIG. 19 is a diagram for describing a second example of detection of operation to press a three-dimensional object, and change of the three-dimensional object according to the detected operation.

First of all, detection of operation to press a three-dimensional object, and change of the three-dimensional object according to the detected operation will be described with reference to FIG. 19. FIG. 19 is a diagram for describing detection of the operation to press a three-dimensional object, and change of the three-dimensional object according to the detected operation. At Step S21 illustrated in FIG. 19, the user brings the finger F1 in contact with the three-dimensional object OB1, and at Step S22, the user enters the finger F1 into an inner side of the three-dimensional object OB1.

When a real body has been detected in the display space, and a state in which the real body is in contact with the three-dimensional object OB1, and is then moved to an inside of the three-dimensional object OB1 is continued for a predetermined time or more, the display device 1 determines that the three-dimensional object OB1 has been selected as the object to be operated. Then, the display device 1 notifies the user of the fact that the three-dimensional object OB1 has been selected as the object to be operated, by changing the display style of the three-dimensional object OB1, or the like. Further, as illustrated in Step S23, the display device 1 changes the three-dimensional object OB1 according to the operation with the finger F1 of at and after the contact detection, as if the three-dimensional object OB1 had already been selected as the object of the pressing operation at the stage of Step S21.

As described above, after the contact of the body and the three-dimensional object is detected, the pressing operation is made detectable even if the body does not stay on site, whereby the user can promptly start the operation to press the three-dimensional object. Further, the continuance of the state in which the body is moved to the inside of the three-dimensional object OB1 after the contact for the predetermined time or more is added as one of conditions, whereby the possibility of selecting an unintended three-dimensional object as the object to be operated in the process of moving the finger to operate another three-dimensional object can be reduced.

Figure 20:
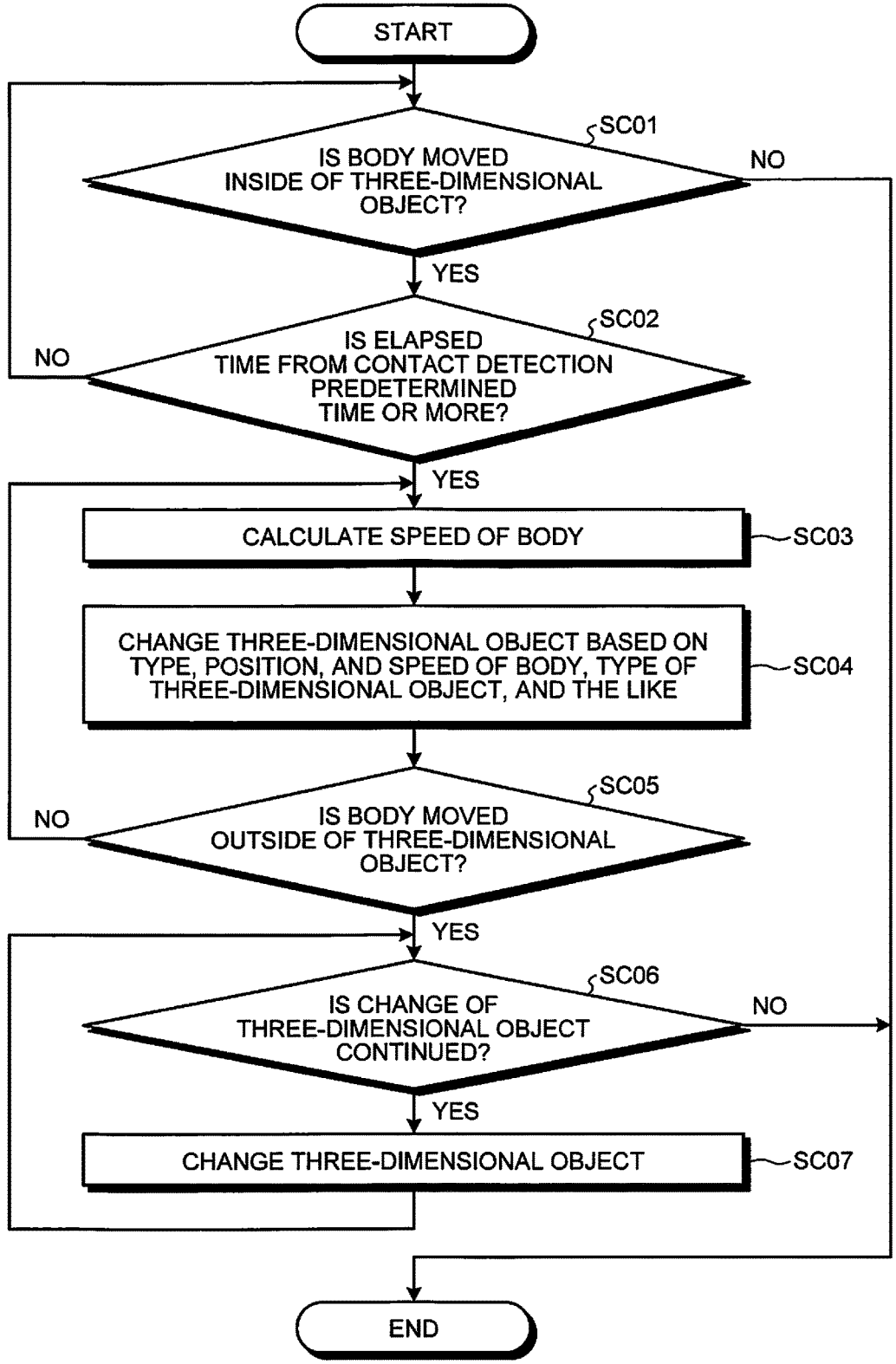
FIG. 20 is a flowchart illustrating a processing procedure of operation detecting processing in the second example.

Then, a processing procedure of the operation detecting processing in the second example will be described with reference to FIG. 20. FIG. 20 is a flowchart illustrating a processing procedure of the operation detecting processing. The processing procedure illustrated in FIG. 20 is realized by the control unit 22 executing the control program 24a. A processing procedure of contact detecting processing is similar to the procedure illustrated in FIG. 17.

As illustrated in FIG. 20, first of all, at Step SC01, the control unit 22 determines whether a predetermined body has been moved to an inside of the three-dimensional object. When the predetermined body has not been moved to the inside of the three-dimensional object (No at Step SC01), the three-dimensional object is determined not to be the object to be operated, and thus the control unit 22 terminates the operation detecting processing.

When the predetermined body has been moved to the inside of the three-dimensional object (Yes at Step SC01), then at Step SC02, the control unit 22 determines whether an elapsed time from the contact detection is a predetermined time or more. When the elapsed time is shorter than the predetermined time (No at Step SC02), the control unit 22 re-executes Step SC01 and the subsequent steps.

When the elapsed time is the predetermined time or more (Yes at Step SC02), then at Step SC03, the control unit 22 calculates the speed of the predetermined body. Then, at Step SC04, the control unit 22 changes the three-dimensional object based on the type, the position, and the speed of the predetermined body, the type of the three-dimensional object, and the like. A specific way of changing the three-dimensional object is determined according to the acting data 24c.

Subsequently, at Step SC05, the control unit 22 determines whether the predetermined body has been moved to an outside of the three-dimensional object. When the predetermined body has not been moved to the outside of the three-dimensional object, that is, when the pressing operation is continued (No at Step SC05), the control unit 22 re-executes Step SC03 and the subsequent steps.

When the predetermined body has been moved to the outside of the three-dimensional object, that is, when the three-dimensional object has been released (Yes at Step SC05), then at Step SC06, the control unit 22 determines whether change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SC06), then at Step SC07, the control unit 22 changes the three-dimensional object, and then re-executes Step SC06 and the subsequent steps. When the change of the three-dimensional object is not continued (No at Step SC06), the control unit 22 terminates the operation detecting processing.

As described above, in the second example, the pressing operation is recognized even if the state in which the body such as the finger is in contact with the three-dimensional object is not continued for the predetermined time or more. Therefore, the user can promptly start the operation to press the three-dimensional object.

A third example of a processing procedure related to the operation to press a three-dimensional object will be described. The contact detecting processing in the third example is the same as the contact detecting processing in the first example. Therefore, in the third example, description overlapping with the first example is not repeated, and the operation detecting processing will be mainly described.

Figure 21:
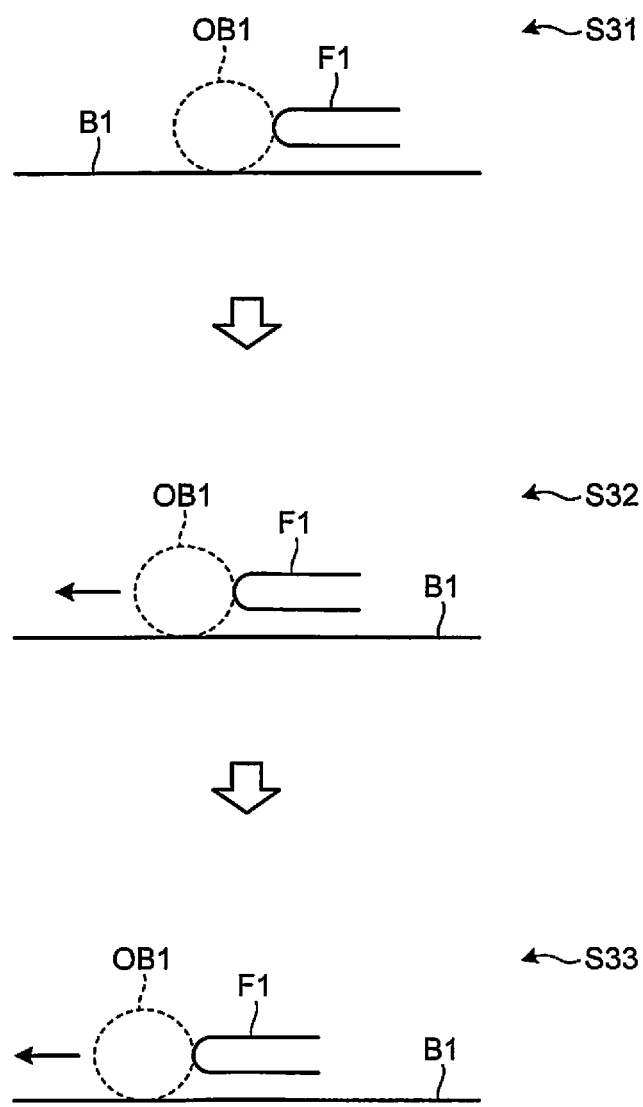
FIG. 21 is a diagram for describing a third example of detection of operation to press a three-dimensional object, and change of the three-dimensional object according to the detected operation.
Figure 22:
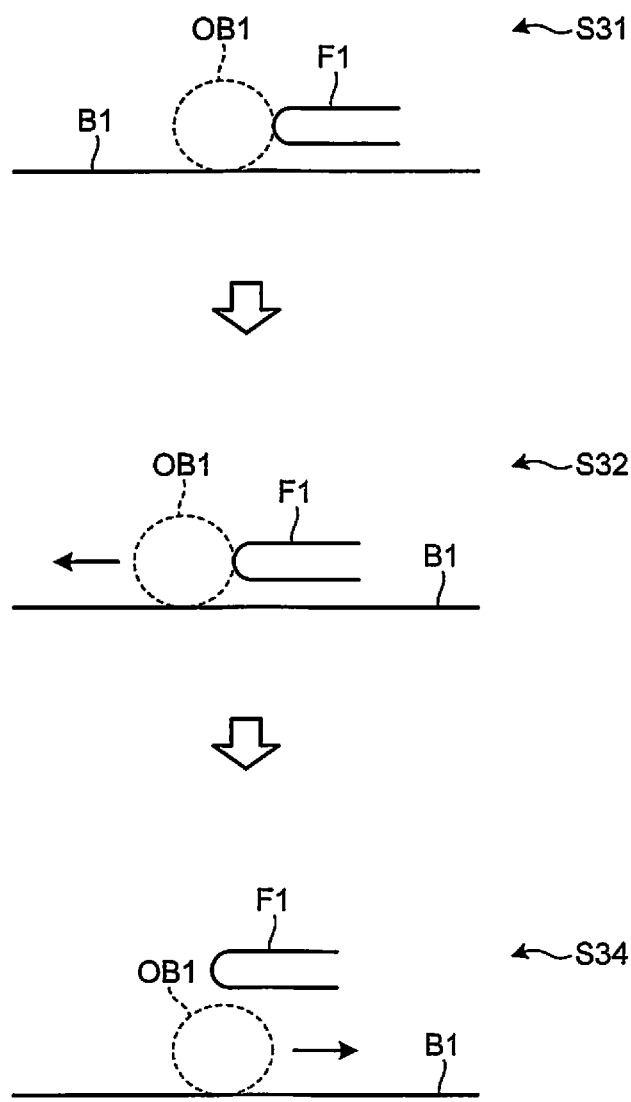
FIG. 22 is a diagram for describing the third example of detection of operation to press a three-dimensional object, and change of the three-dimensional object according to the detected operation.

First of all, detection of operation to press the three-dimensional object, and change of the three-dimensional object according to the detected operation will be described with reference to FIGS. 21 and 22. FIGS. 21 and 22 are diagrams for describing detection of the operation to press the three-dimensional object, and change of the three-dimensional object according to the detected operation. At Step S31 illustrated in FIG. 21, the three-dimensional object OB1 is stereoscopically displayed in the display space. Further, the user brings the finger F1 in contact with the three-dimensional object OB1.

Assume that the user enters the finger F1 into an inside of the three-dimensional object OB1. When it is detected that the body that is in contact with the three-dimensional object OB1 has been moved to the inside of the three-dimensional object OB1, the display device 1 changes the three-dimensional object OB1 from the time point, according to the operation with the finger F1, as illustrated in Step S32. In the example illustrated in FIG. 21, at Step S32, the three-dimensional object OB1 has already started movement in accordance with the movement of the finger F1.

Then, as illustrated in Step S33, the display device 1 determines the three-dimensional object OB1 as the object to be operated, at a stage where the movement of the finger F1 to the inside of the three-dimensional object OB1 is continued for a predetermined time or more. Then, the display device 1 notifies the user of the fact that the three-dimensional object OB1 has been determined as the object to be operated, by changing the display style of the three-dimensional object OB1, or the like. The display device 1 still continues to change the three-dimensional object OB1 while the movement of the finger F1 to the inside of the three-dimensional object OB1 is detected.

As illustrated in Step S34 of FIG. 22, when the movement of the finger F1 to the inside of the three-dimensional object OB1 has not been detected before a predetermined time elapses, the display device 1 applies reverse change to the change added by that time, to the three-dimensional object OB1. As a result, the three-dimensional object OB1 is displayed at the same position in the same state as the stage of Step S31. The speed to apply the reverse change to the three-dimensional object OB1 may be faster than the speed at which the change to the three-dimensional object OB1 had been applied by that time. That is, the display device 1 may reversely change the three-dimensional object OB1 as if the display device 1 reversely reproduces the three-dimensional object OB1 at a high speed.

As described above, the display device 1 starts applying the change to the three-dimensional object from at the stage where it is detected that the body enters into the inside of the three-dimensional object, whereby the user can recognize the three-dimensional object is getting selected before the selection is determined. As a result, the user can know whether an intended three-dimensional object has been selected, at an early stage. When an unintended three-dimensional object has been selected, the user can put the unintendedly selected three-dimensional object back in an original state, by canceling the operation before the predetermined time elapses.

Until the movement of the finger F1 to the inside of the three-dimensional object OB1 is continued for a predetermined time or more, the three-dimensional object to which the change is applied may be displayed in a style different (for example, translucently) from a normal time or from a state in which the selection as the object to be operated has been determined. By the change of the display style in such a manner, the user can easily discriminate the state of the three-dimensional object.

Figure 23:
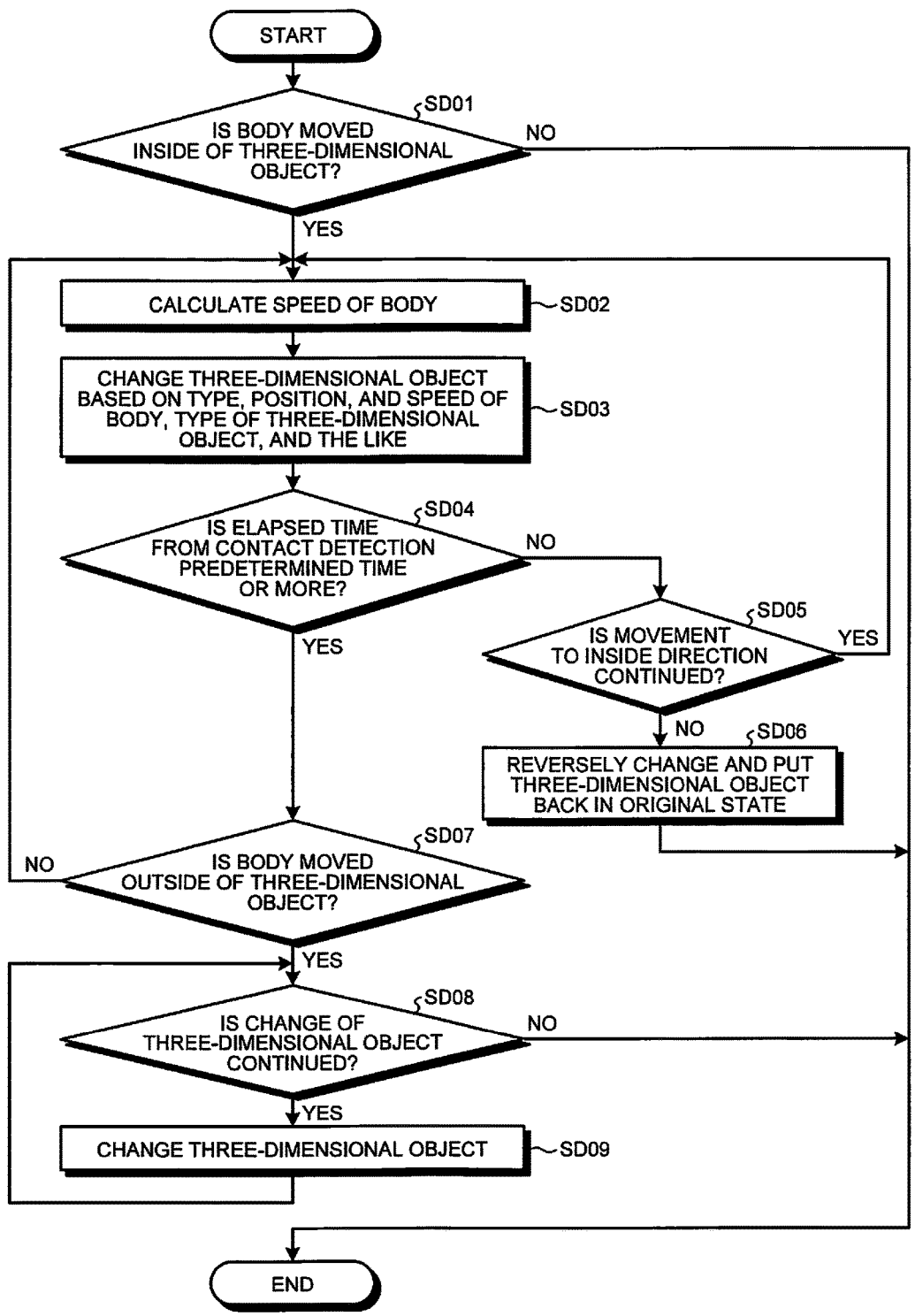
FIG. 23 is a flowchart illustrating a processing procedure of operation detecting processing in the third example.

Then, a processing procedure of the operation detecting processing in the third example will be described with reference to FIG. 23. FIG. 23 is a flowchart illustrating a processing procedure of the operation detecting processing. The processing procedure illustrated in FIG. 23 is realized by the control unit 22 executing the control program 24a. The processing procedure in the contact detecting processing is similar to the procedure illustrated in FIG. 17.

As illustrated in FIG. 23, first of all, at Step SD01, the control unit 22 determines whether a predetermined body has been moved to an inside of a three-dimensional object. When the predetermined body has not been moved to the inside of the three-dimensional object (No at Step SD01), the three-dimensional object is determined not to be the object to be operated, and thus the control unit 22 terminates the operation detecting processing.

When the predetermined body has been moved to the inside of the three-dimensional object (Yes at Step SD01), then at Step SD02, the control unit 22 calculates the speed of the predetermined body. Then, at Step SD03, the control unit 22 changes the three-dimensional object, based on the type, the position, and the speed of the predetermined body, the type of the three-dimensional object, and the like. A specific way of changing the three-dimensional object is determined according to the acting data 24c.

Subsequently, at Step SD04, the control unit 22 determines whether an elapsed time from the contact detection is a predetermined time or more. When the elapsed time is shorter than the predetermined time, that is, when the three-dimensional object has not been determined as the object of the pressing operation (No at Step SD04), then at Step SD05, the control unit 22 determines whether the movement of the predetermined body to an internal direction of the three-dimensional object is continued.

When the movement to the internal direction of the three-dimensional object is continued (Yes at Step SD05), the control unit 22 re-executes Step SD02 and the subsequent steps. When the movement to the internal direction of the three-dimensional object is not continued (No at Step SD05), then at Step SD06, the control unit 22 reversely changes the three-dimensional object and puts the three-dimensional object back in the original state. Then, the control unit 22 terminates the operation detecting processing.

When the elapsed time from the contact detection is the predetermined time or more (Yes at Step SD04), then at Step SD07, the control unit 22 determines whether the predetermined body has been moved to an outside of the three-dimensional object. When the predetermined body has not been moved to the outside of the three-dimensional object, that is, when the pressing operation is continued (No at Step SD07), the control unit 22 re-executes Step SD02 and the subsequent steps.

When the predetermined body has been moved to the outside of the three-dimensional object, that is, when the three-dimensional object has been released (Yes at Step SD07), then at Step SD08, the control unit 22 determines whether the change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SD08), then at Step SD09, the control unit 22 changes the three-dimensional object, and re-executes Step SD08 and the subsequent steps. When the change of the three-dimensional object is not continued (No at Step SD08), the control unit 22 terminates the operation detecting processing.

As described above, in the third example, from at the time point when the pressing operation has been detected, the three-dimensional object is changed according to the operation. Therefore, the user can easily recognize the three-dimensional object that is an object of the pressing operation.

The operation to press the three-dimensional object has been described as the operation related to the three-dimensional object. However, the operation detected by the display device 1 in relation to the three-dimensional object is not limited to the pressing operation. The display device 1 can also detect operation performed by holding the three-dimensional object by the user. Hereinafter, operation performed by holding the three-dimensional object will be described.

Figure 24:
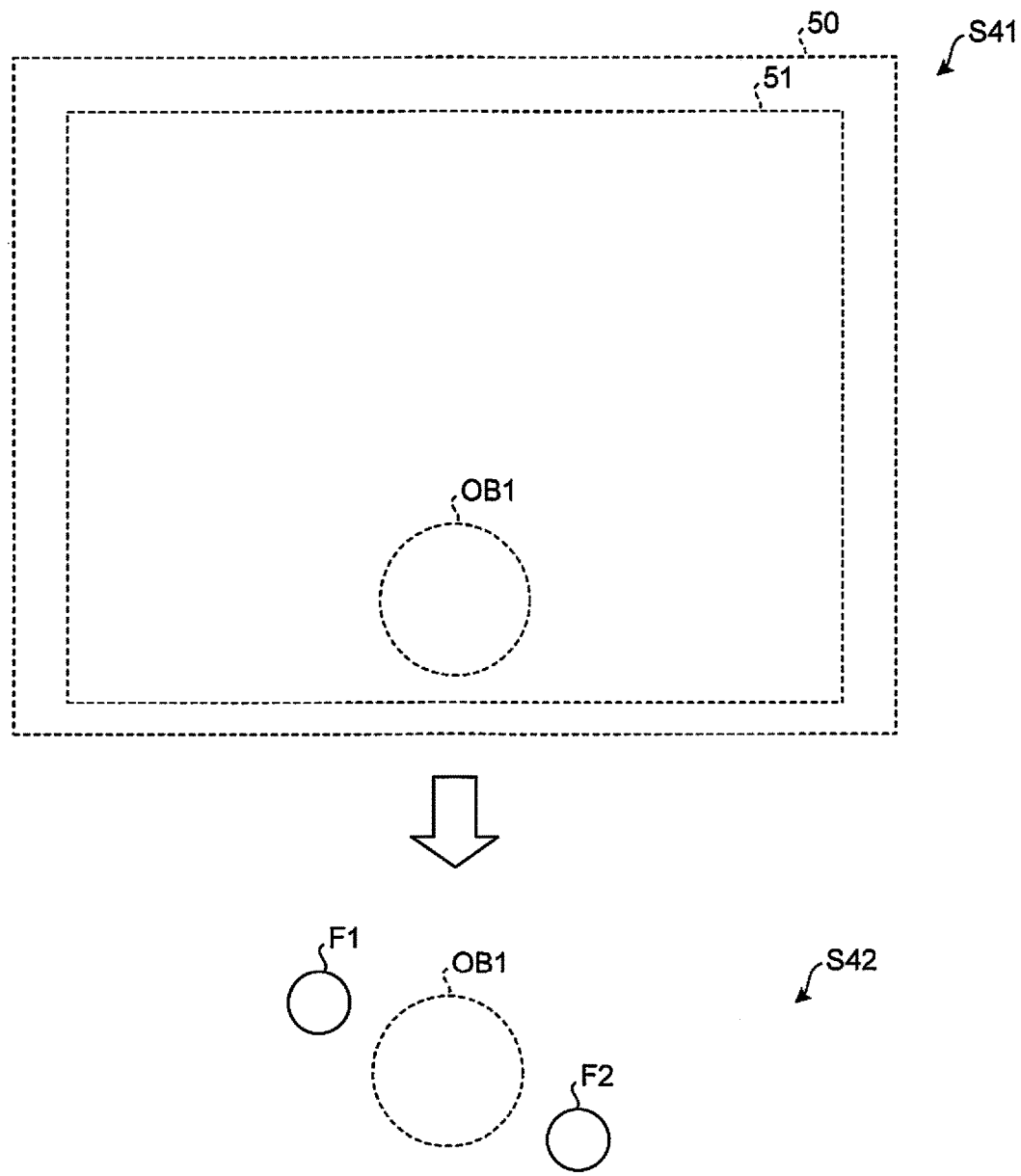
FIG. 24 is a diagram for describing a first example of detection of operation performed by holding a three-dimensional object.

Detection of the operation performed by holding the three-dimensional object will be described with reference to FIG. 24. FIG. 24 is a diagram for describing the detection of the operation performed by holding the three-dimensional object. At Step S41 illustrated in FIG. 24, the three-dimensional object OB1 is stereoscopically displayed in the display space 50.

Assume that the user wishes to hold the three-dimensional object OB1 and perform some sort of operation. To hold the three-dimensional object OB1 and perform some sort of operation, first of all, it is necessary to select the three-dimensional object OB1 as the object to be operated. To select the three-dimensional object OB1, as illustrated in Step S42, the user moves the finger F1 and a finger F2 such that the three-dimensional object OB1 is positioned between the finger F1 and the finger F2, and maintains the state for a predetermined time or more.

When two real bodies have been detected in the display space, and the state in which the three-dimensional object OB1 is positioned between the two bodies is continued for a predetermined time or more, the display device 1 determines that the three-dimensional object OB1 has been selected, and causes the three-dimensional object OB1 to be in a selected state. Then, the display device 1 notifies the user of the fact that the three-dimensional object OB1 is in a selected state, by changing the display style of the three-dimensional object OB1, or the like.

The determination of whether the three-dimensional object OB1 is positioned between the two bodies is made based on the positions of the two bodies in the real space, the shape, the attitude, and the position in the virtual space of the three-dimensional object OB1, and the like. Comparison between the position in the real space and the position in the virtual space may be performed by converting a position in one space into a position in the other space, based on the above-described predetermined rule, or may be performed by converting positions in both spaces into positions in a space for comparison. When fingers have been detected as the real bodies, the positions of tips of the fingers may be processed as the positions of the bodies.

As descried above, when the state in which the three-dimensional object OB1 is positioned between the real bodies such as the fingers is continuously detected for the predetermined time or more, the display device 1 determines that the three-dimensional object OB1 is selected. The operation to arrange the fingers to sandwich the three-dimensional object OB1 is similar to human operation to hold something in order to select something in the real space. Therefore, the operation is intuitive and easy to understand, as operation for selecting the three-dimensional object. Further, the continuous detection of the state for the predetermined time or more is added as one of conditions, whereby the possibility of selecting an unintended three-dimensional object in the process of moving the fingers to select another three-dimensional object can be reduced, for example.

After determining that the three-dimensional object OB1 is in the selected state, the display device 1 applies change, such as movement, deformation, disappearance, or replacement to the three-dimensional object OB1 according to the movement of the finger F1 and the finger F2.

Figure 25:
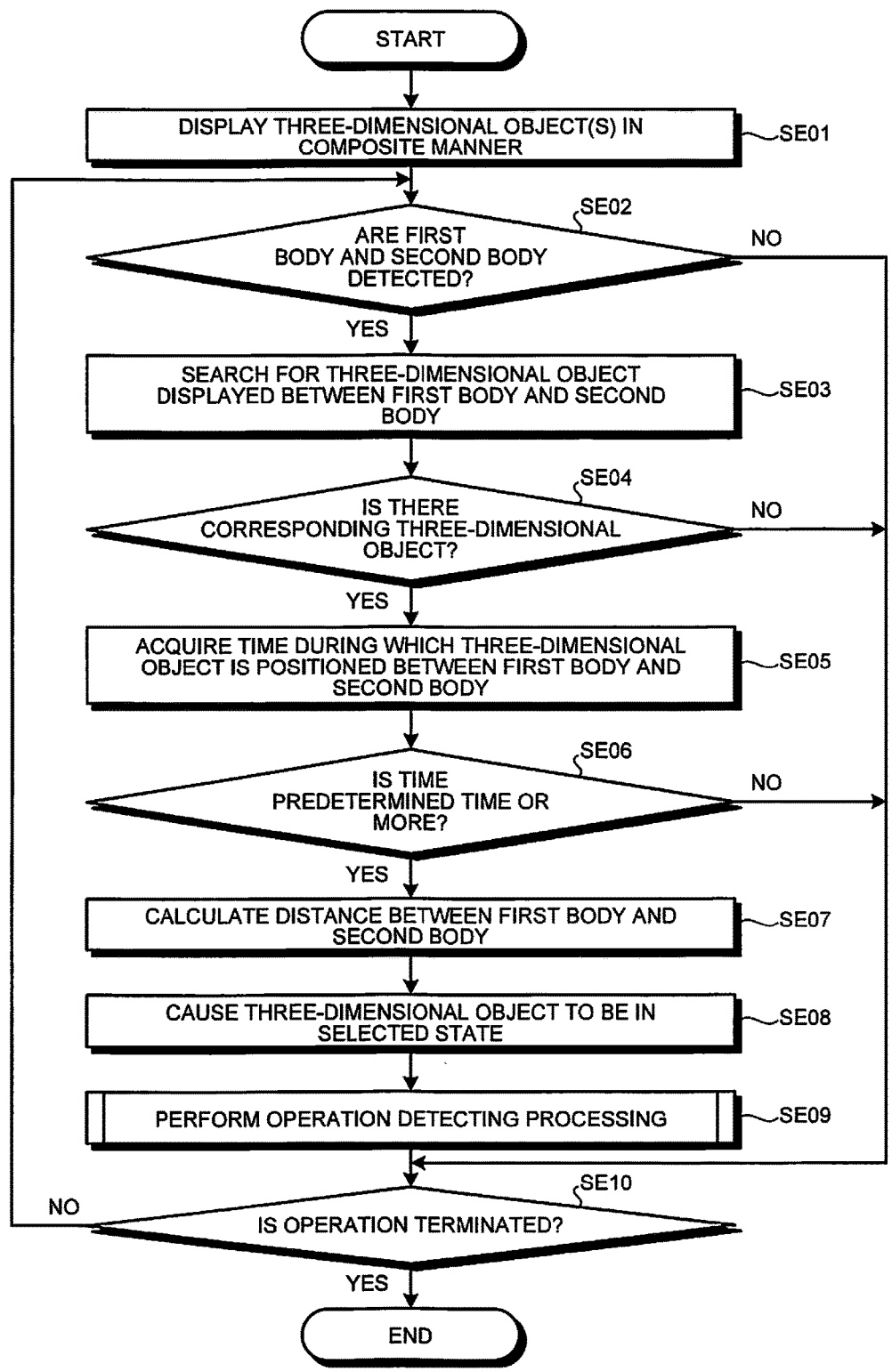
FIG. 25 is a flowchart illustrating a processing procedure of selection detecting processing in the first example.

Then, a first example of a processing procedure executed by the display device 1 in relation to the operation performed by holding the three-dimensional object will be described with reference to FIGS. 25 and 26. FIG. 25 is a flowchart illustrating a processing procedure of selection detecting processing of the three-dimensional object. The processing procedure illustrated in FIG. 25 is realized by the control unit 22 executing the control program 24a.

As illustrated in FIG. 25, first of all, at Step SE01, the control unit 22 composites and displays an image in the virtual space including the three-dimensional object(s) and an image of the real space.

Subsequently, at Step SE02, the control unit 22 determines whether a first body and a second body have been detected by the detection unit 44, that is, by the imaging units 40 and 42. The first body and the second body are real bodies, for example, fingers of the user. When the first body and the second body have not been detected (No at Step SE02), then at Step SE10, the control unit 22 determines whether operation termination has been detected.

The operation termination is detected when predetermined operation with respect to the operating unit 13 has been performed, for example. When the operation termination has been detected (Yes at Step SE10), the control unit 22 terminates the selection detecting processing. When the operation termination has not been detected (No at Step SE10), the control unit 22 re-executes Step SE02 and the subsequent steps.

When the first body and the second body have been detected (Yes at Step SE02), then at Step SE03, the control unit 22 searches the displayed three-dimensional object(s) for a three-dimensional object displayed between the first body and the second body. When there is no corresponding three-dimensional object (No at Step SE04), the control unit 22 proceeds to Step SE10.

When the three-dimensional object displayed between the first body and the second body is found (Yes at Step SE04), then at Step SE05, the control unit 22 acquires a time during which the three-dimensional object is positioned between the first body and the second body. When the acquired time is less than a predetermined time (No at Step SE06), the control unit 22 proceeds to Step SE10.

When the acquired time is the predetermined time or more (Yes at Step SE06), then at Step SE07, the control unit 22 calculates a distance between the first body and the second body. At Step SE08, the control unit 22 causes the three-dimensional object displayed between the first body and the second body to be in the selected state. Then, at Step SE09, the control unit 22 executes operation detecting processing described below, and, in the processing, changes the three-dimensional object in the selected state, according to the detected operation. After the operation detecting processing has been completed, the control unit 22 proceeds to Step SE10.

Figure 26:
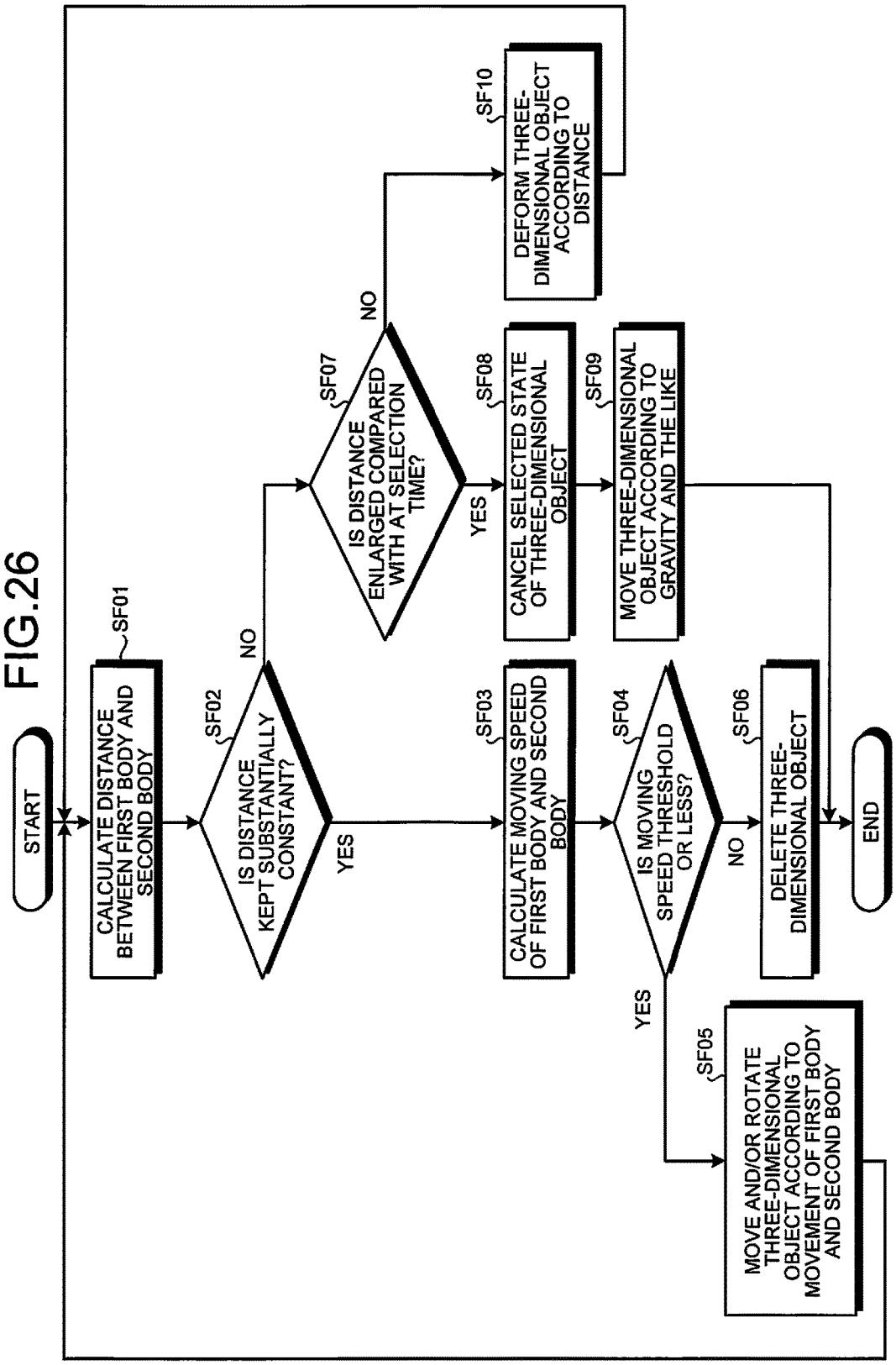
FIG. 26 is a flowchart illustrating a processing procedure of operation detecting processing in the first example.

FIG. 26 is a flowchart illustrating a processing procedure of the operation detecting processing. The processing procedure illustrated in FIG. 26 is realized by the control unit 22 executing the control program 24a.

As illustrated in FIG. 26, first of all, at Step SF01, the control unit 22 calculates a distance between the first body and the second body. Then, at Step SF02, the control unit 22 determines whether the distance between the first body and the second body at and after a start time point of the operation detecting processing is kept substantially constant. The distance being kept substantially constant means that an amount of change of the distance between the first body and the second body at the current time point falls within a predetermined range (±10% or so of a maximum amount of change of the distance when the first body and the second body are moved at a normal speed), compared with the distance at the start time point of the operation detecting processing, for example. Alternatively, when the distance between the first body and the second body is continuously reduced at and after the start time point of the operation detecting processing (when the first body and the second body are moved into a direction of squashing the three-dimensional object), the control unit 22 may determine that the distance is kept substantially constant. Further alternatively, when the distance between the first body and the second body is changed only within a range of hand shake, or the like, the control unit 22 may determine that the distance is kept substantially constant.

When the distance between the first body and the second body is kept substantially constant (Yes at Step SF02), then at Step SF03, the control unit 22 calculates a moving speed of the first body and the second body. Then, at Step SF04, the control unit 22 determines whether the calculated moving speed is a threshold or less. The threshold used here is a moving speed of a fingertip of a human when he/she throws an object. The moving speed compared with the threshold may be an average speed of the moving speeds of the first body and the second body, or may be a faster one or a slower one of the moving speeds of the first body and the second body.

When the moving speed is the threshold or less (Yes at Step SF04), then at Step SF05, the control unit 22 applies change to the three-dimensional object according to detected movement of the first body and second body. For example, when movement of the first body and the second body in the right direction is detected, the control unit 22 moves the three-dimensional object in the right direction in accordance with the movement of the first body and the second body. When left-handed rotation of the first body and the second body is detected, the control unit 22 rotates the three-dimensional object in a left-handed direction in accordance with the rotation of the first body and the second body. When the movement and the rotation have been detected at the same time, the movement and the rotation are executed at the same time. When there is an obstacle against the movement and/or the rotation of the three-dimensional object, the movement and/or the rotation of the three-dimensional object may be stopped at a time point when the three-dimensional object comes in contact to the obstacle. The obstacle may be a real body or may be another three-dimensional object. Then, the control unit 22 re-executes Step SF01 and the subsequent steps.

When the moving speed is faster than the threshold (No at Step SF04), then at Step SF06, the control unit 22 deletes the three-dimensional object. When deleting the three-dimensional object, the control unit 22 may display animation such that the three-dimensional object flies on to the moving direction of the first body and the second body. Then, the control unit 22 terminates the operation detecting processing. As described above, the three-dimensional object is deleted when the first body and the second body are moved at a high speed to throw the three-dimensional object, whereby the deletion of the three-dimensional object can be realized with intuitive operation. Instead of the operation to move the first body and the second body at a high speed, the deletion of the three-dimensional object may be allocated to operation to squash the three-dimensional object. Instead of deleting the three-dimensional object, the three-dimensional object may be put back to an initial arrangement location. The display device 1 may not perform the processing of Steps SF03, SF04, and SF06. That is, when the distance between the first body and the second body is determined to be substantially constant at Step SF02, the display device 1 may execute Step SF05 regardless of the moving speed of the two bodies.

When the distance between the first body and the second body is kept not substantially constant (No at Step SF02), then at Step SF07, the control unit 22 determines whether the distance is enlarged, compared with at the time of selecting the three-dimensional object, that is, the start time point of the operation detecting processing. When the distance is enlarged (Yes at Step SF07), then at Step SF08, the control unit 22 cancels the selected state of the three-dimensional object. The operation to enlarge the distance between the first body and the second body is similar to operation to release a held real object. Therefore, the operation is intuitive and easy to understand, as the operation for canceling the selection of the three-dimensional object.

Subsequently, at Step SF09, the control unit 22 moves the three-dimensional object, the selection state of which has been canceled, according to the gravity and the like. Then, the control unit 22 terminates the operation detecting processing. The movement here is displayed such that the three-dimensional object falls down according to the gravity, and is stopped on a floor or a table, for example. Before stopping the movement of the three-dimensional object, the control unit 22 may cause the three-dimensional object to bound according to elasticity of the three-dimensional object and hardness of the floor or the table. The control unit 22 may calculate magnitude of impact of when the three-dimensional object collides with the floor or the table, and when the impact is larger than a predetermined value, the control unit 22 may display the three-dimensional object as if it has been broken. The control unit 22 may move the three-dimensional object more slowly than the case where the actual gravity works.

When the distance between the first body and the second body is reduced, compared with at the time of selecting the three-dimensional object (No at Step SF07), then at Step SF10, the control unit 22 deforms the three-dimensional object according to the distance. Then, the control unit 22 re-executes Step SF01 and the subsequent steps. The degree of deformation of the three-dimensional object may be changed according to elasticity set to the three-dimensional object as an attribute, for example. The control unit 22 may increase the degree of deformation as the distance between the first body and the second body is reduced, regarding an object to which low hardness is set as the attribute, like the three-dimensional object that is modeled on a rubber ball. The control unit 22 may keep the degree of deformation small even if the distance between the first body and the second body is reduced, regarding an object to which high hardness is set as the attribute, like the three-dimensional object that is modeled on a block.

When the distance between the first body and the second body is reduced, compared with at the time of selecting the three-dimensional object, the display device 1 may reduce the size of the three-dimensional object, instead of deforming the three-dimensional object. When the distance between the first body and the second body becomes a predetermined value or less, the display device 1 may display the three-dimensional object, as if it has been broken.

As described above, in the first example, when the state in which the three-dimensional object is positioned between the bodies such as the fingers is continued for a predetermined time or more, the three-dimensional object is selected. Therefore, the selection of the three-dimensional object can be realized by intuitive and easily understandable operation.

Figure 27:
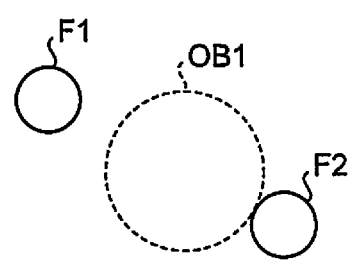
FIG. 27 is a diagram for describing a modification of the first example of detection of operation performed by holding a three-dimensional object.

As illustrated in FIG. 27, the display device 1 may employ continuance of the state in which at least one of the first body and the second body is in contact with the three-dimensional object for a predetermined time or more, as one of conditions to select the three-dimensional object. The contact to the three-dimensional object is employed as the condition of selection, whereby the user can easily select a desired three-dimensional object when a plurality of three-dimensional objects is closely displayed.

A second example of a processing procedure related to the operation performed by holding the three-dimensional object will be described. The operation detecting processing in the second example is the same as the operation detecting processing in the first example. Therefore, in the second example, description overlapping with the first example is not repeated, and the selection detecting processing will be mainly described.

First of all, detection of the operation performed by holding the three-dimensional object will be described with reference to FIG. 28. FIG. 28 is a diagram for describing detection of the operation performed by holding the three-dimensional object. At Step S51 illustrated in FIG. 28, the three-dimensional object OB1 is stereoscopically displayed in the display space. To select the three-dimensional object OB1, the user moves the finger F1 and the finger F2 such that the three-dimensional object OB1 is positioned between the finger F1 and the finger F2.

When two real bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in the selected state. Then, the display device 1 notifies the user of the fact that the three-dimensional object OB1 is in the selected state, by changing the display style of the three-dimensional object OB1, or the like.

The two bodies do not necessarily stay at the positions where the two bodies sandwich the three-dimensional object OB1, while the display device 1 is monitoring the change of the distance between the two bodies. That is, after moving the finger F1 and the finger F2 such that the three-dimensional object OB1 is positioned between the finger F1 and the finger F2 as illustrated at Step S51, the user can move the finger F1 and the finger F2 to other positions without keeping the state of the finger F1 and the finger F2.

Assume that the user has moved the finger F1 and the finger F2 from the state of Step S51 while keeping a distance D1 between the finger F1 and the finger F2 substantially constant, as illustrated at Step S52. In this case, as illustrated at Step S53, the display device 1 causes the three-dimensional object OB1 to be in the selected state at a stage where the state in which the distance D1 between the finger F1 and the finger F2 is kept substantially constant is continued for a predetermined time or more. Then, the display device 1 moves the three-dimensional object OB1 to between the finger F1 and the finger F2, as if the three-dimensional object OB1 had already been selected at the stage of Step S51. The display device 1 may store the movement of the finger F1 and the finger F2 from Steps S51 to S53, and apply rotation or the like to the three-dimensional object OB1 in accordance with the stored movement. Subsequently, the display device 1 provides change, such as movement, deformation, disappearance, or replacement, to the three-dimensional object OB1 according to the movement of the finger F1 and the finger F2.

As described above, when the two bodies are once moved to the positions where these bodies sandwich the three-dimensional object, the display device 1 allows the user to select the three-dimensional object even if these bodies do not stay at the positions thereafter, whereby the user can promptly start operation after selecting the three-dimensional object.

Figure 29:
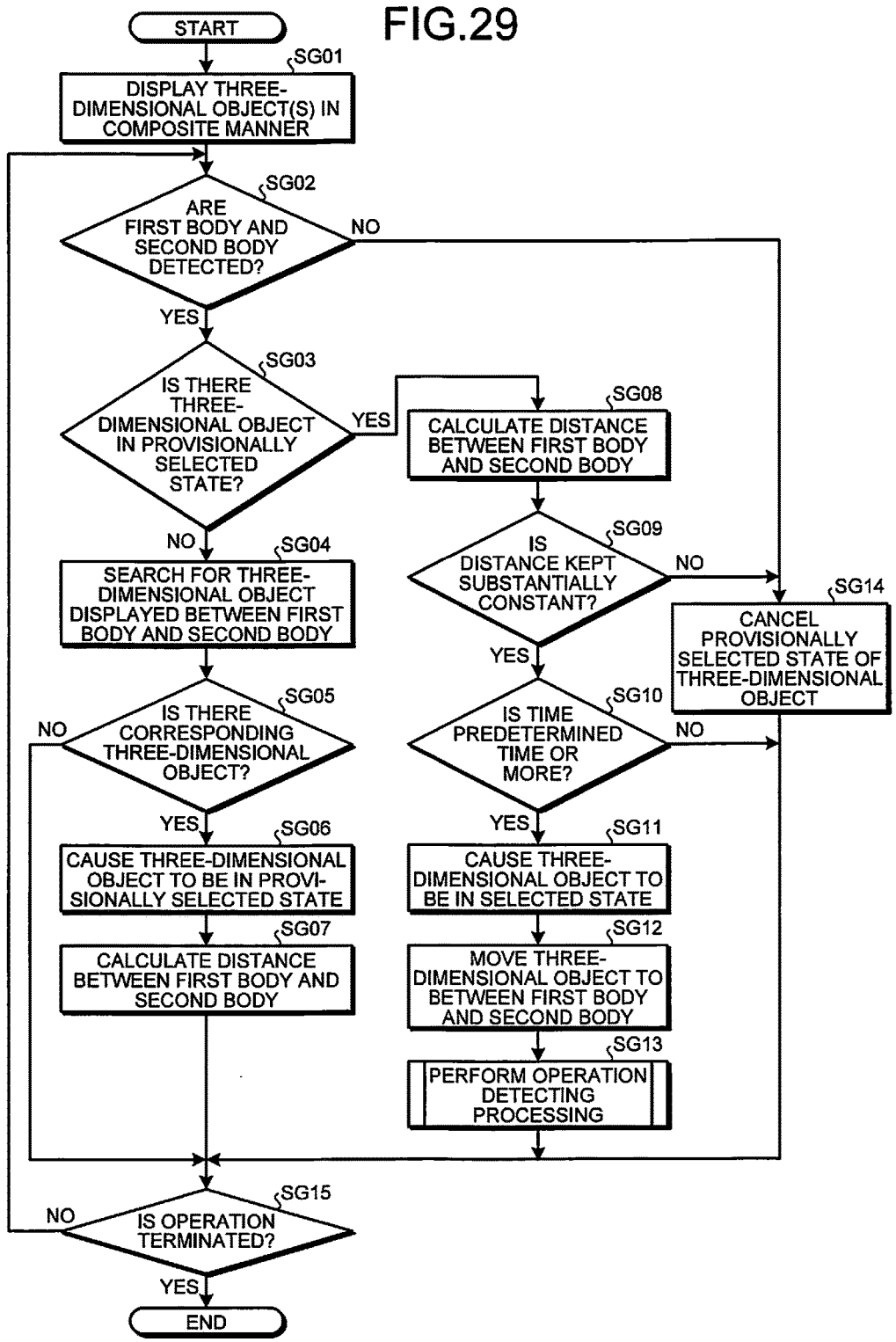
FIG. 29 is a flowchart illustrating a processing procedure of selection detecting processing in the second example.

Then, a processing procedure of the selection detecting processing in the second example will be described with reference to FIG. 29. FIG. 29 is a flowchart illustrating a processing procedure of the selection detecting processing of the three-dimensional object. The processing procedure illustrated in FIG. 29 is realized by the control unit 22 executing the control program 24a.

As illustrated in FIG. 29, first of all, at Step SG01, the control unit 22 composites and displays an image of the virtual space including the three-dimensional object(s) and an image of the real space. Subsequently, at Step SG02, the control unit 22 determines whether the first body and the second body have been detected by the detection unit 44, that is, by the imaging units 40 and 42. When the first body and the second body have not been detected (No at Step SG02), then at Step SG14, if there is a three-dimensional object in a provisionally selected state, the control unit 22 cancels the provisionally selected state of the three-dimensional object. The provisionally selected state is a state in which whether the distance between the two bodies is kept substantially constant is monitored, after the state in which the three-dimensional object is displayed between the two bodies has been detected.

Then, at Step SG15, the control unit 22 determines whether operation termination has been detected. When the operation termination has been detected (Yes at Step SG15), the control unit 22 terminates the selection detecting processing. When the operation termination has not been detected (No at Step SG15), the control unit 22 re-executes Step SG02 and the subsequent steps.

When the first body and the second body have been detected (Yes at Step SG02), then at Step SG03, the control unit 22 determines whether there is a three-dimensional object in the provisionally selected state. When there is no three-dimensional object in the provisionally selected state (No at Step SG03), then at Step SG04, the control unit 22 searches displayed three-dimensional object(s) for a three-dimensional object displayed between the first body and the second body. When there is no corresponding three-dimensional object (No at Step SG05), then the control unit 22 proceeds to Step SG15.

When the three-dimensional object displayed between the first body and the second body is found (Yes at Step SG05), then at Step SG06, the control unit 22 causes the three-dimensional object displayed between the first body and the second body to be in the provisionally selected state. At Step SG07, the control unit 22 calculates a distance between the first body and the second body. Then, the control unit 22 proceeds to Step SG15.

When the first body and the second body have been detected, and there is the three-dimensional object in the provisionally selected state (Yes at Step SG03), then at Step SG08, the control unit 22 calculates the distance between the first body and the second body. Then, at Step SG09, the control unit 22 determines whether the distance is kept substantially constant. When the distance is not kept substantially constant (No at Step SG09), then at Step SG14, the control unit 22 cancels the provisionally selected state of the three-dimensional object in the provisionally selected state. Then, the control unit 22 proceeds to Step SG15.

When the distance between the first body and the second body is kept substantially constant (Yes at Step SG09), then at Step SG10, the control unit 22 determines whether a period in which the distance is kept substantially constant is a predetermined time or more. When the period in which the distance is kept substantially constant is less than the predetermined time (No at Step SG10), the control unit 22 proceeds to Step SG15.

When the period in which the distance is kept substantially constant is the predetermined time or more (Yes at Step SG10), then at Step SG11, the control unit 22 causes the three-dimensional object displayed between the first body and the second body to be in the selected state. Further, at Step SG12, the control unit 22 moves the three-dimensional object to between the first body and the second body. Then, at Step SG13, the control unit 22 executes the operation detecting processing illustrated in FIG. 26, and in the processing, changes the three-dimensional object in the selected state according to the detected operation. After the operation detecting processing is completed, the control unit 22 proceeds to Step SG15.

As described above, in the second example, when the three-dimensional object is positioned between the bodies such as the fingers, and thereafter the distance between the bodies is kept substantially constant for a predetermined time or more, the three-dimensional object is selected. Therefore, the user can promptly start operation after selecting the three-dimensional object.

As illustrated in Steps S61 to S63 of FIG. 30, the display device 1 may employ keeping the distance between the first body and the second body substantially constant for a predetermined time or more after at least one of the first body and the second body comes in contact with the three-dimensional object, as one of conditions to select the three-dimensional object. The contact to the three-dimensional object is employed as one of conditions of selection, whereby the user can easily select a desired three-dimensional object when a plurality of three-dimensional objects is closely displayed.

A third example of a processing procedure related to the operation performed by holding the three-dimensional object will be described. In the third example, description overlapping with the first example is not repeated, and the selection detecting processing and the operation detecting processing will be mainly described.

First of all, detection of the operation performed by holding the three-dimensional object will be described with reference to FIGS. 31 and 32. At Step S71 illustrated in FIG. 31, the three-dimensional object OB1 is stereoscopically displayed in the display space. Further, to select the three-dimensional object OB1, the user moves the finger F1 and the finger F2 such that the three-dimensional object OB1 is positioned between the finger F1 and the finger F2.

When two real bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in the selected state. Then, the display device 1 notifies the user of the fact that the three-dimensional object OB1 is in the selected state, by changing the display style of the three-dimensional object OB1, or the like.

The two bodies do not necessarily stay at the positions where the two bodies sandwich the three-dimensional object OB1, while the display device 1 is monitoring the change of the distance between the two bodies. That is, after moving the finger F1 and the finger F2 such that the three-dimensional object OB1 is positioned between the finger F1 and the finger F2 as illustrated at Step S71, the user can move the finger F1 and the finger F2 to other positions without keeping the state of the finger F1 and the finger F2.

Assume that the user has moved the finger F1 and the finger F2 from the state of Step S71 while keeping a distance D1 between the finger F1 and the finger F2 substantially constant, as illustrated at Step S72. In this case, the display device 1 applies change, such as movement, deformation, disappearance, or replacement, to the three-dimensional object OB1, according to movement of the finger F1 and the finger F2, from at a stage where it is detected that the three-dimensional object OB1 is displayed between the finger F1 and the finger F2, that is, from at a stage of Step S71. Then, as illustrated at Step S73, the display device 1 causes the three-dimensional object OB1 to be in a selected state, at a stage where the state in which the distance D1 between the finger F1 and the finger F2 is kept substantially constant is continued for a predetermined time or more.

As illustrated in Step S74 of FIG. 32, when the distance D1 between the finger F1 and the finger F2 is enlarged before the predetermined time elapses, that is, when selection has not been performed, the display device 1 applies reverse change to the change applied by that time, to the three-dimensional object OB1. As a result, the three-dimensional object OB1 is displayed at the same position in the same state as the stage of Step S71. The speed to apply the reverse change to the three-dimensional object OB1 may be faster than the speed at which the change to the three-dimensional object OB1 had been applied by that time. That is, the display device 1 may reversely change the three-dimensional object OB1 as if the three-dimensional object OB1 is reversely reproduced at a high speed.

As described above, the display device 1 starts applying the change to the three-dimensional object from at the stage where it is detected that the three-dimensional object is displayed between the two bodies, whereby the user can recognize that the three-dimensional object is getting selected before the selection is determined. As a result, the user can recognize whether the intended three-dimensional object has been selected at an early stage. Until the state in which the distance between the two bodies is kept substantially constant is continued for the predetermined time or more, the display device 1 may display the three-dimensional object, to which the change is applied, in a different style (for example, translucently) from a normal time or from the selected state, thereby to allow the user to be able to easily discriminate a state of the three-dimensional object.

Figure 33:
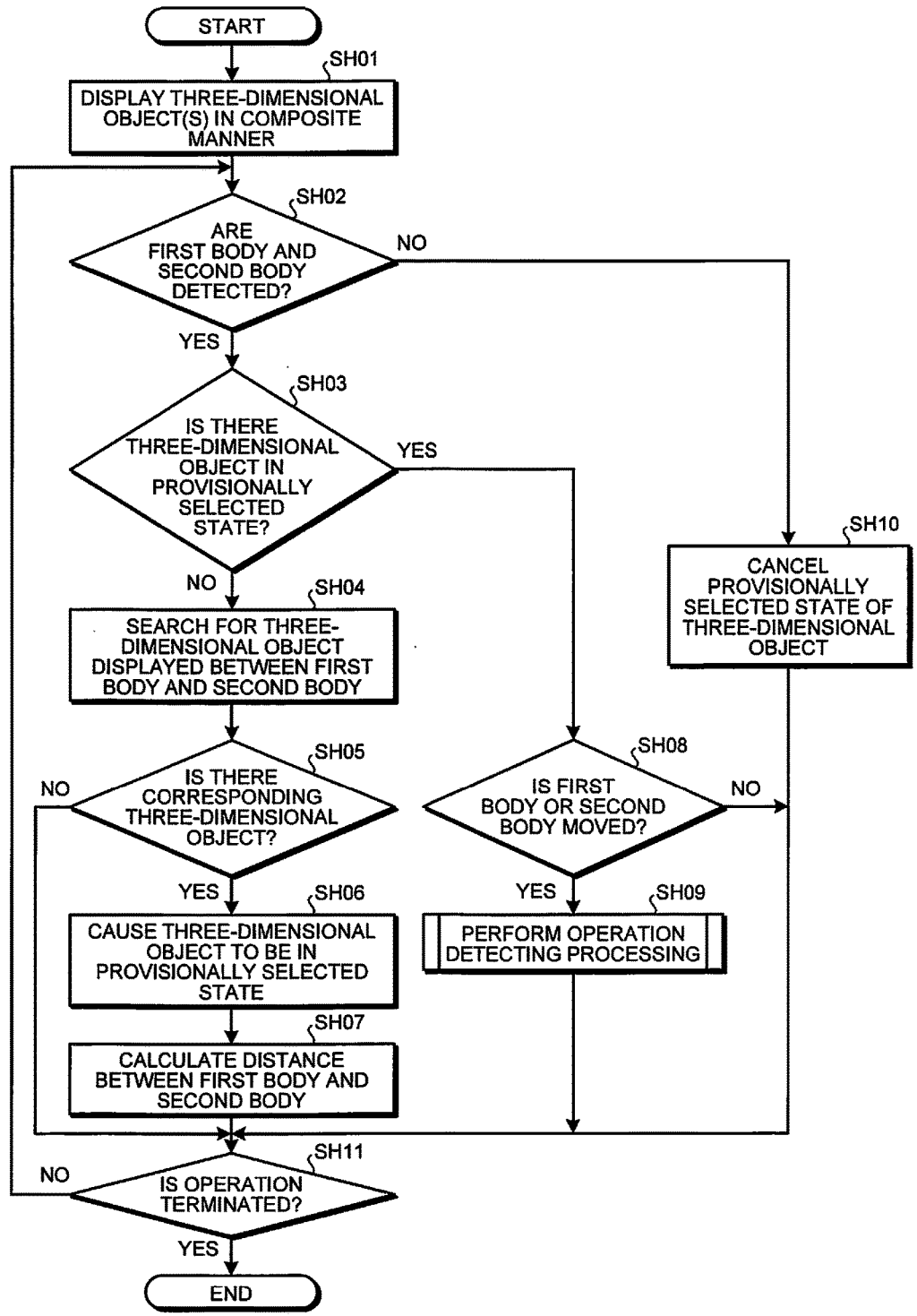
FIG. 33 is a flowchart illustrating a processing procedure of selection detecting processing in the third example.

Then, a processing procedure executed by the display device 1 in relation to the operation performed by holding the three-dimensional object will be described with reference to FIGS. 33 and 34. FIG. 33 is a flowchart illustrating a processing procedure of the selection detecting processing of the three-dimensional object. The processing procedure illustrated in FIG. 33 is realized by the control unit 22 executing the control program 24a.

As illustrated in FIG. 33, first of all, at Step SH01, the control unit 22 composites and displays an image of the virtual space including the three-dimensional object(s) and an image of the real space. Subsequently, at Step SH02, the control unit 22 determines whether the first body and the second body have been detected by the detection unit 44, that is, by the imaging units 40 and 42. When the first body and the second body have not been detected (No at Step SH02), then at Step SH10, if there is a three-dimensional object in a provisionally selected state, the control unit 22 cancels the provisionally selected state of the three-dimensional object.

Then, at Step SH11, the control unit 22 determines whether operation termination has been detected. When the operation termination has been detected (Yes at Step SH11), the control unit 22 terminates the selection detecting processing. When the operation termination has not been detected (No at Step SH11), the control unit 22 re-executes Step SH02 and the subsequent steps.

When the first body and the second body have been detected (Yes at Step SH02), then at Step SH03, the control unit 22 determines whether there is a three-dimensional object in the provisionally selected state. When there is no three-dimensional object in the provisionally selected state (No at Step SH03), then at Step SH04, the control unit 22 searches displayed three-dimensional object(s) for a three-dimensional object displayed between the first body and the second body. When there is no corresponding three-dimensional object (No at Step SH05), the control unit 22 proceeds to Step SH11.

When the three-dimensional object displayed between the first body and the second body is found (Yes at Step SH05), then at Step SH06, the control unit 22 causes the three-dimensional object displayed between the first body and the second body to be in the provisionally selected state. At Step SH07, the control unit 22 calculates the distance between the first body and the second body. Then, the control unit 22 proceeds to Step SH11.

When the first body and the second body have been detected, and there is the three-dimensional object in the provisionally selected state (Yes at Step SH03), then at Step SH08, the control unit 22 determines whether at least one of the first body and the second body has been moved. When both of the first body and the second body has not been moved (No at Step SH08), the control unit 22 proceeds to Step SH11.

Figure 34:
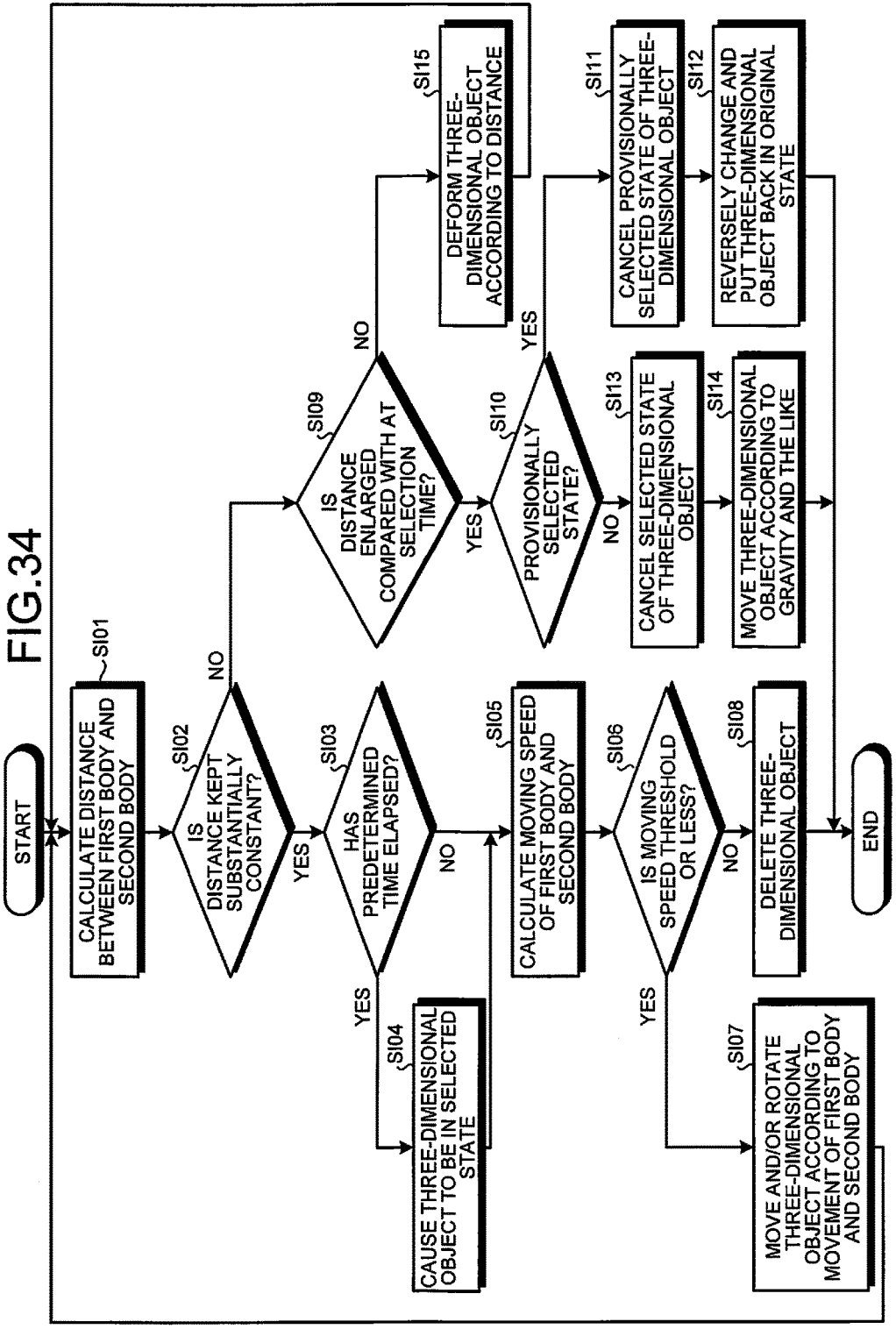
FIG. 34 is a flowchart illustrating a processing procedure of operation detecting processing in the third example.

When at least one of the first body and the second body has been moved (Yes at Step SH08), then at Step SH09, the control unit 22 executes the operation detecting processing illustrated in FIG. 34, and in the processing, changes the three-dimensional object in the selected state, according to the detected operation. After the operation detecting processing is completed, the control unit 22 proceeds to Step SH11.

FIG. 34 is a flowchart illustrating a processing procedure of the operation detecting processing. The processing procedure illustrated in FIG. 34 is realized by the control unit 22 executing the control program 24a. As illustrated in FIG. 34, first of all, at Step SI01, the control unit 22 calculates the distance between the first body and the second body. Then, at Step SI02, the control unit 22 determines whether the distance between the first body and the second body at and after the start time point of the operation detecting processing is kept substantially constant.

When the distance between the first body and the second body is kept substantially constant (Yes at Step SI02), then at Step SI03, the control unit 22 determines whether a predetermined time has elapsed after the operation detecting processing is started. When the predetermined time has elapsed (Yes at Step SI03), then at Step SI04, if there is a three-dimensional object in the provisionally selected state, the control unit 22 causes the three-dimensional object to be in the selected state. When the predetermined time has not elapsed (No at Step SI03), Step SI04 is not executed.

Subsequently, at Step SI05, the control unit 22 calculates the moving speed of the first body and the second body. Then, at Step SI06, the control unit 22 determines whether the calculated moving speed is a threshold or less. When the moving speed is the threshold or less (Yes at Step SI06), then at Step SI07, the control unit 22 moves and/or rotates the three-dimensional object, according to the detected movement of the first body and the second body. Then, the control unit 22 re-executes Step SI01 and the subsequent steps.

When the moving speed is faster than the threshold (No at Step SI06), then at Step SI08, the control unit 22 deletes the three-dimensional object. In deleting the three-dimensional object, the control unit 22 may display animation such that the three-dimensional object flies on to the moving direction of the first body and the second body. Then, the control unit 22 terminates the operation detecting processing. Instead of the operation to move the first body and the second body at a high speed, the deletion of the three-dimensional object may be allocated to operation to squash the three-dimensional object. Instead of the deletion of the three-dimensional object, the three-dimensional object may be put back to an initial arrangement location. The display device 1 may not perform the processing of Steps SI05, SI06, and SI08. That is, the display device 1 may execute Step SI07 regardless of the moving speed of the two bodies after determining "No" at Step SI03 or executing Step SI04.

When the distance between the first body and the second body is not kept substantially constant (No at Step SI02), then at Step SI09, the control unit 22 determines whether the distance is enlarged, compared with at the time of selecting the three-dimensional object, that is, the start time point of the operation detecting processing. When the distance is enlarged (Yes at Step SI09), then at Step SI10, the control unit 22 determines whether the three-dimensional object displayed between the first body and the second body is in the provisionally selected state.

When the three-dimensional object is in the provisionally selected state (Yes at Step SI10), then at Step SI11, the control unit 22 cancels the provisionally selected state of the three-dimensional object. Further, at Step SI12, the control unit 22 reversely changes and puts the three-dimensional object back in the original state. Then, the control unit 22 terminates the operation detecting processing.

When the three-dimensional object is not in the provisionally selected state, that is, the three-dimensional object is in the selected state (No at Step SI10), then at Step SI13, the control unit 22 cancels the selected state of the three-dimensional object. Then, at Step SI14, the control unit 22 moves the three-dimensional object, the selection state of which has been canceled, according to the gravity, and the like. Then, the control unit 22 terminates the operation detecting processing. The movement here is displayed such that the three-dimensional object falls down according to the gravity, and is stopped on a floor or a table, for example. Before stopping the movement of the three-dimensional object, the control unit 22 may cause the three-dimensional object to bound according to elasticity of the three-dimensional object and hardness of the floor or the table. The control unit 22 may calculate magnitude of impact of when the three-dimensional object collides with the floor or the table, and when the impact is larger than a predetermined value, the control unit 22 may display the three-dimensional object as if it has been broken. The control unit 22 may move the three-dimensional object more slowly than the case where the actual gravity works.

When the distance between the first body and the second body is reduced, compared with at the time of selecting the three-dimensional object (No at Step SI09), then at Step SI15, the control unit 22 deforms the three-dimensional object according to the distance. Then, the control unit 22 re-executes Step SI01 and the subsequent steps. The degree of deforming the three-dimensional object may be changed according to the hardness set to the three-dimensional object, as an attribute.

As described above, in the third example, from the time point when the three-dimensional object positioned between the bodies such as the fingers is detected, the three-dimensional object is changed according to the operation. Therefore, the user can easily recognize the selection of the three-dimensional object.

As illustrated in Steps S81 to S83 in FIG. 35, keeping the distance between the first body and the second body substantially constant for a predetermined time or more, after at least one of the first body and the second body comes in contact with the three-dimensional object, may be employed as one of conditions to select the three-dimensional object. The contact to the three-dimensional object is employed as one of conditions of selection, whereby the user can easily select a desired three-dimensional object when a plurality of three-dimensional objects is closely displayed.

The display device 1 described in the above embodiment can be applied to various uses. The three-dimensional object (display item) that is an object to be operated may be an object that is modeled on a thing that actually exists, such as a book, a block, a spoon, chopsticks, trumps, clay, or a musical instrument, or may be an object that does not actually exist, such as a virtual avatar, a character in a game, or a virtual reality AR tag. Further, the change applied to the three-dimensional object according to the detected operation is not limited to the movement, deformation, disappearance, replacement, or the like. The change applied to the three-dimensional object according to the pressing operation is not limited to the embodiment, and the three-dimensional object may be changed depending on the type of the three-dimensional object.

For example, when the three-dimensional object that is modeled on clay (hereinafter, simply referred to as "clay") is used as the object to be operated, the clay may be deformed according to the pressing operation, and the user may be allowed to form the clay into an arbitrary shape. The clay may be hardened as if the clay would be dried with time. The viscosity of the clay may be decreased when operation to press the clay with a finger or a hand, which has been put in the three-dimensional object of water, has been detected.

When the three-dimensional object that is modeled on a record (hereinafter, simply referred to as "record") is used as the object to be operated, the record may be rotated around a fulcrum according to the pressing operation, and the sound may be reproduced. A technique by a disk jockey, such as scratch, may be virtually realized by having rotation in conjunction with reproduction of the sound.

Embodiment 2

In Embodiment 1, the method of detecting the operation by the display device to the three-dimensional object, and applying the change to the three-dimensional object according to the detected operation has been described. In Embodiment 2 below, examples of applying the method described in Embodiment 1 to a case where a spreadsheet application is executed in a three-dimensional virtual space, for example, will be described.

Figure 36:
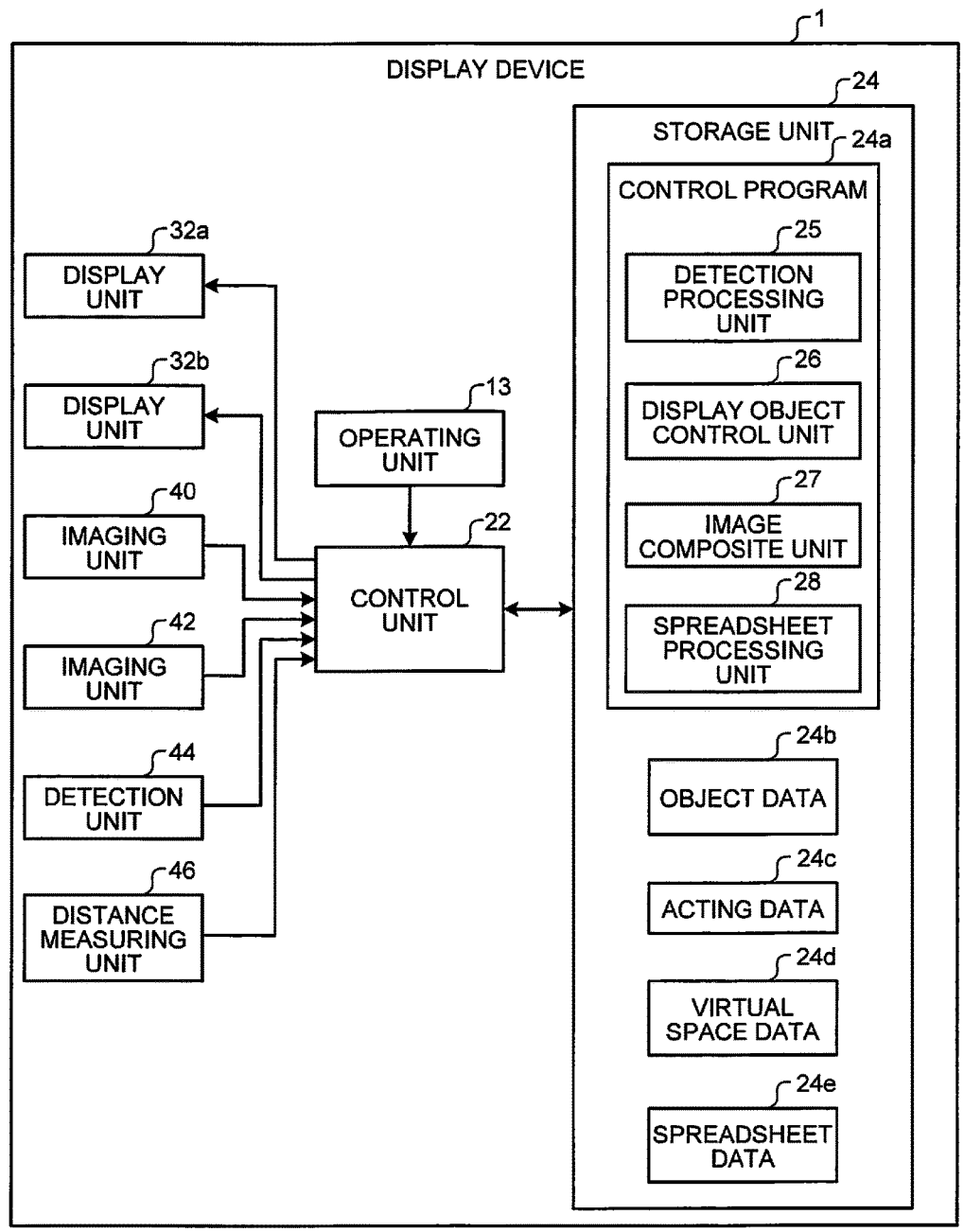
FIG. 36 is a block diagram of a display device according to a second embodiment.

A functional configuration of a display device 1 will be described with reference to FIG. 36. FIG. 36 is a block diagram of the display device 1 according to the second embodiment. The functional configuration of the display device 1 according to the second embodiment is basically similar to that of the first embodiment (FIG. 6), except for points described below.

A control program 24a stored in a storage unit 24 includes, similarly to the first embodiment, a detection processing unit 25, a display object control unit 26, and an image composite unit 27. In addition, a spreadsheet processing unit 28 is further included. Examples of data stored in the storage unit 24 include object data 24b, acting data 24c, and virtual space data 24d. In addition, spreadsheet data 24e is further included.

The spreadsheet processing unit 28 provides a function for realizing processing related to spreadsheet such as tabulation, calculation, and analysis of numerical data. The spreadsheet processing unit 28 displays a worksheet for performing the processing related to spreadsheet. The spreadsheet processing unit 28 realizes the processing related to spreadsheet according to operation detected with respect to a worksheet. In the worksheet, a plurality of lattice-like cells is arranged in a matrix manner. The operation detected with respect to a worksheet includes operation with respect to a cell.

Figure 37:
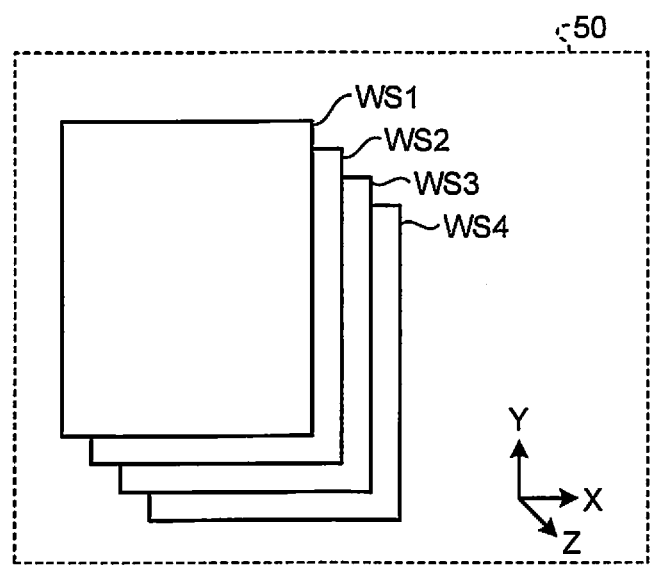
FIG. 37 is a diagram illustrating a state of worksheets displayed in a display space as viewed from a user.
Figure 38:
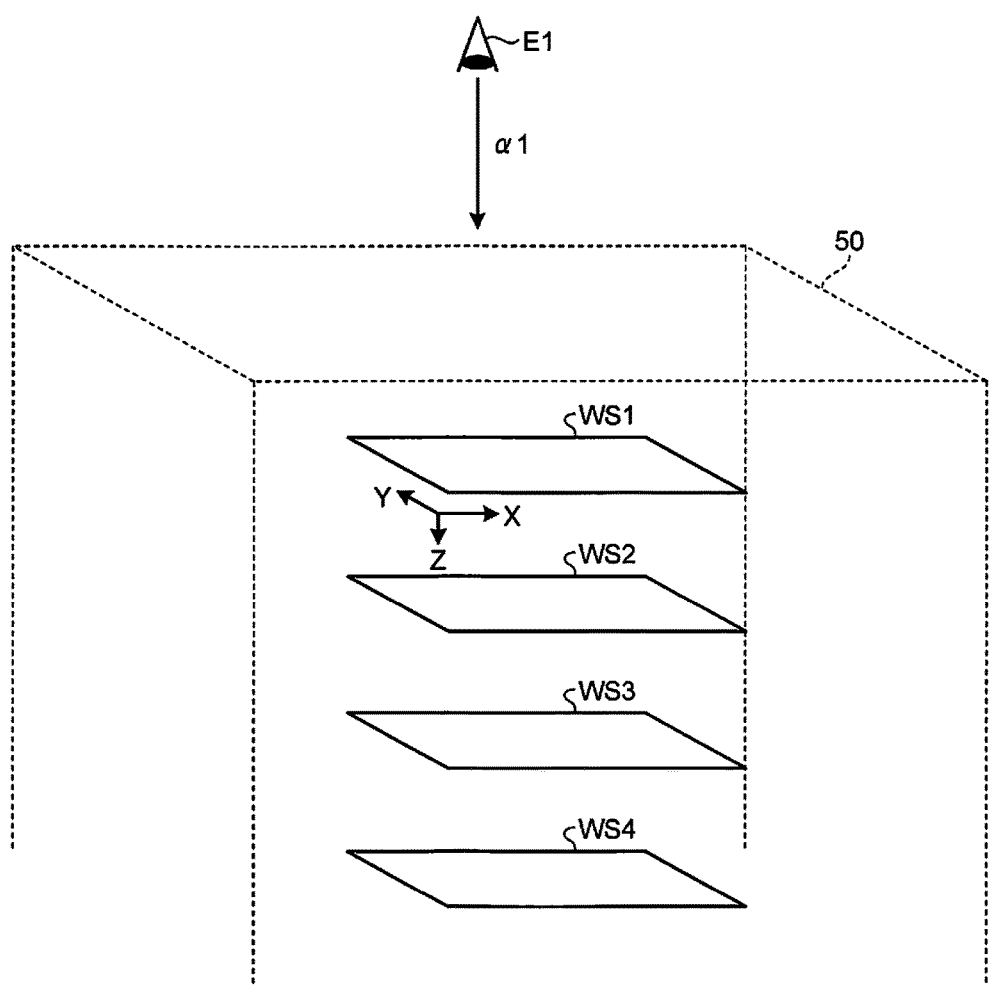
FIG. 38 is a diagram for describing three-dimensional positional relationship among the worksheets displayed in the display space.

A rule for determining processing details by the spreadsheet processing unit 28 will be described with reference to FIGS. 37 to 39. FIG. 37 is a diagram illustrating a state of worksheets displayed in a display space as viewed by a user. FIG. 38 is a diagram for describing three-dimensional positional relationship among worksheets displayed in the display space. E1 illustrated in FIG. 38 represents an eye of the user.

As illustrated in FIG. 37, the user can see four worksheets WS1 to WS4 being layered with the worksheet WS1 as the forefront. That is, as illustrated in FIG. 38, the user recognizes a display space 50 as a space having a depth in a Z-axis direction parallel to a user's eye direction a1. Then, as illustrated in FIG. 38, the user recognizes that there is the worksheet WS1 in foremost position as viewed from the user, the worksheet WS2 in the back of the worksheet WS1, the worksheet WS3 in the back of the worksheet WS2, and the worksheet WS4 in the back of the worksheet WS3. In the description below, when a direction is described as the Z-axis direction, the direction is not limited to either a direction from the user toward a depth side of the display space 50, or a direction from the depth side of the display space 50 toward the user. When the direction is described as the Z-axis direction (+), the direction is a direction toward the depth side of the display space 50, being away from the user, and means an opposite direction to a direction toward the origin of a three-dimensional coordinate system. When a direction is described as an X-axis direction, the direction means at least a direction parallel to an X axis. When a direction is described as the Y-axis direction, the direction means at least a direction parallel to a Y axis. When the direction is described as the Y-axis direction (+), the direction means an opposite direction to the direction toward the origin of the three-dimensional coordinate system. When the direction is described as the Y-axis direction (−), the direction means a direction toward the origin of the three-dimensional coordinate system.

FIG. 39 is a diagram illustrating one of examples of processing determination rules in which the operation detected with respect to a worksheet, and a processing included in the processings related to spreadsheet are associated with each other in advance. The spreadsheet processing unit 28 determines a processing to be executed according to the operation detected with respect to a worksheet, based on the processing determination rule illustrated in FIG. 39, and executes the determined processing.

In a rule No. 1 illustrated in FIG. 39, detected operation of "move a finger in the Z-axis direction", and a processing of "switch a worksheet corresponding to the position of the finger to be in a state in which the processing is effective" are associated with each other.

In a rule No. 2 illustrated in FIG. 39, detected operation of "push a worksheet with a palm", and a processing of "delete data of the corresponding worksheet" are associated with each other.

In a rule No. 3 illustrated in FIG. 39, detected operation of "hold a cell and move the cell in the Z-axis direction", and a processing of "overwrite a corresponding cell of another worksheet with the data of the held cell" are associated with each other.

In a rule No. 4 illustrated in FIG. 39, detected operation of "move two held cells in the X-axis direction and cause the two cells to collide with each other", and a processing of "multiply numerical data of the cells" are associated with each other.

In a rule No. 5 illustrated in FIG. 39, detected operation of "move two held cells in the Y-axis direction and cause the two cells to collide with each other", and a processing of "divide the numerical data of the cell in the Y-axis direction (+) by the numerical data of the cell in the Y-axis direction (−)" are associated with each other.

In a rule No. 6 illustrated in FIG. 39, detected operation of "lay a piece of worksheet cut off from a first worksheet over a second worksheet", and a processing of "delete data of cells corresponding to the cut-off piece in the first worksheet, and update data of cells of the second worksheet over which the cut-off piece is laid" are associated with each other.

In a rule No. 7 illustrated in FIG. 39, detected operation of "move two fingers from a state where the two fingers are separated and cause the two fingers to come in contact with each other", and a processing of "delete information of cells surrounded by the two fingers before movement" are associated with each other.

In a rule No. 8 illustrated in FIG. 39, detected operation of "move two fingers while keeping a state in which the two fingers are separated", and a processing operation of "copy information of cells surrounded by the two fingers before movement to cells surrounded by the two fingers after movement" are associated with each other.

In a rule No. 9 illustrated in FIG. 39, detected operation of "hold a cell and move the cell in the X-axis direction", and a processing of "change a worksheet in the back of the held worksheet to be in a visible state" are associated with each other.

The processing determination rules in FIG. 39 are exemplarily illustrated. Types of the detected operation and details of the processing associated with the operation are not limited to the examples illustrated in FIG. 39, and may be added, changed, or deleted.

Change of a display style of a worksheet according to the operation detected with respect to the worksheet is realized based on the functions provided by the detection processing unit 25, the display object control unit 26, and the image composite unit 27, the object data 24b, the acting data 24c, and the virtual space data 24d.

The detection processing unit 25 provides a function to detect a real body existing in image ranges of imaging units 40 and 42, similarly to the first embodiment. Examples of the function provided by the detection processing unit 25 include a function to measure a distance to each detected body. In the second embodiment, the detection processing unit 25 mainly detects a hand or a finger of a user, and measures the distance to the detected hand or finger of the user.

The display object control unit 26 provides, similarly to the first embodiment, a function to manage what kind of three-dimensional object is arranged in a virtual space, and in what state each three-dimensional object is. Examples of the function provided by the display object control unit 26 include a function to detect operation with respect to the three-dimensional object, based on movement of the real body detected by the function of the detection processing unit 25, and to change the three-dimensional object, based on the detected operation. In the second embodiment, the display object control unit 26 mainly detects the operation with respect to a worksheet, based on the movement of the hand of the user detected by the function of the detection processing unit 25, and changes the display style of the worksheet, based on the detected operation.

The image composite unit 27 provides a function to generate an image to be displayed in a display unit 32a and an image to be displayed in a display unit 32b, by compositing an image in a real space and an image in the virtual space, similarly to the first embodiment. Examples of the function provided by the image composite unit 27 include a function to determine front and rear relationship between the real body and the three-dimensional object, based on the distance to the real body measured by the function of the detection processing unit 25, and the distance from a view point to the three-dimensional object in the virtual space, and to adjust overlapping. In the second embodiment, the image composite unit 27 mainly determines the front and rear relationship between the hand of the user and a worksheet, based on the distance to the hand of the user detected by the function of the detection processing unit 25, and the distance from the view point to the worksheet in the virtual space, and adjusts overlapping.

In the second embodiment, the object data 24b is used for displaying the worksheet as the three-dimensional object, for example. In the second embodiment, information including a type, shape information, a color, the degree of transparency, and the like of the worksheet is stored in the object data 24b. The type indicates a physical property of the worksheet. The type takes a value of a "rigid body", an "elastic body", or the like, for example. The shape information is information indicating the shape of the worksheet. The shape information is a collection of vertex coordinates of faces that configure the worksheet. The color is a color of a surface of the worksheet. The degree of transparency is the degree at which the worksheet transmits light.

In the second embodiment, the acting data 24c is used to determine how to change the display style of the worksheet when the operation to the worksheet displayed as the three-dimensional object is detected. Examples of the change referred to here include switching of display, disappearance, replacement, movement, rotation, and deformation of the worksheet, and disappearance, reproduction, enlargement, reduction, deformation, and the like of a cell on the worksheet. The replacement of the worksheet may be executed by performing of movement to strike a first cell on a worksheet and a second cell on another worksheet against each other. By performing of the movement to strike the first cell and the second cell against each other, a numerical value described in the first cell and a numerical value described in the second cell may be calculated (multiplied or divided), or the numerical values described in the both cells may be interchanged, instead.

In the second embodiment, the virtual space data 24d holds information related to a state of the worksheet displayed as the three-dimensional object. Examples of the state of the worksheet include a position, an attitude, and a status of deformation.

The spreadsheet data 24e stores configuration information of the worksheet, data held in the worksheet, and data related to various types of processings executed on the worksheet by the spreadsheet processing unit 28.

Hereinafter, various types of control based on functions provided by the control program 24a according to the second embodiment will be described. Examples of the various types of control based on functions provided by the control program 24a according to the second embodiment include control to execute a processing related to spreadsheet determined by the rule according to the operation detected with respect to the worksheet, and control to change the display style of the worksheet according to the operation detected with respect to the worksheet.

Figure 40:
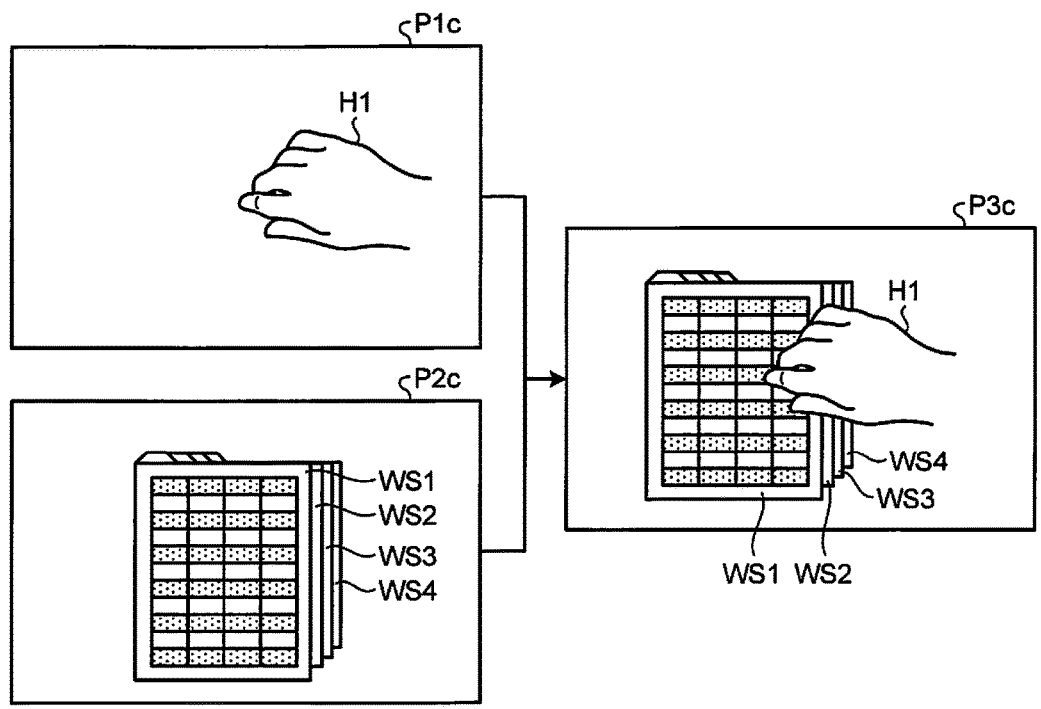
FIG. 40 is a diagram for describing composition of images according to the second embodiment.

FIG. 40 is a diagram for describing composition of images according to the second embodiment. An image P1c is an image obtained by the imaging unit 40, that is, an image corresponding to a scene that the real space viewed by a right eye. A hand H1 of the user appears in the image P1c. Illustration of images other than the hand H1 of the user is omitted in the image P1c, for convenience of description. The display device 1 also acquires an image of the same scene imaged by the imaging unit 42, that is, an image corresponding to a scene that the real space is viewed by a left eye.

An image P2c is an image for the right eye generated based on the virtual space data 24d and the object data 24b. The display device 1 reproduces the virtual space, based on these pieces of information, and generates the image P2c of the reproduced virtual space as viewed from a view point of the right eye. The position of the right eye (view point) in the virtual space is determined based on a predetermined rule. Similarly, the display device 1 generates an image of the reproduced virtual space as viewed from a view point of the left eye. That is, the display device 1 also generates an image that causes worksheets to be three-dimensionally displayed in combination with the image P2c.

The display device 1 composites the image P1c and the image P2c to generate an image P3c, as illustrated in FIG. 40. The image P3c is an image to be displayed in the display unit 32a, as an image for the right eye. At this time, the display device 1 determines front and rear relationship between the hand H1 of the user existing as a real body in the image range of the imaging unit 40, and the worksheets existing as the three-dimensional objects in the virtual space, using the position of the right eye of the user as a reference point. Then, when the hand H1 of the user and the worksheets overlap with each other, the display device 1 adjusts overlapping such that one closer to the right eye of the user can be seen in front. Such adjustment of overlapping is performed by a method similar to the first embodiment.

With the adjustment of overlapping, as illustrated in FIG. 40, the image P3c that can be seen as if the four worksheets WS1 to WS4 exist in the air, and the hand H1 of the user was placed on the worksheet WS1 is obtained. The display device 1 composites the image captured by the imaging unit 42 and the image of the virtual space as viewed from the view point of the left eye to generate an image to be displayed in the display unit 32b as an image for the left eye, by similar processing. When the image for the left eye is generated, the overlapping of the hand H1 of the user and the worksheets is adjusted using the position of the left eye of the user as a reference point.

The display device 1 displays the composite images generated as described above, in the display units 32a and 32b. As a result, the user recognizes the display space 50 (see FIG. 38) having the depth in the Z-axis direction parallel to the user's eye direction al, and can see a scene that can be seen as if the worksheet WS1 in foremost position as viewed from the user, the worksheet WS2 in the back of the worksheet WS1, the worksheet WS3 in the back of the worksheet WS2, and the worksheet WS4 in the back of the worksheet WS3 float in the air.

Figure 41:
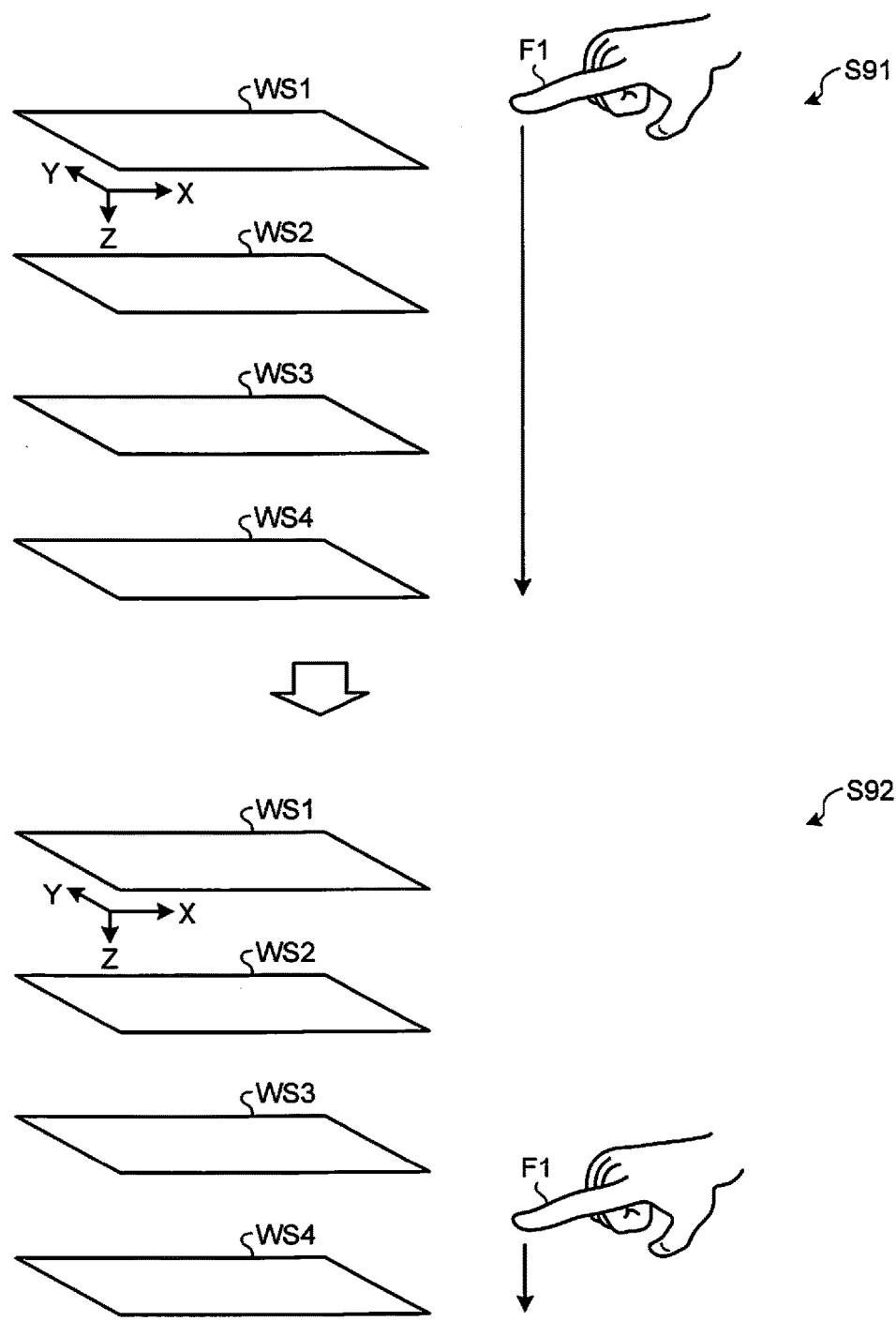
FIG. 41 is a diagram illustrating positional relationship between a finger of the user and the worksheets.
Figure 42:
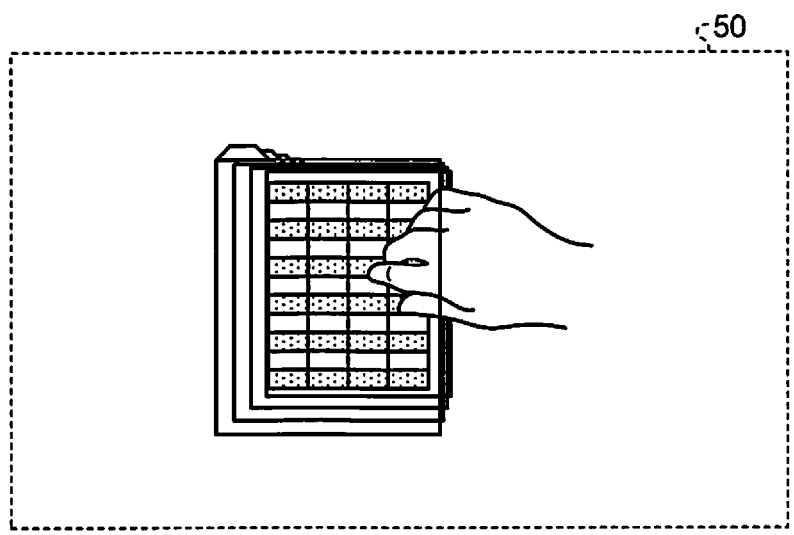
FIG. 42 is a diagram illustrating one of display examples of the worksheets corresponding to Step S92 of FIG. 41.

Then, switching of worksheets according to the position of the finger of the user moving in the Z-axis direction will be described with reference to FIGS. 41 and 42. FIG. 41 is a diagram illustrating positional relationship between the finger of the user and the worksheets. FIG. 42 is a diagram illustrating one of display examples of the worksheets corresponding to Step S92 of FIG. 41.

For example, as illustrated in Step S91 of FIG. 41, when a finger F1 of the user is positioned above the worksheet WS1, in the Z-axis direction, the display device 1 stereoscopically displays the worksheet WS1 in the display space 50 in a visible state by the user (for example, see FIG. 40).

As illustrated in Step S92 of FIG. 41, when the finger F1 of the user is moved in the Z-axis direction (+) and the finger F1 of the user after movement is positioned between the worksheet WS3 and the worksheet WS4, the display device 1 stereoscopically displays the worksheet WS4 in the display space 50 in the visible state by the user. For example, as illustrated in FIG. 42, the display device 1 displays only the worksheet WS4 in the visible state by the user as if the worksheet WS4 (see FIG. 40) is seen through the worksheets WS1 to WS3 (see FIG. 40). To be specific, for example, when the finger F1 of the user is continuously positioned between the worksheet WS3 and the worksheet WS4 for a predetermined time or more, the display device 1 determines to display the worksheet WS4 positioned below the worksheet WS3, in the visible state, based on the Z-axis direction (+).

At the same time, the display device 1 updates the data stored in the spreadsheet data 24e, based on the rule No. 1 illustrated in FIG. 39. That is, the display device 1 executes a processing of switching the worksheet WS4 displayed in the visible state, to the state in which the processing is effective.

Figure 43:
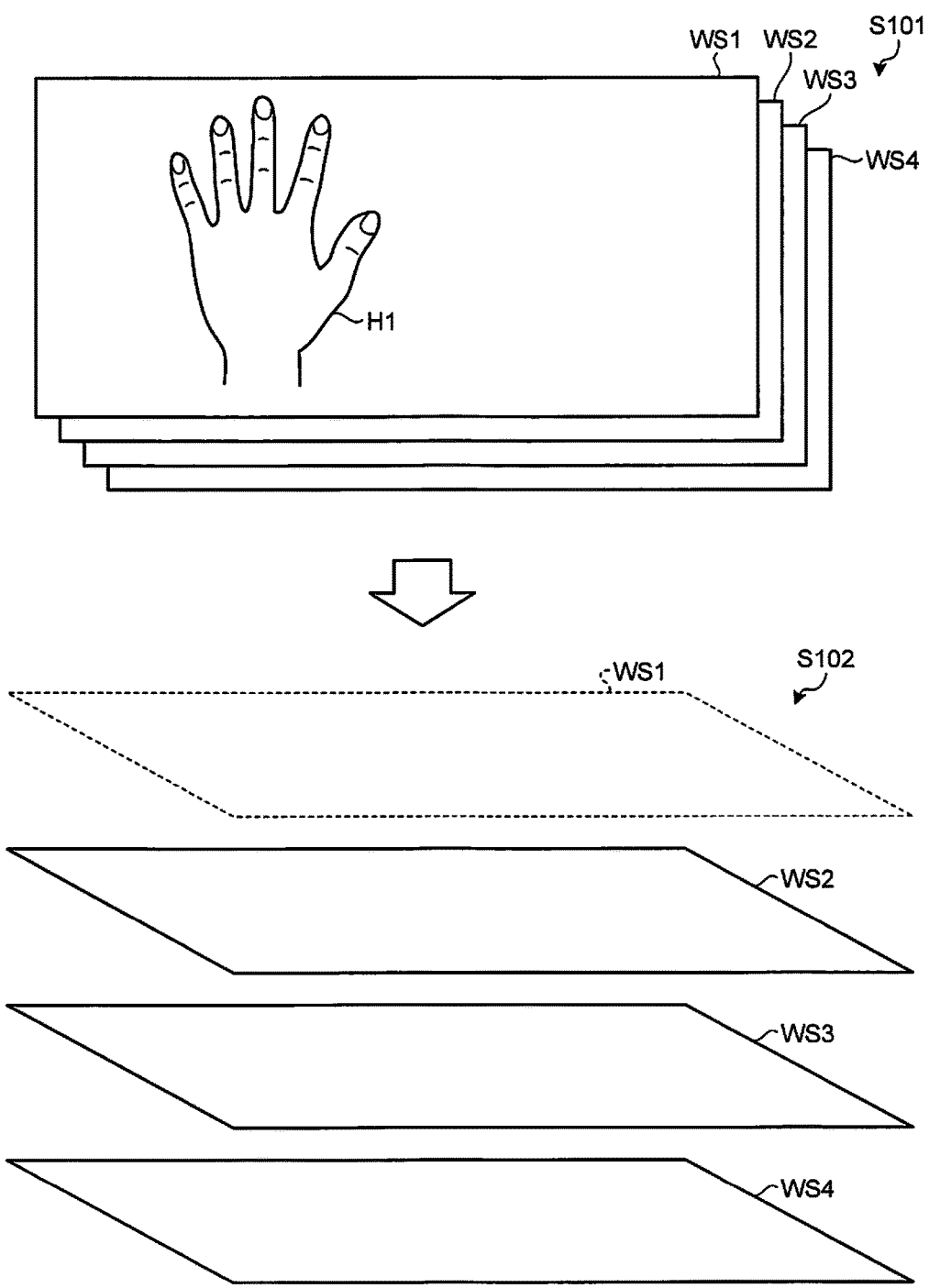
FIG. 43 is a diagram for describing disappearance of a worksheet.

Then, disappearance of a worksheet will be described. FIG. 43 is a diagram for describing disappearance of a worksheet. As illustrated in FIG. 43, when detecting operation to push the worksheet WS1 with a palm of the hand H1 (Step S101), for example, the display device 1 causes the worksheet WS1, on which operation to push a worksheet with a palm of the hand H1 is detected, to disappear from the display space 50 (Step S102). To be specific, when the palm of the hand H1 of the user moving in the Z-axis direction (+) passes through the worksheet WS1, for example, the display device 1 determines to cause the worksheet WS1 to disappear.

The display device 1 may cause a plurality of worksheets to disappear from the display space 50 at once according to a moved distance of the pushing operation with the palm of the hand in the Z-axis direction (+). To be specific, when the palm of the hand H1 of the user moving in the Z-axis direction (+) passes through the worksheets WS1 and WS2, for example, the display device 1 determines to cause the worksheets WS1 and WS2 to disappear. The operation to push the worksheet with the palm of the hand, which is employed by the display device 1 as the operation of the user to cause the worksheet to disappear, is an example of the operation to cause the worksheet to disappear, and the operation to cause the worksheet to disappear is not limited thereto.

At the same time, the display device 1 updates the data stored in the spreadsheet data 24e, based on the rule No. 2 illustrated in FIG. 39. That is, the display device 1 executes a processing of deleting the data of the disappeared worksheet from the spreadsheet data 24e.

Figure 44:
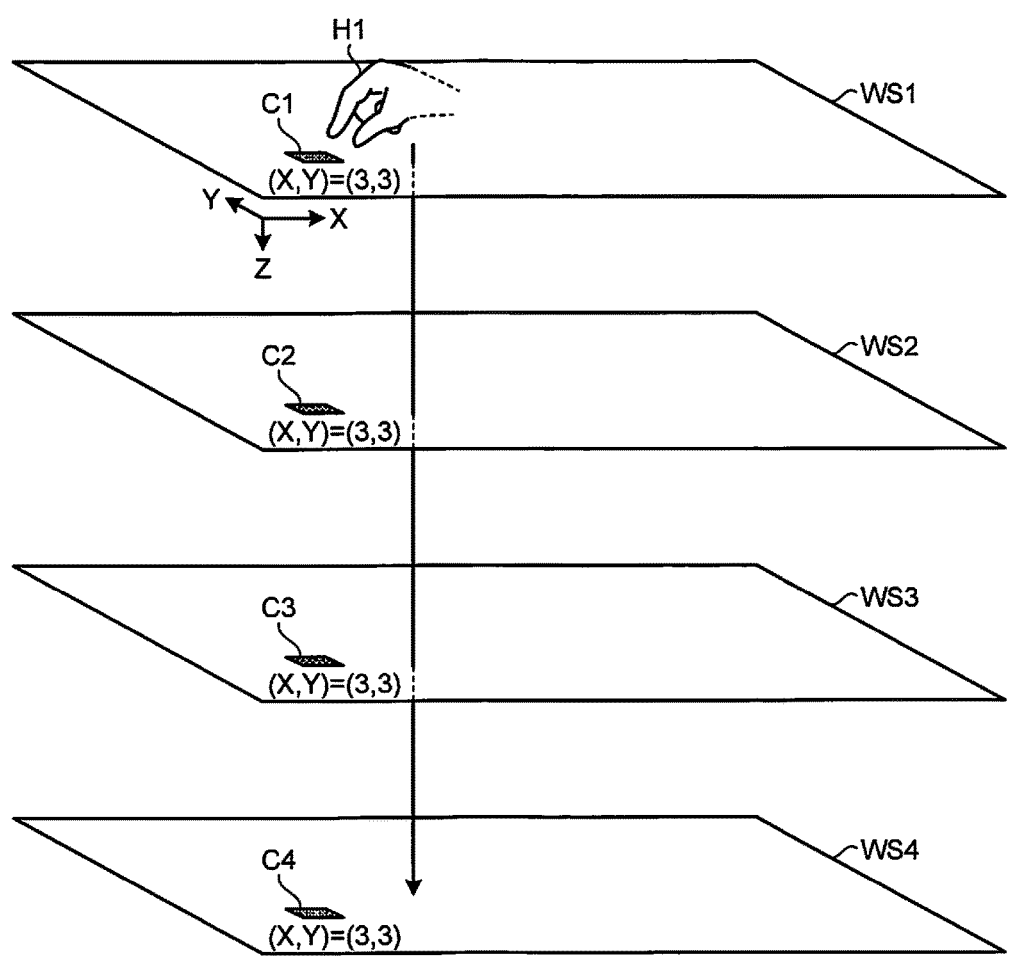
FIG. 44 is a diagram illustrating one of examples of cell copy performed among a plurality of worksheets.

Then, cell coly performed among worksheets will be described. FIG. 44 is a diagram illustrating one of examples of cell copy performed among a plurality of worksheets. In the example illustrated in FIG. 44, assume that the worksheets WS1 to WS4 are layered without being deviated in the X-axis direction and in the Y-axis direction.

As illustrated in FIG. 44, when detecting that operation to move a cell C1 of the worksheet WS1 in the Z-axis direction (+) in a state where the cell C1 is held with the hand H1, the display device 1 displays data that is the same as the data described in the cell C1 as if the data is copied to corresponding cells of the worksheets WS2 to WS4, in accordance with progress of the moving hand H1. In the example illustrated in FIG. 44, the display device 1 displays the data that is the same as the data displayed in the cell C1 as if the data was copied to a cell C2 of the worksheet WS2, a cell C3 of the worksheet WS3, and a cell C4 of the worksheet WS4, corresponding to coordinates (X, Y)=(3, 3) of the cell C1 of the worksheet WS1. The display device 1 determines whether the cell is in the state of being held, using a method similar to the method described in the first embodiment. To be specific, when two fingers of the user are detected in the display space 50 as two real bodies, and a state in which the cell is positioned between the two fingers of the user is continued for a predetermined time or more, the display device 1 determines that the cell is selected.

At the same time, the display device 1 updates the data stored in the spreadsheet data 24e, based on the rule No. 3 illustrated in FIG. 39. That is, the display device 1 overwrites data of the cells arranged in the positions of the coordinates (X, Y)=(3, 3) of the worksheets WS2 to WS4 with numerical data stored in the cell arranged in the position of the coordinates (X, Y)=(3, 3) of the worksheet WS1, for example. Assume that, in the spreadsheet data 24e, the same value is set in advance as a Z coordinate of cells on the same worksheet. When overwriting data of a cell, the display device 1 writes the same value as the Z coordinate of cells on the same worksheet, as a Z coordinate of the cell, to the spreadsheet data 24e.

The display device 1 may distinguish whether operation is copy of cell data or movement of the cell data, according to the detected operation. For example, when detecting operation to hold and move a specific cell with one hand while pressing the worksheet with the other hand, the display device 1 determines that the operation is movement of the cell. In this case, the display device 1 deletes data written in the moving source cell, and performs display as if the data written in the moving source cell is copied to a moving destination cell. At the same time, the display device 1 deletes moving source cell data, of the data stored in the spreadsheet data 24e, and overwrites moving destination cell data with the moving source cell data.

Then, switching of data displayed in worksheets will be described. FIGS. 45 to 49 are diagrams for describing switching of data displayed in the worksheets.

Figure 45:
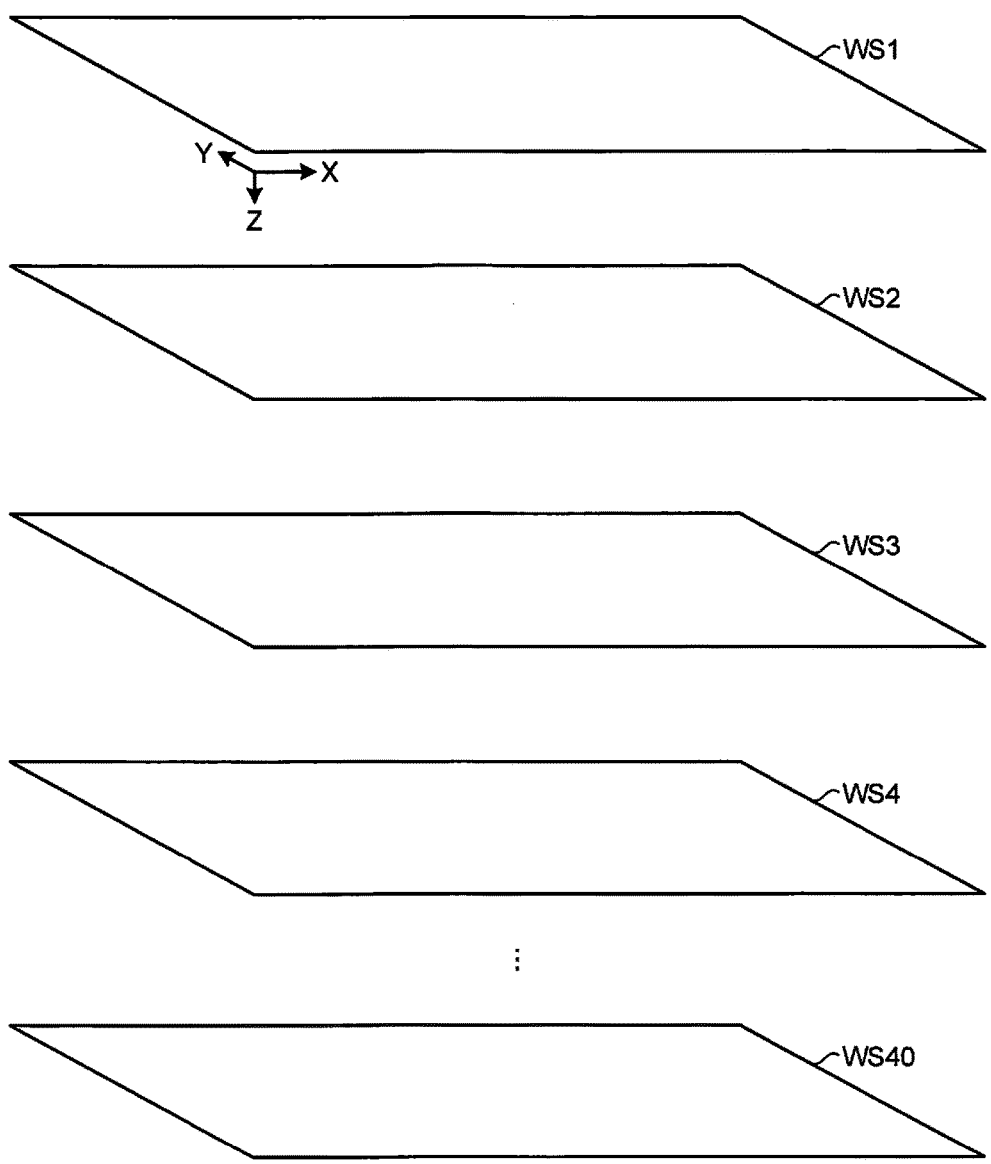
FIG. 45 is a diagram for describing change of data displayed in the worksheets.

For example, as illustrated in FIG. 45, forty worksheets WS1 to WS40 are displayed in a state of being layered. Assume that records of only a certain one student are written in each of the worksheets WS1 to WS40. The records are of five subjects of Japanese, arithmetic, science, social studies, and English, for example. The worksheet WS1 is displayed in the visible state.

Figure 46:
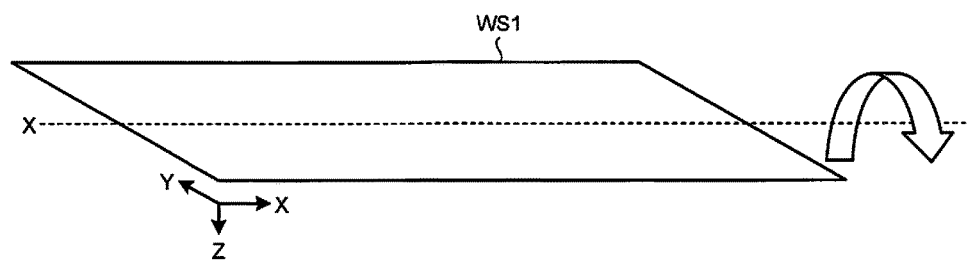
FIG. 46 is a diagram for describing change of data displayed in the worksheets.

Subsequently, as illustrated in FIG. 46, when detecting operation to rotate the worksheet WS1 around the X axis, the display device 1 switches a state in which records of the five subjects of only a certain student are displayed, as illustrated in Step Sill of FIG. 47, to a state in which records of Japanese of all of the forty students are displayed, as illustrated in Step S112 of FIG. 47. That is, when the data are arranged in one column, the display device 1 detects the rotating operation around the X axis, and switches display of the data written in the worksheet. For example, the display device 1 stores movement of the fingers of the user for rotating the worksheet around the X axis in advance, and when detecting the corresponding movement of the user, the display device 1 rotates the worksheet displayed in the visible state around the X axis.

Figure 48:
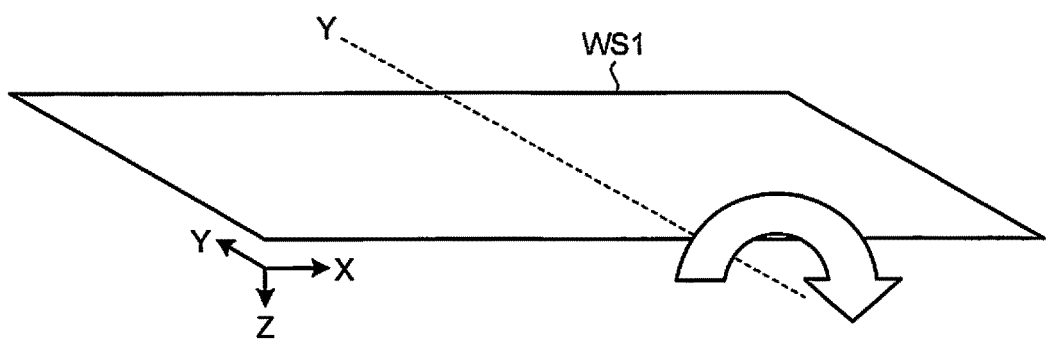
FIG. 48 is a diagram for describing change of data displayed in the worksheets.
Figure 49:
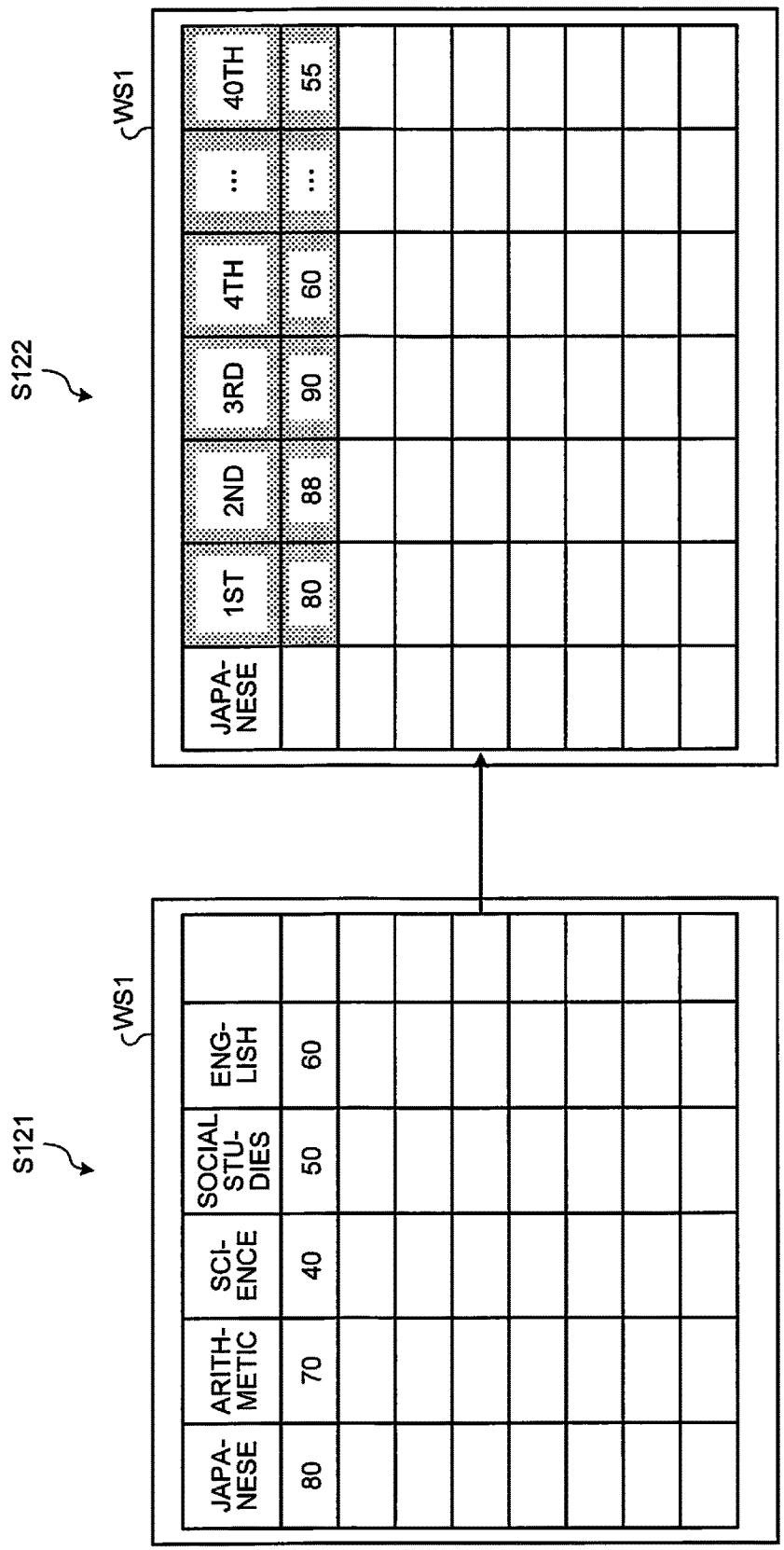
FIG. 49 is a diagram for describing change of data displayed in the worksheets.

Alternatively, as illustrated in FIG. 48, when detecting operation to rotate the worksheet WS1 around the Y axis, for example, the display device 1 switches a state in which records of five subjects of only a certain student are displayed, as illustrated in Step S121 of FIG. 49, to a state in which records of Japanese of all of the forty students are displayed, as illustrated in Step S122 of FIG. 49. That is, when the data are arranged in one row, the display device 1 detects the rotating operation around the Y axis, and switches display of the data written in the worksheet. For example, the display device 1 stores movement of the fingers of the user for rotating the worksheet around the Y axis in advance, and when detecting the corresponding movement of the user, the display device 1 rotates the worksheet displayed in the visible state around the Y axis.

Figure 47:
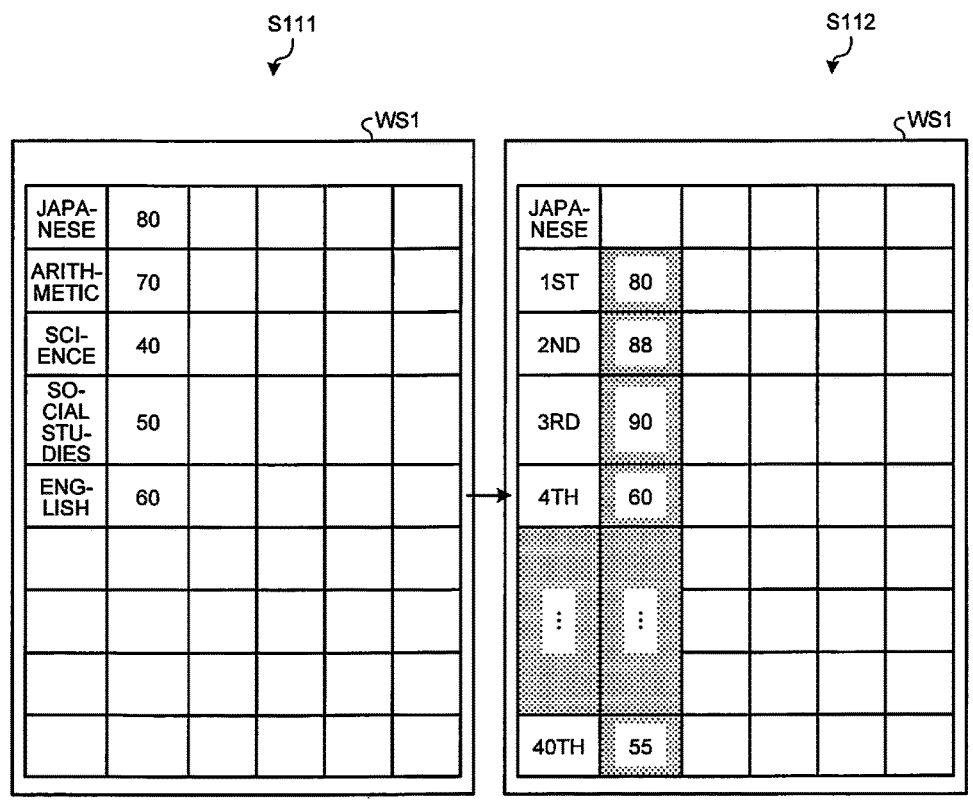
FIG. 47 is a diagram for describing change of data displayed in the worksheets.

Control of changing of data displayed in worksheets is not limited to the examples of control illustrated in FIGS. 47 and 49. For example, in the example illustrated in FIG. 47, after displaying the records of Japanese of all of the forty students, the display device 1 may further display the records of arithmetic, science, social studies, and English of all of the forty students every time detecting the operation to rotate the worksheet around the X axis. Then, when detecting the operation to rotate the worksheet around the X axis after displaying the records of Japanese of all of the forty students, the display device 1 may put back the display state to the state in which the records of the five subjects of a certain student are displayed, as illustrated in Step S111 of FIG. 47. The display device 1 may display the records of the five subjects of another student every time detecting the operation to rotate the worksheet around the X axis. The display device 1 may display the records of the five subjects of another student when detecting the rotating operation around the Y axis, in a state in which the data are arranged in one column, as illustrated in FIG. 47. The same applies to the case illustrated in FIG. 49.

Figure 50:
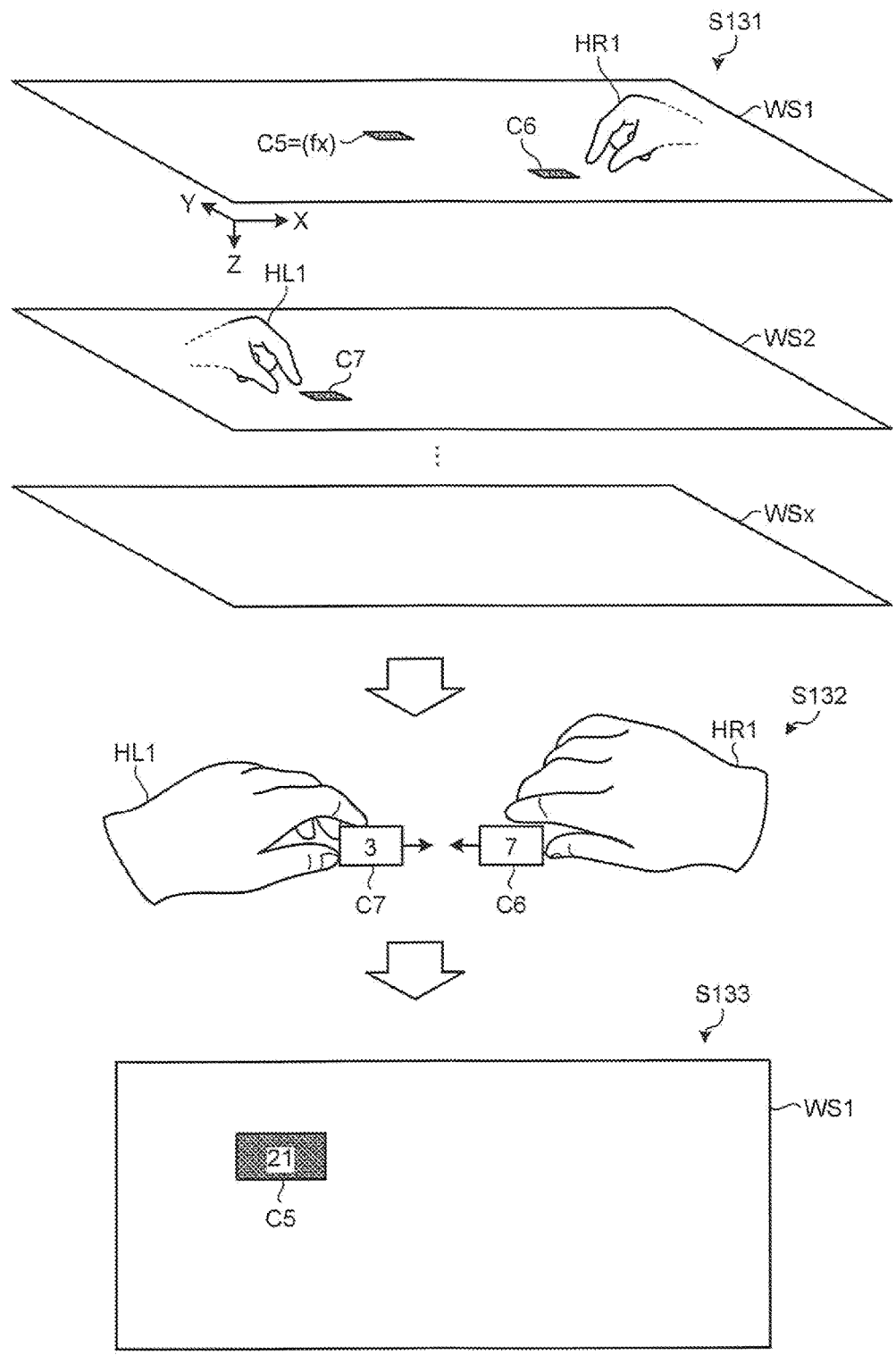
FIG. 50 is a diagram for describing calculation performed among worksheets.

Then, calculating performed among worksheets by the display device 1 will be described. FIG. 50 is a diagram for describing calculation performed among worksheets. As illustrated in Step S131 of FIG. 50, first of all, the display device 1 accepts a calculation type and setting of a cell C5 in which a calculation result is embedded, with respect to the worksheet WS1. Subsequently, when detecting operation to hold a cell C6 of the worksheet WS1 with a right hand HR1 of the user, to hold a cell C7 of the worksheet WS2 with a left hand HL1 of the user (Step S131), and to move the cells C6 and C7 to collide with each other in the X-axis direction (Step S132), the display device 1 causes both cells to disappear at timing when the cells C6 and C7 collide with each other. Then, the display device 1 displays the calculation result in the cell C5 of the worksheet WS1 at the timing of the disappearance of the cells (Step S133). For example, when the cells are caused to collide with each other in the X-axis direction, the display device 1 displays "21" in the cell C5 because of multiplication (see FIG. 39). For example, when the cells are caused to collide with each other in the Y-axis direction, the display device 1 displays a result of division in the cell C5 because of division (see FIG. 39). When the cell C6 exists at the side of the Y-axis direction (+), the cell C7 exists at the side of the Y-axis direction (−), and the cells are caused to collide with each other in the Y-axis direction, the display device 1 divides the numerical data of the cell C6 with the numerical data of the cell C7. Calculation of the cells is executed in parallel in the background of the control of FIG. 50, as described below, for example.

The display device 1 performs calculation, based on the rule No. 4 illustrated in FIG. 39, and updates the data stored in the spreadsheet data 24*e* according to the calculation result. That is, the display device 1 updates the numerical data corresponding to the cell C5 of the worksheet WS1.

Figure 51:
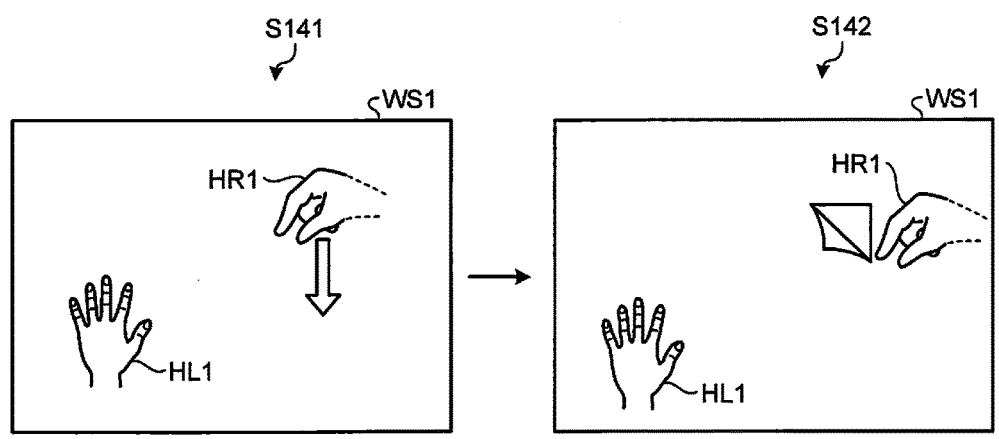
FIG. 51 is a diagram for describing one of examples of tearing a worksheet.

Then, a case of tearing a worksheet will be described. FIG. 51 is a diagram for describing one of examples of tearing a worksheet. As illustrated in FIG. 51, when detecting operation to move the right hand HR1 in a state where the right hand HR1 of the user holds a specific cell of the worksheet WS1, and the left hand HL1 of the user holds the worksheet WS1 (Step S141), the display device 1 may perform display as if the worksheet WS1 is torn from the specific cell in the position of the right hand HR1 of the user (Step S142). The display device 1 may cause a cut-off piece to be cut off in cell units. When detecting operation to lay the torn cut-off piece of the worksheet WS1 over another sheet, the display device 1 may perform display as if the cut-off piece is absorbed in another sheet.

At the same time, the display device 1 performs calculation, based on the rule No. 6 illustrated in FIG. 39, and updates the data stored in the spreadsheet data 24*e* according to the calculation result. That is, the display device 1 deletes data of the cells of the worksheet from which the cut-off piece has been cut off, and updates data of cells of the worksheet over which the cut-off piece is laid. Upon updating, the display device 1 updates data of the cells corresponding to the coordinates of the cells cut off as the cut-off piece, among the cells of the worksheet over which the cut-off piece is laid.

Figure 52:
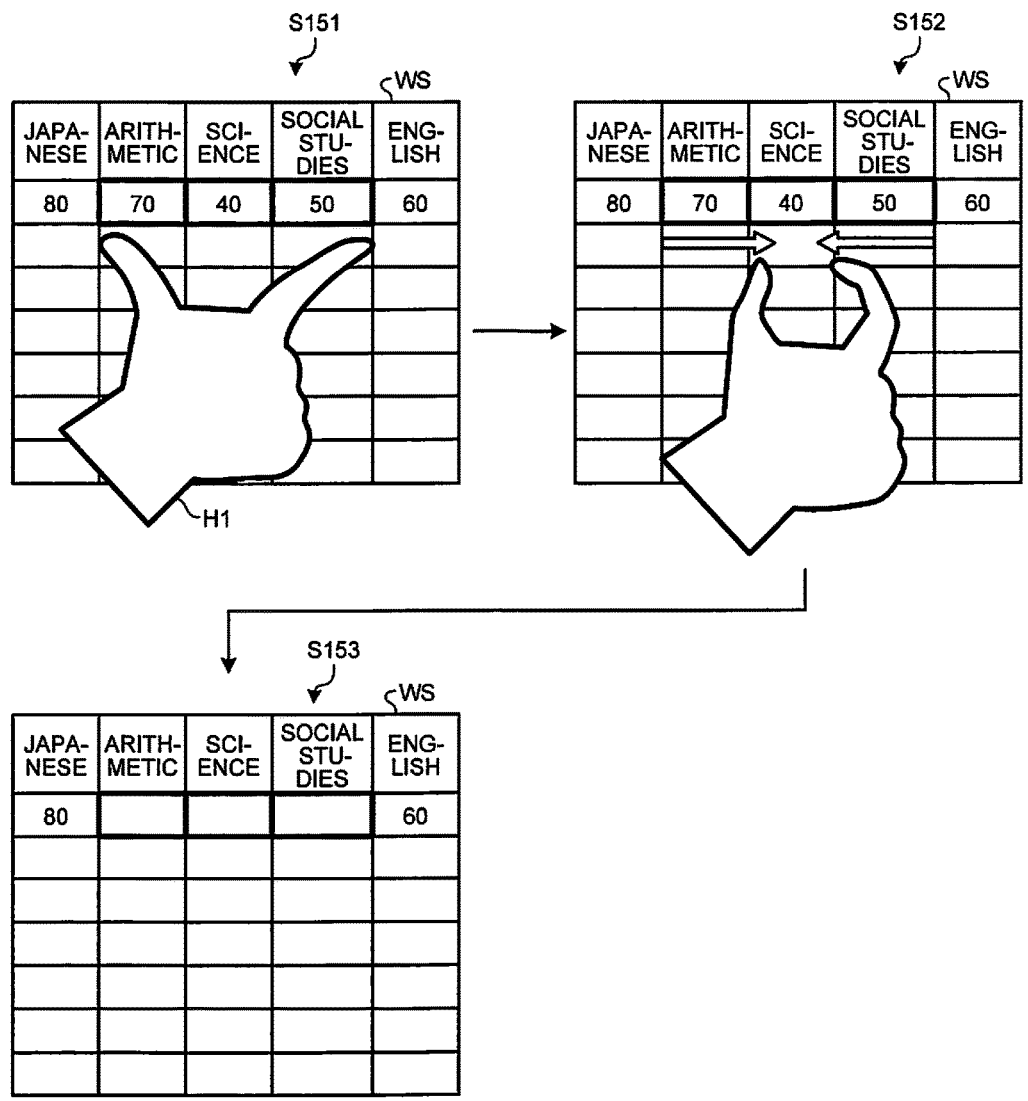
FIG. 52 is a diagram for describing deletion of cells.

Then, deletion of held cells (data written in the cells) will be described. FIG. 52 is a diagram for describing deletion of cells. As illustrated in FIG. 52, when a certain time has passed while the user keeps the fingers of the hand H1 to be opened, the display device 1 determines cells between the fingers of the user as a processing range (Step S151). To be specific, when detecting the two fingers of the user as two real bodies in the display space 50, and the state in which cells are positioned between the two fingers of the user is continued for a predetermined time or more, the display device 1 determines that the cells have been selected. Subsequently, when detecting the operation to close the opened fingers of the user as illustrated by the arrow (Step S152), the display device 1 causes numerals written in the cells determined as the processing range to disappear as if deleted, at timing of contact of the fingers (Step S153).

At the same time, the display device 1 performs calculation, based on the rule No. 7 illustrated in FIG. 39, and updates the data stored in the spreadsheet data 24*e* according to the calculation result. That is, the display device 1 deletes the numerical data corresponding to the cells determined as the processing range.

Figure 53:
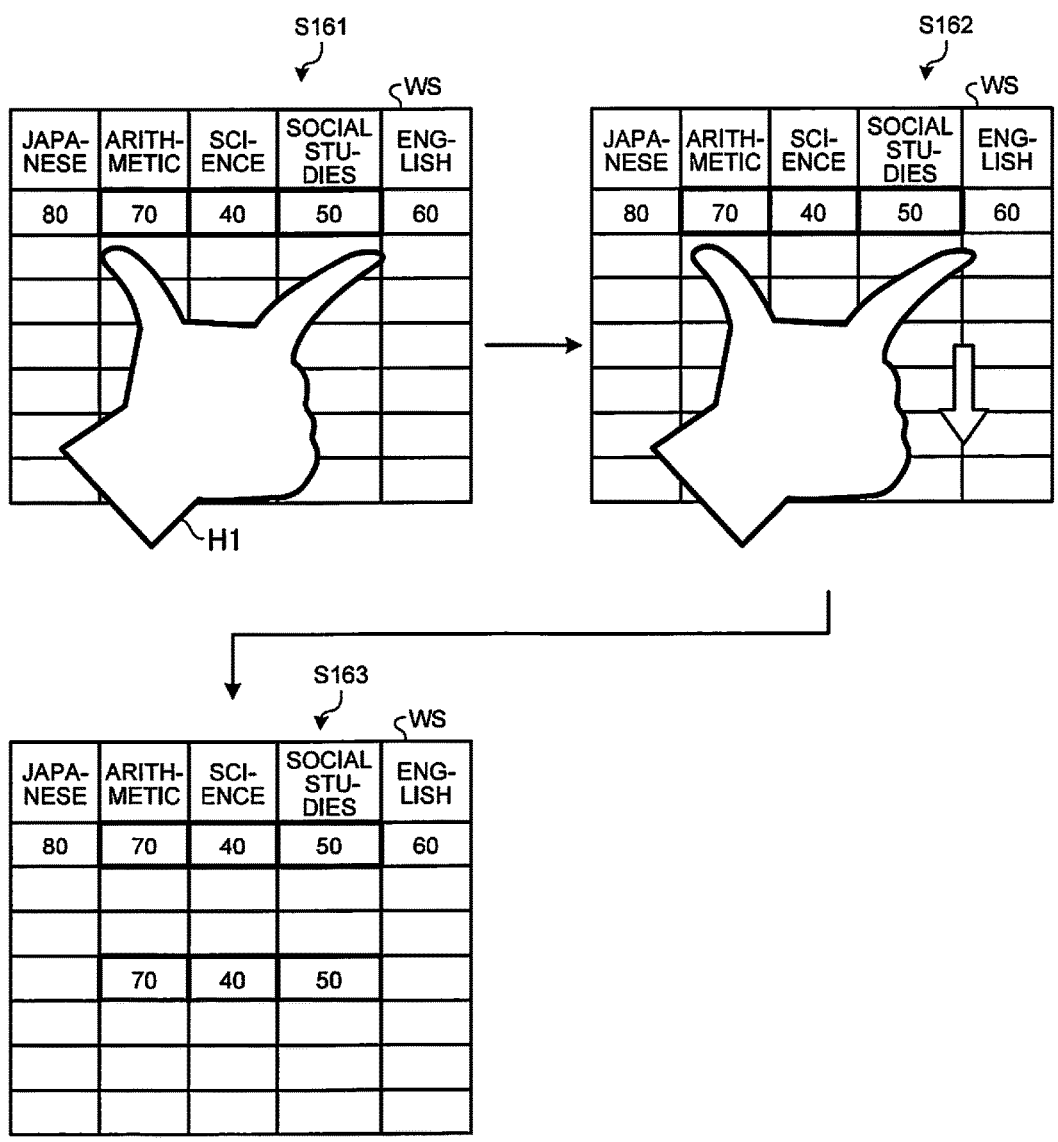
FIG. 53 is a diagram for describing copy of cells.

Then, copy of held cells will be described. FIG. 53 is a diagram for describing copy of cells. When a certain time has passed while the user keeps the fingers of the hand H1 to be opened, the display device 1 determines cells between the fingers of the user as the processing range (Step S161). To be specific, when detecting the two fingers of the user as the two real bodies in the display space 50, and the state in which the cells are positioned between the two fingers of the user is continued for a predetermined time or more, the display device 1 determines that the cells have been selected. Subsequently, when detecting operation to move the fingers in a state of being opened, as illustrated by the arrow (Step S162), the display device 1 performs display as if numerals written in the cells determined as the processing range are copied to cells in a position where the hand H1 of the user is stopped, at timing when the fingers are stopped while being opened (Step S163).

At the same time, the display device 1 performs calculation, based on the rule No. 8 illustrated in FIG. 39, and updates the data stored in the spreadsheet data 24*e* according to the calculation result. That is, the display device 1 updates the numerical data corresponding to the copy destination cells.

Figure 54:
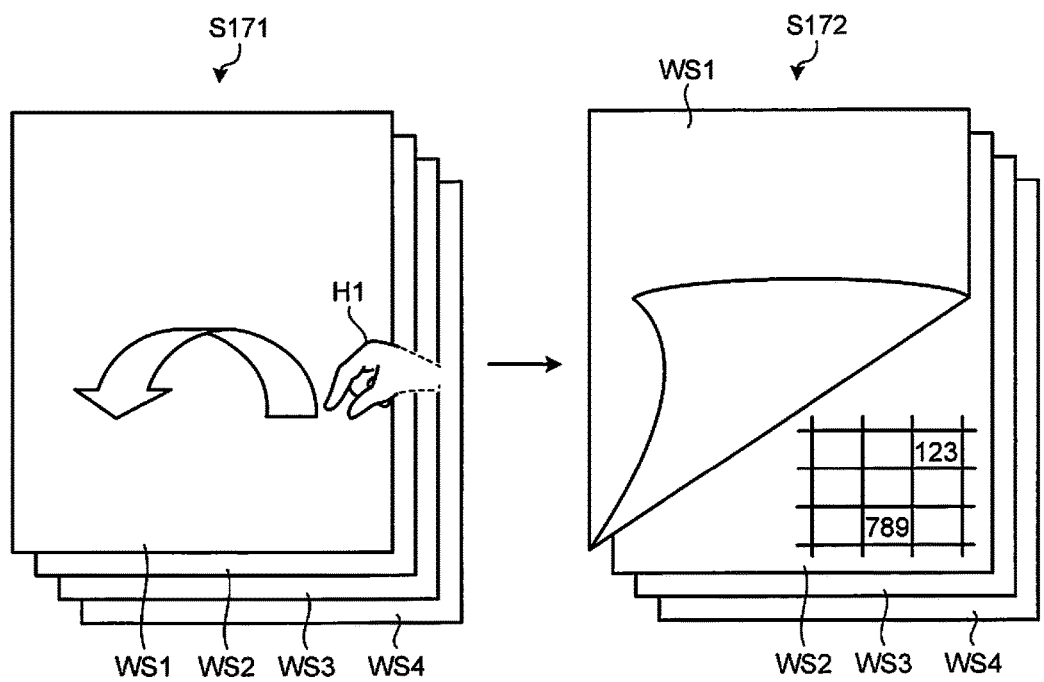
FIG. 54 is a diagram for describing flip display of a worksheet.

Then, flip display of a worksheet by the display device 1 will be described. FIG. 54 is a diagram for describing flip display of a worksheet. As illustrated in FIG. 54, when detecting operation to move the worksheet WS1 in a direction of the arrow in a state where the worksheet WS1 is held by the hand H1 of the user (Step S171), the display device 1 displays the worksheet WS2 in the back of the worksheet WS1 as if the worksheet WS1 is flipped (Step S162). To be specific, when detecting the two fingers of the user as two real bodies in the display space 50, and the state in which the two fingers of the user are positioned on a worksheet is continued for a predetermined time or more, the display device 1 determines that the worksheet has been selected.

At the same time, the display device 1 updates the data stored in the spreadsheet data 24e, according to the calculation result, based on the rule No. 9 illustrated in FIG. 39. That is, the display device 1 updates the fact that the state of the worksheet WS2 is changed to the visible state.

Figure 55:
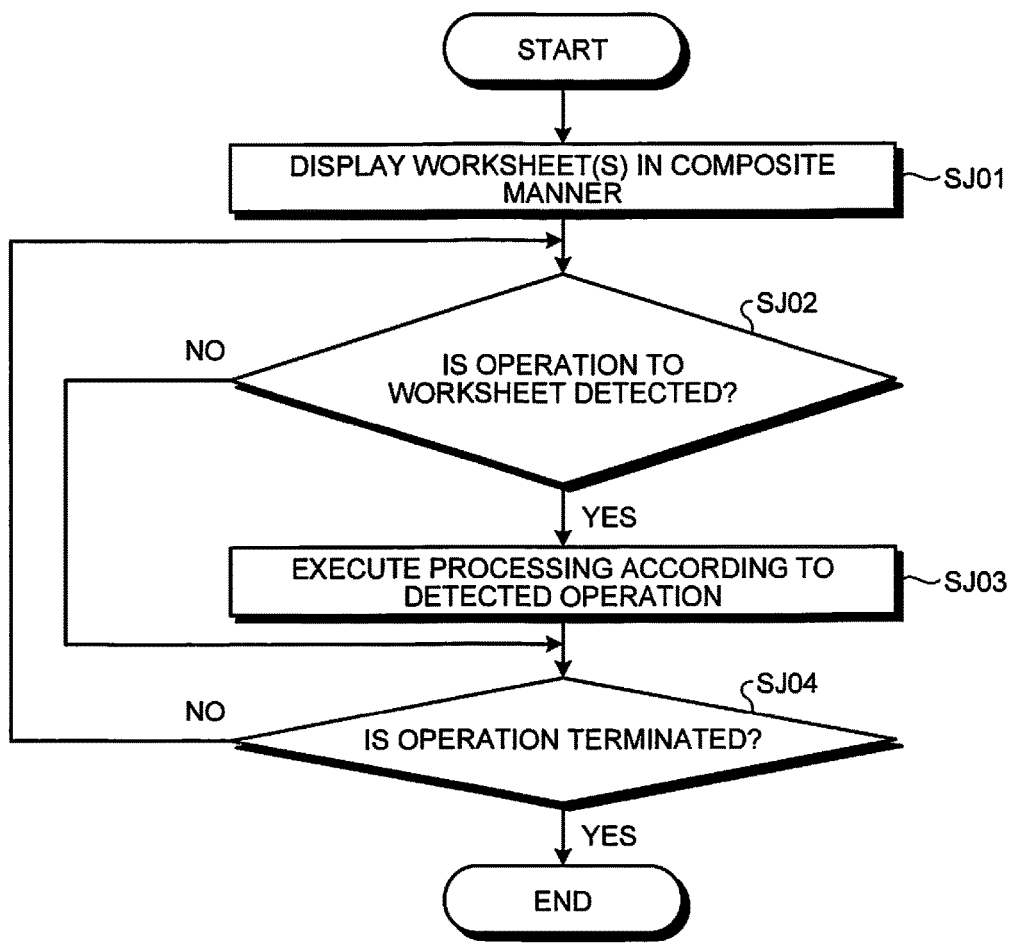
FIG. 55 is a flowchart illustrating a processing procedure according to the second embodiment.

FIG. 55 is a flowchart illustrating a processing procedure according to the second embodiment. The processing procedure illustrated in FIG. 55 is realized by the control unit 22 executing the control program 24a.

As illustrated in FIG. 55, at Step SJ01, the control unit 22 displays the worksheet(s) in a composite manner (see FIG. 40, and the like).

Subsequently, at Step SJ02, the control unit 22 determines whether operation to the worksheet has been detected. When the operation to the worksheet has been detected, as a result of the determination (Yes at Step SJ02), then at Step SJ03, the control unit 22 executes a processing according to the detected operation. Examples of the processing executed at Step SJ03 include control to execute a processing related to spreadsheet determined by the rule according to the operation detected with respect to the worksheet, and control to change the display style of the worksheet according to the operation detected with respect to the worksheet (see FIGS. 41 to 54, and the like).

Subsequently, at Step SJ04, the control unit 22 determines whether operation termination has been detected. The operation termination is detected when predetermined operation with respect to an operating unit 13 is performed, for example. When the operation termination has been detected (Yes at Step SJ04), the control unit 22 terminates the processing procedure illustrated in FIG. 55. When the operation termination has not been detected (No at Step SJ04), the control unit 22 re-executes Step SJ02 and the subsequent steps.

When the operation to the worksheet has not been detected, as a result of the determination at Step SJ02 (No at Step SJ02), the control unit 22 proceeds to the processing procedure of Step SJ04.

Other Embodiments

A display device 1 can display an arbitrary number of worksheets in a display space 50 as three-dimensional objects, without being limited by the examples of the second embodiment.

Figure 56:
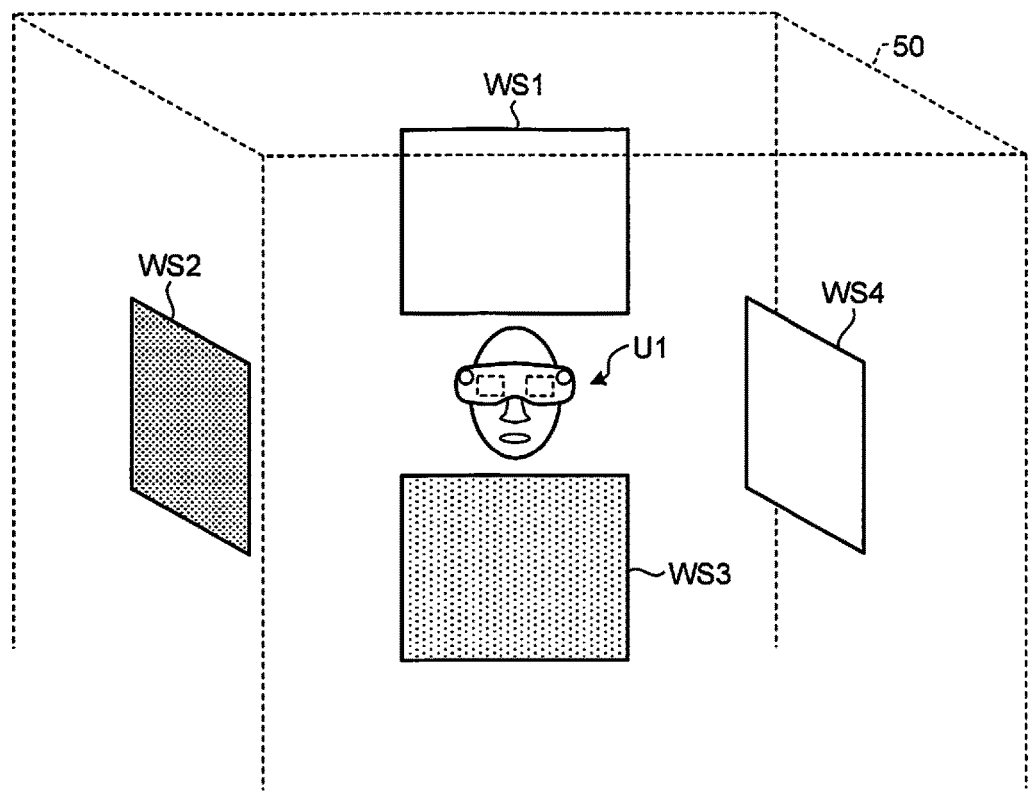
FIG. 56 is a diagram illustrating another one of display examples of the worksheets.

In the second embodiment, examples in which the display device 1 displays a plurality of worksheets in a layered manner have been described. However, the embodiment is not limited to the examples. For example, the worksheets may be displayed around the display device 1, for example. FIG. 56 is a diagram illustrating another one of display examples of the worksheets. As illustrated in FIG. 56, the display device 1 displays worksheets WS1 to WS4 to surround a periphery of a user U1 who wears the display device 1, for example.

In this case, the display device 1 is equipped with an attitude detection unit for detecting an attitude of the display device 1, for example. The attitude detection unit includes at least one of an acceleration sensor, a direction sensor, and a gyroscope. The display device 1 detects a worksheet existing in front of the user U1, based on a detection result of the attitude detection unit, and causes the worksheet to be editable. Alternatively, the display device 1 causes the worksheets to be editable at the same time, and enables operation to move a worksheet other than the worksheet being currently edited by the user, and the like.

Further, the display device 1 may display the worksheets by functions. For example, the display device 1 may display a worksheet, in which editing operation by the user U1 is accepted, in front of the user U1, display worksheets in which graphs are drawn on the right and left of the user U1, and display a worksheet in which a figure (animation) is drawn, in the back of the user U1. The display device 1 may change the graphs and the figures in real time, according to the editing of the worksheets by the user U1, to cause the worksheets to be in conjunction with each other.

The display device 1 may enlarge or reduce the worksheet according to intuitive operation. For example, when detecting operation to increase an interval of both hands of the user U1 placed on the worksheet, the display device 1 may enlarge the worksheet. When detecting operation to decrease the interval, the display device 1 may reduce the worksheet. For example, when detecting operation to increase an interval of the fingers of the user U1 that specify a specific cell of the worksheet, the display device 1 may enlarge the cell. When detecting operation to decrease the interval, the display device may reduce the cell. At this time, the display device 1 constructs a rule not to contradict the case of the processing of deletion of data written in the cells described in the second embodiment (see FIG. 52), and the association of the operation and the processing.

Further, the display device 1 may be able to execute the processing related to spreadsheet such as tabulation, calculation, and analysis of numerical data, by overlapping the worksheets with intuitive operation. For example, when detecting operation to overlap the worksheet in which a formula is defined in a cell, and the worksheet in which the numerical data is written in such a manner that one is laid on the other, the display device 1 displays a calculation result of the numerical data based on the defined formula, in the worksheet in which the numerical value is written, for example. Upon laying one worksheet on the other worksheet in response to operation by the user U1, the display device 1 may overlap them such that specific coordinates are accurately matched.

The display device 1 may rearrange display positions of the worksheets with intuitive operation. FIG. 57 is a diagram illustrating one of rearrangement examples of display positions of the worksheets. As illustrated in Step S181 of FIG. 57, assume that the worksheet WS3 and the worksheet WS4 are displayed in a state of being layered by operation of the user U1. At this time, when detecting operation by the user U1 to clap hands twice, the display device 1 puts the display positions of the worksheets WS3 and WS4 back in the display positions illustrated in FIG. 56, as illustrated in Step S182 of FIG. 57, for example. The operation to put back the display positions is not limited to the operation by the user U1 to clap hands twice, and arbitrary operation can be employed.

The form of the present invention illustrated in the embodiments can be arbitrarily changed without departing from the gist of the present invention. Further, the embodiments can be appropriately combined. For example, the control program described in the embodiments may be divided into a plurality of modules, or may be integrated with another program.

In the embodiments, one of examples in which the user himself/herself operates the three-dimensional object has been described. However, the display device may detect movement of another person, an animal, a machine, or the like in the image range of the imaging units, as the real body. Further, the display device may share the virtual space with another device. That is, the display device may be configured such that a person other than the user of the display device can see and operate the three-dimensional object in the virtual space through another device.

In the embodiments, the operation to the three-dimensional object is detected by the display device by itself. However, the display device may detect the operation to the three-dimensional object in cooperation with a server. In this case, the display device sequentially transmits images captured by the imaging units or information detected by the detection units to the server, and the server detects the operation, and notifies the display device of the detection result. With such a configuration, a load of the display device can be reduced.

The various types of control executed by the display device described in the embodiment can be executed also by mobile type devices such as a smart phone and a tablet.

Embodiment 3

Figure 58:
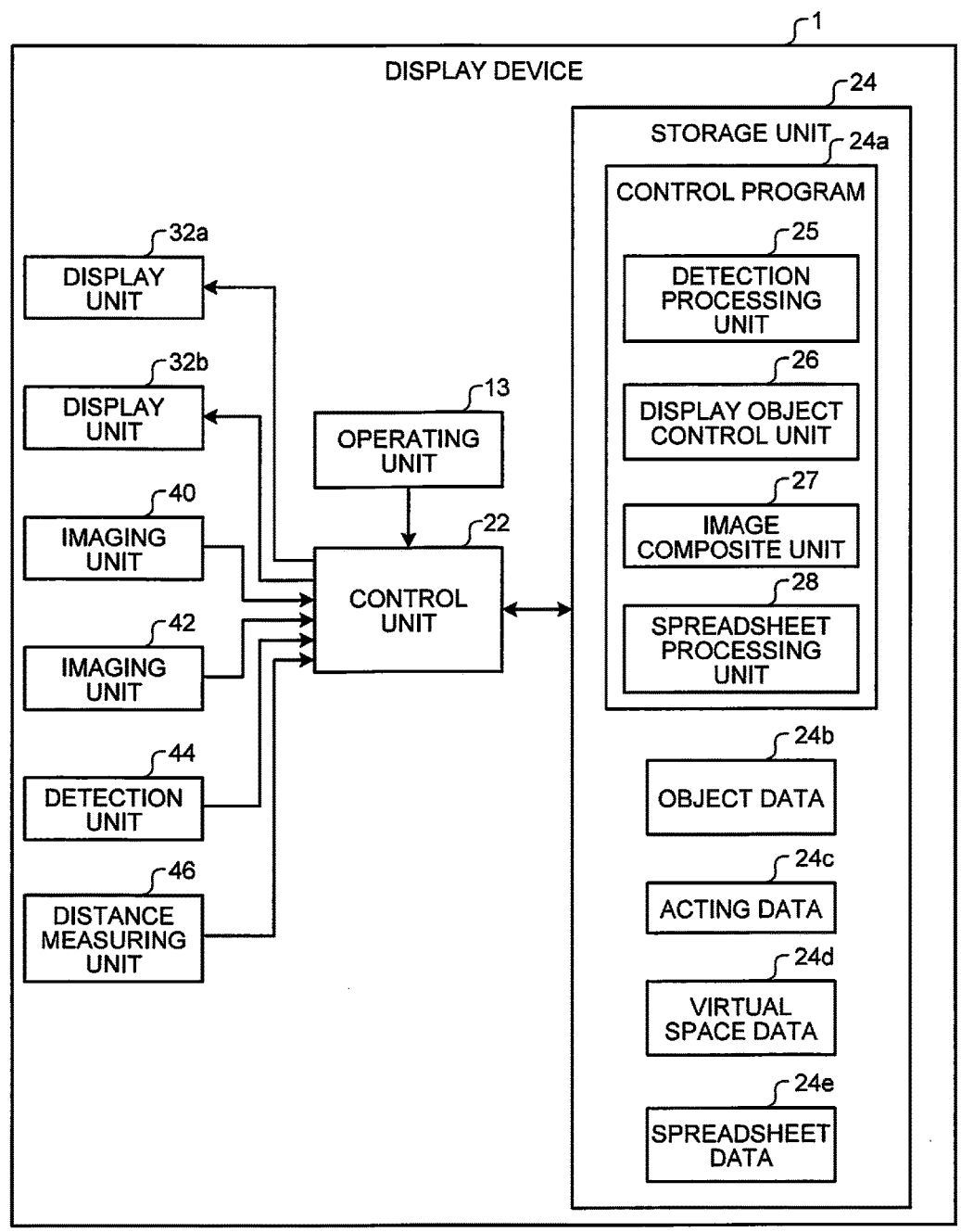
FIG. 58 is a block diagram of a display device according to a third embodiment.

A functional configuration of a display device 1 will be described with reference to FIG. 58. FIG. 58 is a block diagram of the display device 1 according to a third embodiment. The functional configuration of the display device 1 according to the third embodiment is basically similar to that of the first embodiment (FIG. 6). However, points described below are different.

A control program 24a stored in a storage unit 24 further includes a spreadsheet processing unit 28, in addition to a detection processing unit 25, a display object control unit 26, and an image composite unit 27, similarly to the first embodiment. Examples of data stored in the storage unit 24 further include spreadsheet data 24e, in addition to object data 24b, acting data 24c, and virtual space data 24d.

The spreadsheet processing unit 28 provides a function to realize processings related to spreadsheet, such as tabulation, calculation, and analysis of numerical data. The spreadsheet processing unit 28 displays a cubic object with faces configured from worksheets for performing the processings related to spreadsheet. The spreadsheet processing unit 28 realizes the processings related to spreadsheet according to operation detected with respect to the worksheet. In the worksheet, a plurality of lattice-like cells is arranged in a matrix manner, for example. Examples of the operation detected with respect to the worksheet include operation with respect to a cell.

Figure 59:
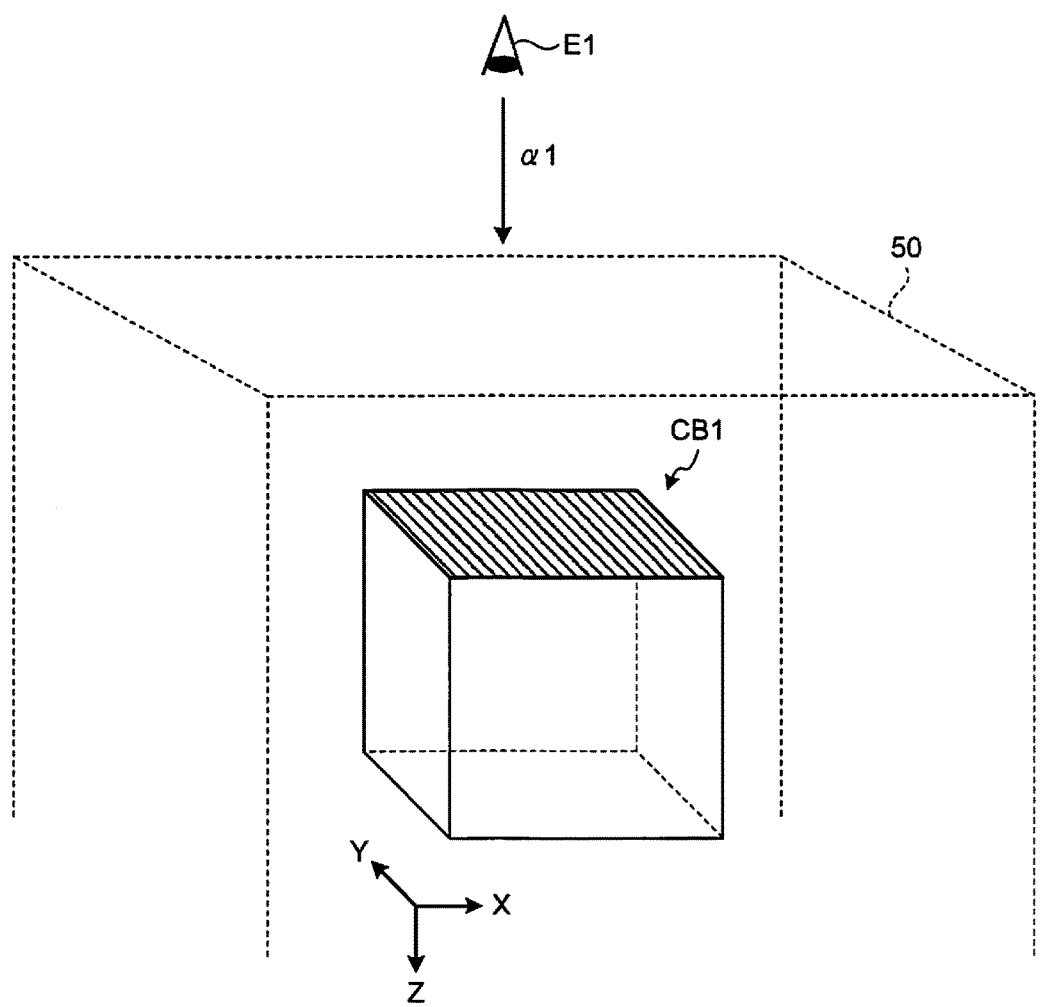
FIG. 59 is a diagram illustrating a state of a cubic object displayed in a display space as viewed from the user.
Figure 60:
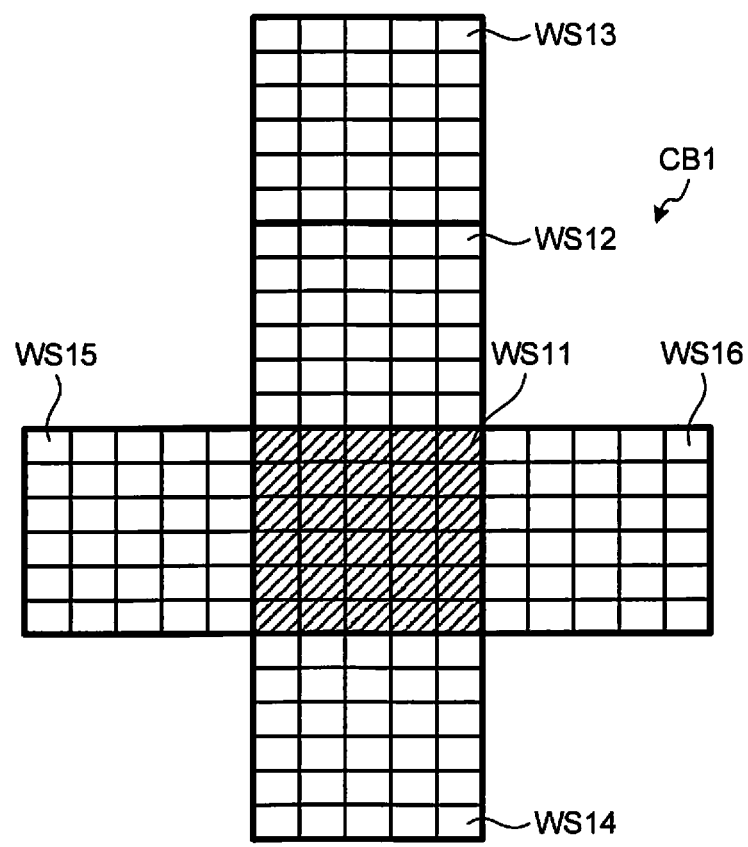
FIG. 60 is a developed diagram of the cubic object.

Rules for determining processing details by the spreadsheet processing unit 28 will be described with reference to FIGS. 59 to 61. FIG. 59 is a diagram illustrating a state of the cubic object displayed in a display space as viewed from the user. FIG. 60 is a developed diagram of the cubic object. E1 illustrated in FIG. 59 represents an eye of the user.

As illustrated in FIG. 59, the user recognizes a display space 50 as a space having a depth in a Z-axis direction parallel to a user's eye direction al. Further, the user recognizes the cubic object (hereinafter, described as cube CB1) with faces configured from worksheets for performing the processings related to spreadsheet as if the cube CB1 floats in the air in the display space 50. In the description below, when a direction is described as the Z-axis direction, the direction is not limited to either a direction from the user toward a depth side of the display space 50, or a direction from the depth side of the display space 50 toward the user. When the direction is described as the Z-axis direction (+), the direction is a direction toward the depth side of the display space 50, being away from the user, and means an opposite direction to a direction toward the origin of a three-dimensional coordinate system. When a direction is described as an X-axis direction, the direction means at least a direction parallel to an X axis. When a direction is described as a Y-axis direction, the direction means at least a direction parallel to a Y axis. When the direction is described as the Y-axis direction (+), the direction means an opposite direction to the direction toward the origin of the three-dimensional coordinate system. When the direction is described as the Y-axis direction (−), the direction means a direction toward the origin of the three-dimensional coordinate system.

As illustrated in FIG. 60, faces of the cube CB1 are respectively configured from a worksheet WS11, a worksheet WS12, a worksheet WS13, a worksheet WS14, a worksheet WS15, and a worksheet WS16. The worksheets WS11 to WS16 independently realize the processings related to spreadsheet according to the operation from the user, respectively.

FIG. 61 is a diagram illustrating one of examples of processing determination rules in which operation detected with respect to a cube or a worksheet, and a processing included in the processings related to spreadsheet are associated with each other in advance. The spreadsheet processing unit 28 determines a processing to be executed according to the operation detected with respect to the worksheet, based on the processing determination rule illustrated in FIG. 61, and executes the determined processing.

In a rule No. 1 illustrated in FIG. 61, detected operation of "move one face of the cube in the Z-axis direction (+)", and a processing of "update a calculation result when calculation is defined in a portion where faces that configure the cube are in contact with each other with a right angle (a portion where cells of different worksheets are adjacent to each other)" are associated with each other.

In a rule No. 2 illustrated in FIG. 61, detected operation of "rotate a column or a row of the cube", and a processing of "update a calculation result and a graph when there is the calculation or the graph that refers to the column or row to be rotated" are associated with each other.

In a rule No. 3 illustrated in FIG. 61, detected operation of "cut the cube with a hand", and a processing of "update configuration information of the worksheets according to division of the cube" are associated with each other. It is intended to update the number of worksheets, the number of cells included in the worksheets, the number of columns or rows, numerical data input in cells, and the like when the cube is divided.

In a rule No. 4 illustrated in FIG. 61, detected operation of "move two cells in the X-axis direction and cause the two cells to collide with each other", and a processing of "multiply numerical data of cells on a surface of the cube" are associated with each other.

In a rule No. 5 illustrated in FIG. 61, detected operation of "move two cells in the Y-axis direction and cause the two cells to collide with each other", and a processing of "divide data of a cell at the side of the Y-axis direction (+) by data of a cell at the side of the Y-axis direction (−)" are associated with each other.

In a rule No. 6 illustrated in FIG. 61, detected operation of "squash the cube in the Y-axis direction (−)", and a processing of "delete data of the worksheet according to a moving amount at the side of the Y-axis direction (−)" are associated with each other.

In a rule No. 7 illustrated in FIG. 61, detected operation of "push a specific cell in the cube", and a processing of "delete data of the cells of the pushed specific column or row" are associated with each other. Accordingly, data of a specific column or row of the cube can be intuitively deleted.

In a rule No. 8 illustrated in FIG. 61, detected operation of "cause a cell separated from a first worksheet to collide with a second worksheet", and a processing of "update configuration information of the worksheet from which the cell is separated, and configuration information data of the worksheet with which the cell has collided" are associated with each other.

The processing determination rules in FIG. 61 are exemplarily illustrated. Types of the detected operation and details of the processing associated with the operation are not limited to the examples illustrated in FIG. 61, and may be added, changed, or deleted.

Change of a display style of the cube CB1 (worksheets that configure six faces of the cube) according to the operation detected with respect to the cube CB1 (worksheets that configure six faces of the cube) is realized based on functions provided by the detection processing unit 25, the display object control unit 26, and the image composite unit 27, and the object data 24b, the acting data 24c, and the virtual space data 24d.

The detection processing unit 25 provides a function to detect a real body existing in image ranges of imaging units 40 and 42, similarly to the first embodiment. Examples of the function provided by the detection processing unit 25 include a function to measure a distance to each detected body. In the third embodiment, the detection processing unit 25 mainly detects a hand or a finger of a user, and measures the distance to the detected hand or finger of the user.

The display object control unit 26 provides, similarly to the first embodiment, a function to manage what kind of three-dimensional object is arranged in a virtual space, and in what state each three-dimensional object is. Examples of the function provided by the display object control unit 26 include a function to detect operation with respect to the three-dimensional object, based on movement of the real body detected by the function of the detection processing unit 25, and to change the three-dimensional object, based on the detected operation. In the third embodiment, the display object control unit 26 mainly detects the operation with respect to the cube CB1 (worksheets that configure six faces of the cube), based on movement of the hand of the user detected by the function of the detection processing unit 25, and changes the display style of the cube CB1 (worksheets that configure six faces of the cube), based on the detected operation.

The image composite unit 27 provides a function to generate an image to be displayed in a display unit 32a and an image to be displayed in a display unit 32b, by compositing an image in a real space and an image in the virtual space, similarly to the first embodiment. Examples of the function provided by the image composite unit 27 include a function to determine front and rear relationship between the real body and the three-dimensional object, based on the distance to the real body measured by the function of the detection processing unit 25, and the distance from a view point to the three-dimensional object in the virtual space, and to adjust overlapping. In the third embodiment, the image composite unit 27 composites an image of the cube CB1 and an image of the real space. Further, the image composite unit 27 determines front and rear relationship between the hand of the user and the cube CB1, based on the distance to the hand of the user detected by the function of the detection processing unit 25, and the distance from a view point in the virtual space to the cube CB1, and adjusts overlapping.

In the third embodiment, the object data 24b is used for displaying the cube CB1 as the three-dimensional object, for example. In the third embodiment, information including a type, shape information, a color, the degree of transparency, and the like of the cube CB1 (worksheets that configure six faces of the cube) is stored in the object data 24b. The type indicates a physical property of the cube CB1 (worksheets that configure six faces of the cube). The type takes a value of a "rigid body", an "elastic body", or the like. The shape information is information indicating the shape of the cube CB1 (worksheets that configure six faces of the cube). The shape information is a collection of vertex coordinates of faces that configure the cube CB1 (worksheets that configure six faces of the cube). The color is a color of a surface of the cube CB1 (worksheets that configure six faces of the cube), or a configuration of colors. The degree of transparency is the degree at which the cube CB1 (worksheets that configure six faces of the cube) transmits light.

In the third embodiment, the acting data 24c is used to determine how to change the display style of the cube CB1 (worksheets that configure six faces of the cube) when the operation to the cube CB1 (worksheets that configure six faces of the cube) displayed as the three-dimensional object is detected. Examples of the change referred to here include disappearance, movement, rotation, deformation, and replacement of the cube CB1, disappearance, reproduction, enlargement, reduction, deformation, replacement of a cell on a worksheet that configures the six faces of the cube CB1, and disappearance, reproduction, enlargement, reduction, deformation, replacement and the like of a plurality of lattice-like cells of the worksheet arranged in a matrix manner. The replacement refers to replacement of one cube, cell, or sheet with another cube, cell or sheet.

In the third embodiment, the virtual space data 24d holds information related to a state of the cube CB1 (worksheets that configure six faces of the cube) displayed as the three-dimensional object. Examples of the state of the cube CB1 (worksheets that configure six faces of the cube) includes a position, an attitude, and a status of deformation.

The spreadsheet data 24e stores configuration information of the cube CB1 (worksheets that configure six faces of the cube), data held in the cube CB1 (worksheets that configure six faces of the cube), data related to various types of processings executed on the cube CB1 (worksheets that configure six faces of the cube) by the spreadsheet processing unit 28.

Hereinafter, various types of control based on functions provided by the control program 24a according to the third embodiment will be described. Examples of the various types of control based on functions provided by the control program 24a according to the third embodiment include control of processing related to spreadsheet determined by the rule according to operation detected with respect to the cube CB1 (worksheets that configure six faces of the cube), and control of processing to change the display style of the worksheet according to the operation detected with respect to the cube CB1 (worksheets that configure six faces of the cube).

Figure 62:
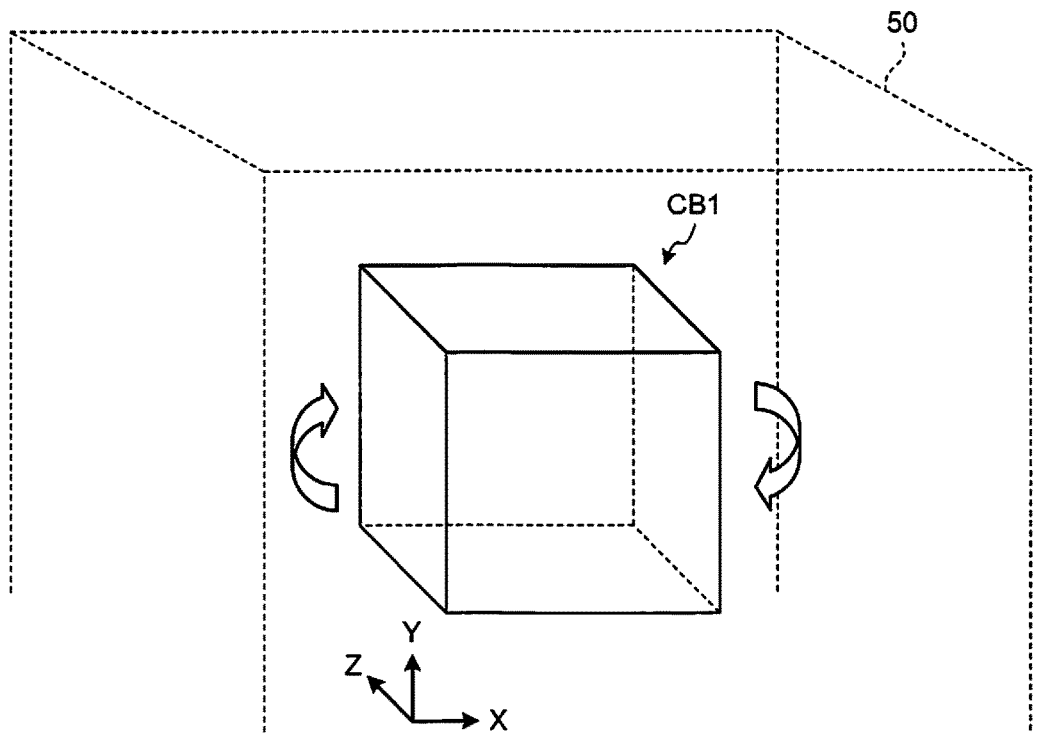
FIG. 62 is a diagram illustrating one of examples of operation performed with respect to the cube.
Figure 63:
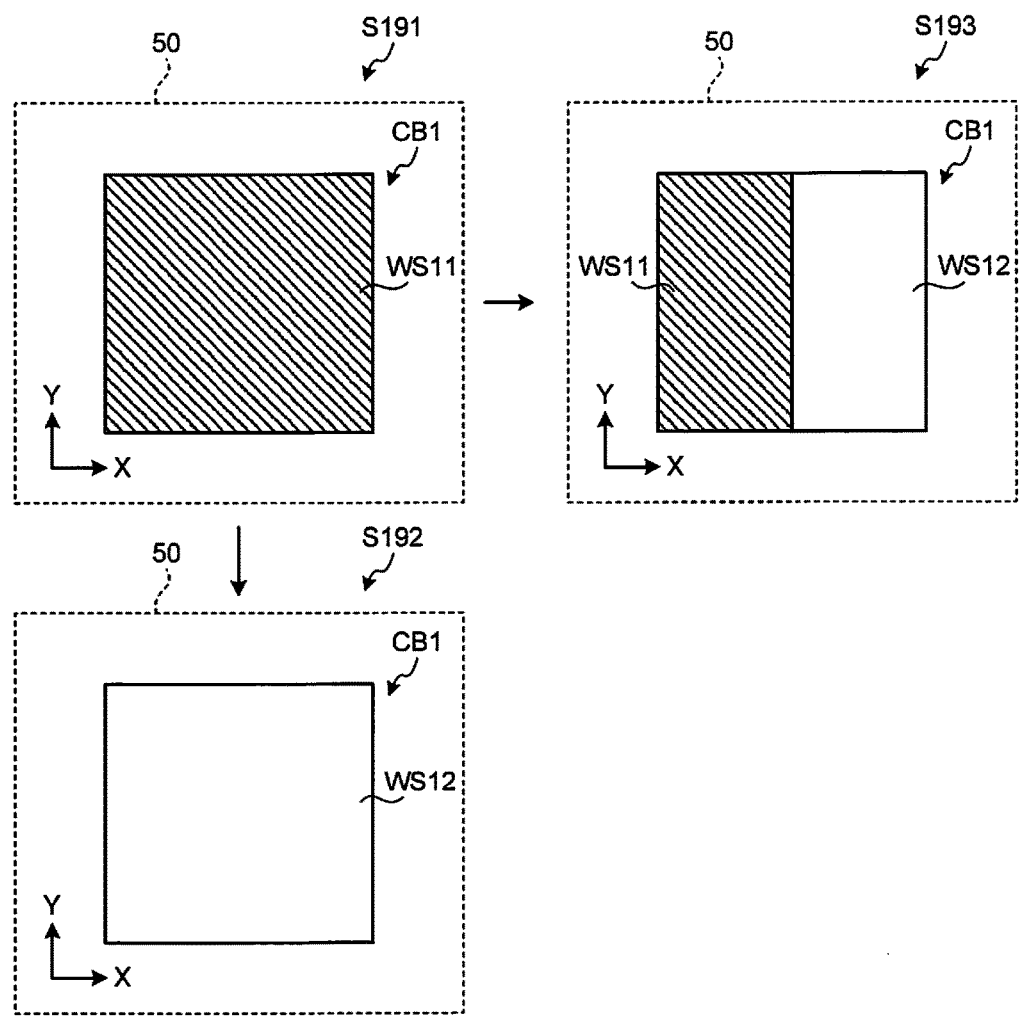
FIG. 63 is a diagram illustrating one of examples of a display style of the cube.

FIG. 62 is a diagram illustrating one of examples of operation performed with respect to the cube CB1. FIG. 63 is a diagram illustrating one of examples of the display style of the cube CB1.

For example, as illustrated in FIG. 62, when operation to rotate the cube CB1 around the Y axis is performed, the display device 1 changes a display face (worksheet) of the cube CB1, as illustrated in FIG. 63. For example, the display device 1 stores movement of the fingers of the user for rotating the cube CB1 around the Y axis in advance, and rotates the cube CB1 to change the display face (worksheet) of the cube CB1 according to the movement of the fingers of the user.

When operation to rotate the cube CB1 around the Y axis to the left by 90 degrees is performed in a state where the worksheet WS11 that configures one face of the cube CB1 is displayed to face the front of the user, as illustrated in Step S191 of FIG. 63, for example, the display device 1 displays the worksheet WS12 that configures another one face of the cube CB1 to face the front of the user, as illustrated in Step S192 of FIG. 63. When operation to rotate the cube CB1 around the Y axis to the left by 45 degrees is performed in a state where the worksheet WS11 that configures one face of the cube CB1 is displayed to face the front of the user, as illustrated in Step S191 of FIG. 63, for example, the display device 1 displays the worksheet WS11 that configures one face of the cube CB1 and the worksheet WS12 that configures another one face of the cube CB1 to face the front of the user half and half, as illustrated in Step S193 of FIG. 63.

In the case of Step S193 of FIG. 63, the display device 1 may switch processing of the worksheets WS11 and WS12 to be in an effective state, and record the fact of switching in the spreadsheet data 24e, although not especially described in the rules illustrated in FIG. 61.

Figure 64:
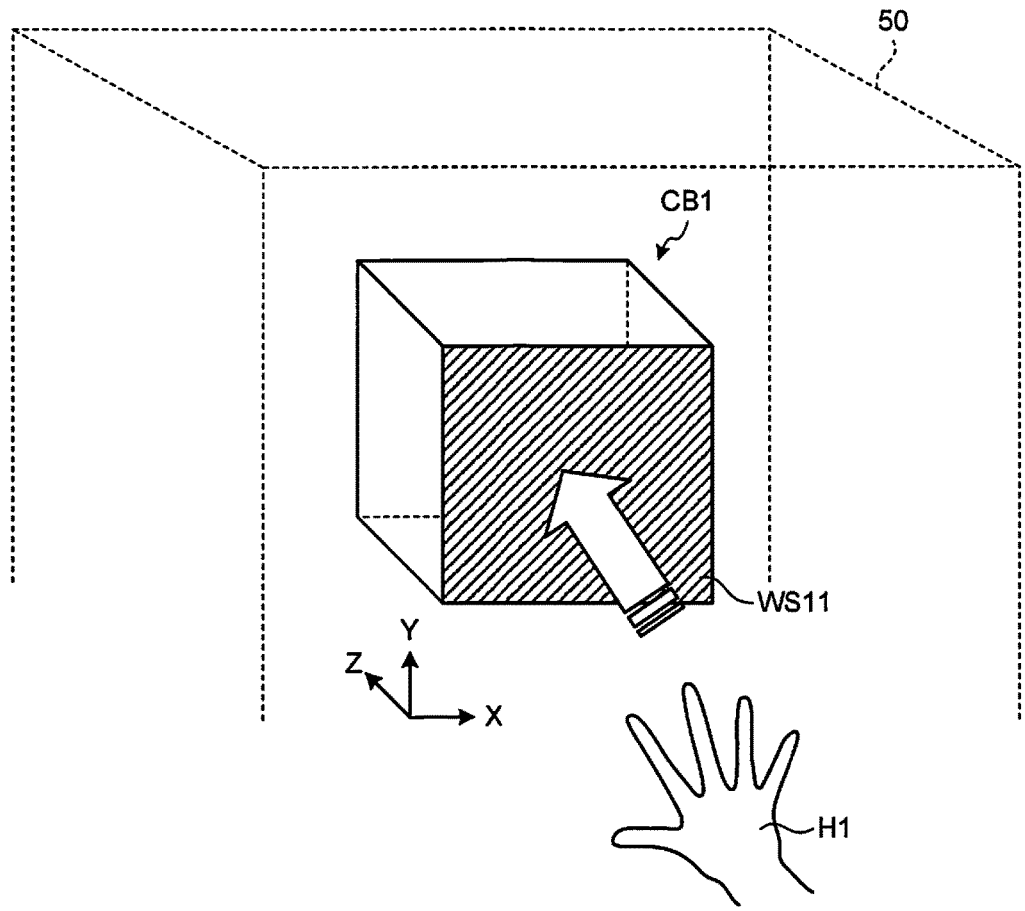
FIG. 64 is a diagram illustrating one of examples of operation performed with respect to the cube.
Figure 65:
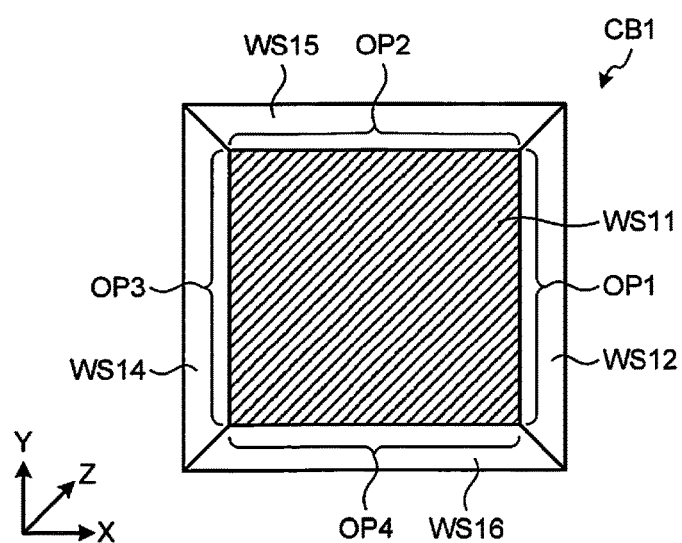
FIG. 65 is a diagram illustrating one of examples of a portion to which a processing related to spreadsheet is executed in the cube.

FIG. 64 is a diagram illustrating one of examples of operation performed with respect to the cube CB1. FIG. 65 is a diagram illustrating one of examples of a portion at which a processing related to spreadsheet is executed in the cube CB1. Description of FIGS. 64 and 65 will be given on the assumption that, in portions where worksheets that configure faces of the cube CB1 are in contact with each other with a right angle (portions where cells of different worksheets are adjacent to each other), formulas are defined such that calculation is performed by reference to data input in the cells arranged in the respective worksheets.

As illustrated in FIG. 64, when detecting operation to move the face configured from the worksheet WS11, of the faces that configure the cube CB1, in the Z-axis direction (+) with a palm of a hand H1 of the user, the display device 1 displays the operated face as if the face is moved in parallel without changing attitude, as illustrated in FIG. 64. The display device 1 moves the face configured from the worksheet WS11 according to a distance of the hand H1 of the user moved in the Z-axis direction (+).

At the same time, the display device 1 executes a processing related to spreadsheet, based on the rule No. 1 illustrated in FIG. 61. That is, the display device 1 determines a portion at which the worksheet WS11 and the worksheet WS12 form an angle (90 degrees), according to the operation detected by a detection unit (for example, the detection processing unit 25 and the display object control unit 26) with respect to the worksheet WS11 of the cube CB1. The display device 1 then executes a calculation processing that refers to data input in a cell arranged adjacent to the determined portion in the worksheet WS11 and data input in a cell arranged adjacent to the determined portion in the worksheet WS12. Similarly, the display device 1 determines a portion at which the worksheet WS11 and the worksheet WS15 form an angle (90 degrees). The display device 1 then executes a calculation processing that refers to data input in a cell arranged adjacent to the determined portion in the worksheet WS11 and data input in a cell arranged adjacent to the determined portion in the worksheet WS15. Similarly, the display device 1 determines a portion at which the worksheet WS11 and the worksheet WS14 form an angle (90 degrees). The display device 1 then executes a calculation processing that refers to data input in a cell arranged adjacent to the determined portion in the worksheet WS11 and data input in a cell arranged adjacent to the determined portion in the worksheet WS14. Similarly, the display device 1 determines a portion at which the worksheet WS11 and the worksheet WS16 form an angle (90 degrees). The display device 1 then executes a calculation processing that refers to data input in a cell arranged adjacent to the determined portion in the worksheet WS11 and data input in a cell arranged adjacent to the determined portion in the worksheet WS16.

With the operation illustrated in FIG. 64, as illustrated in FIG. 65, a portion OP1 where the face configured from the worksheet WS11 and the face configured from the worksheet WS12 intersect with each other, a portion OP2 where the face configured from the worksheet WS11 and the face configured from the worksheet WS15 intersect with each other, a portion OP3 where the face configured from the worksheet WS11 and the face configured from the worksheet WS14 intersect with each other, and a portion OP4 where the face configured from the worksheet WS11 and the face configured from the worksheet WS16 intersect with each other, of the faces that configure the cube CB1, are changed from the case illustrated in FIG. 64. Therefore, the display device 1 executes calculation again, and updates the calculation result stored in the spreadsheet data 24e.

Before the operation illustrated in FIG. 64 is performed, that is, even before the portions where the worksheet WS11 and the worksheets WS12, WS15, WS14, and WS16 intersect with each other are changed, the display device 1 can similarly execute the a calculation processing that refers to the adjacent cells between the worksheets.

Figure 66:
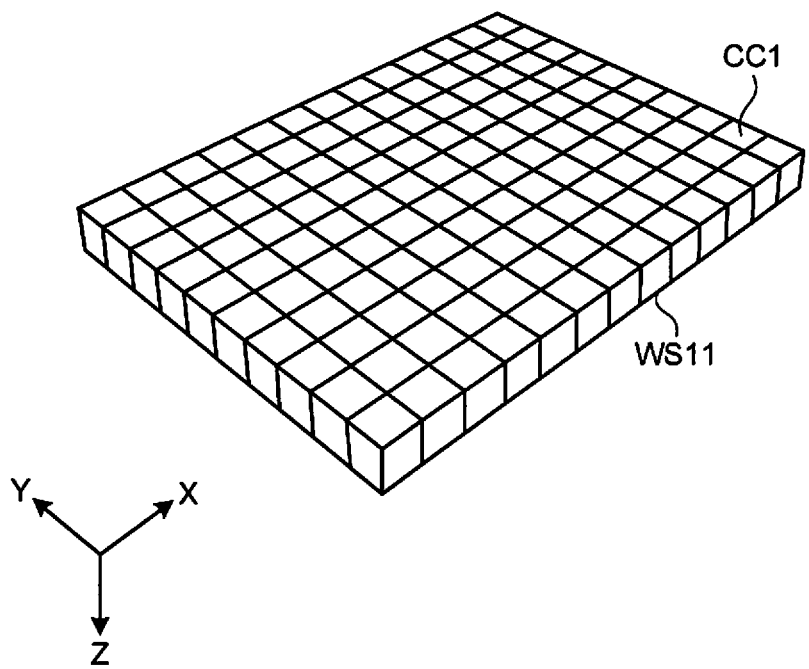
FIG. 66 is a diagram illustrating a configuration example of a worksheet.
Figure 67:
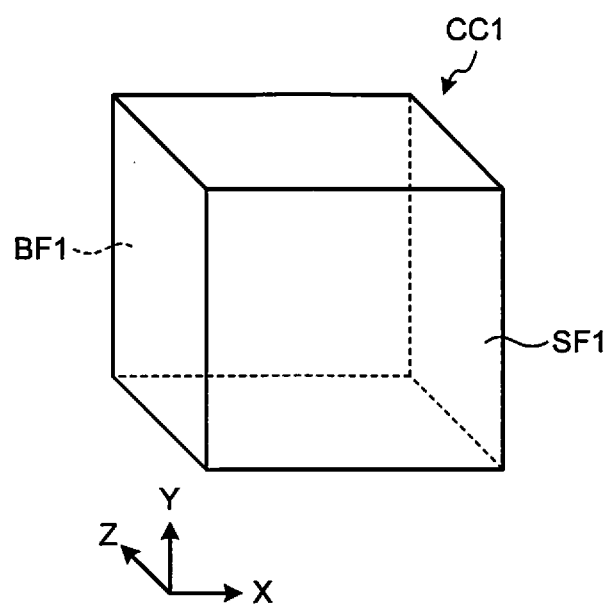
FIG. 67 is a diagram illustrating one of examples of a three-dimensional cell.

FIG. 66 is a diagram illustrating a configuration example of a worksheet. FIG. 67 is a diagram illustrating one of examples of a three-dimensional cell.

As illustrated in FIG. 66, each cell of the worksheet that configures each of the faces of the cube CB1 may be configured from a cubic object (hereinafter, described as cell cube). In the case illustrated in FIG. 66, in the worksheet WS11, a face SF1 facing the user side (see FIG. 67), and a face BF1 parallel to the face (see FIG. 67), of faces that configure a cell cube CC1, may be caused to be in a state in which a processing related to spreadsheet is effective. When displaying the face BF1, the display device 1 may display the face BF1 by performing transmission processing of the face SF1, or may display the face BF1 when the hand is entered into the cube CB1. The display device 1 may perform display as if the face SF1 and the face BF1 are switched when detecting operation to hold the cell cube CC1 and rotate the cell cube CC1 around the Y axis.

Figure 68:
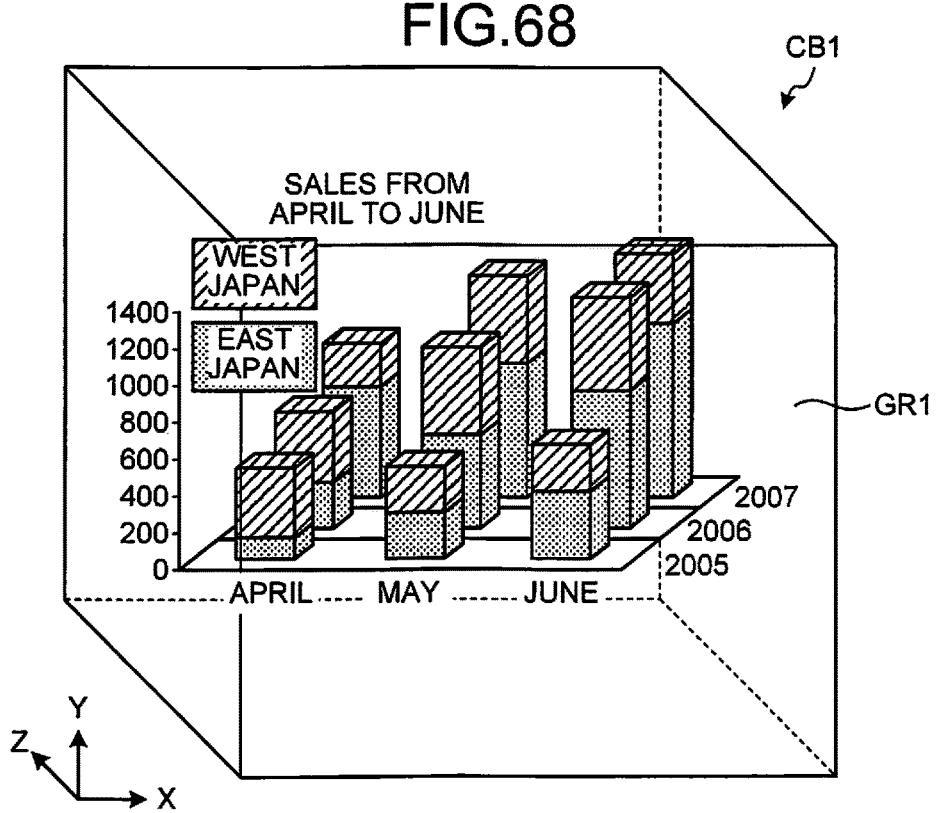
FIG. 68 is a diagram illustrating one of examples in which a graph is displayed in the cube.

FIG. 68 is a diagram illustrating one of examples in which a graph is displayed in the cube CB1. As illustrated in FIG. 68, the display device 1 may display a graph GR1 corresponding to a calculation result executed on the worksheet, inside the cube CB1. The display device 1 creates the graph displayed inside the cube CB1, based on data of the calculation result stored in the spreadsheet data 24e.

Figure 69:
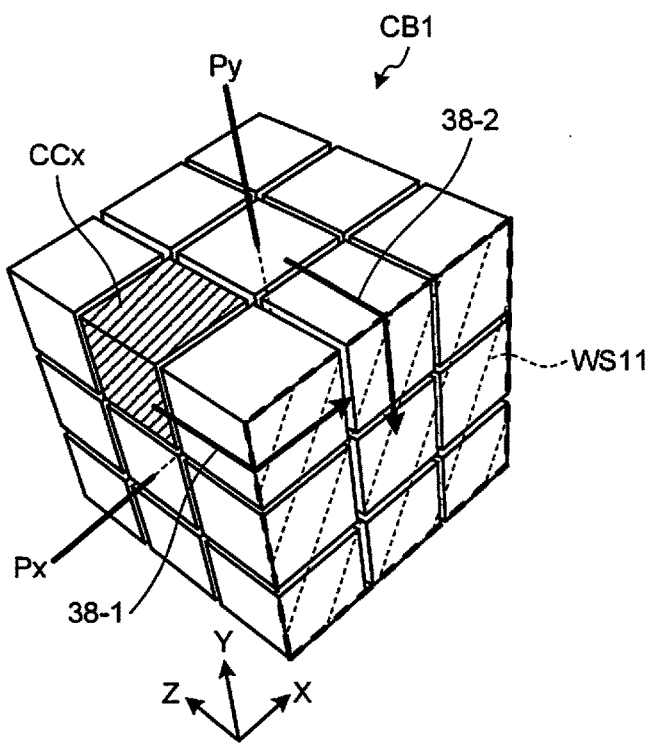
FIG. 69 is a diagram illustrating a concept of rotation of a column or a row of the cube.

FIG. 69 is a diagram illustrating a concept of rotation of a column or a row of the cube CB1. In FIG. 69, for description of the concept of rotation of a column or a row of the cube CB1, the number of cell cubes arranged in the worksheets that configure the faces of the cube CB1, and the number of columns and rows made by the cell cubes are simplified, and the cube configured from three columns x three rows is illustrated. For example, when detecting operation to rotate nine cell cubes including a cell cube CCx in a lump around a rotation axis Py (operation to rotate the nine cell cubes in the direction of the arrow 38-1), the display device 1 displays the nine cell cubes as if rotated in a lump of one row. Similarly, when detecting operation to rotate the nine cell cubes around a rotation axis Px (operation to rotate the nine cell cubes in the direction of the arrow 38-2), the display device 1 displays the nine cell cubes as if rotated in a lump of one column.

At this time, when the graph illustrated in FIG. 68 refers to the calculation result based on the cell data of the worksheet WS11 that configures one face of the cube CB1, the display device 1 updates the calculation result stored in the spreadsheet data 24e and the graph, based on the rule No. 2 illustrated in FIG. 61. The display device 1 reflects the update to the graph illustrated in FIG. 68.

Figure 70:
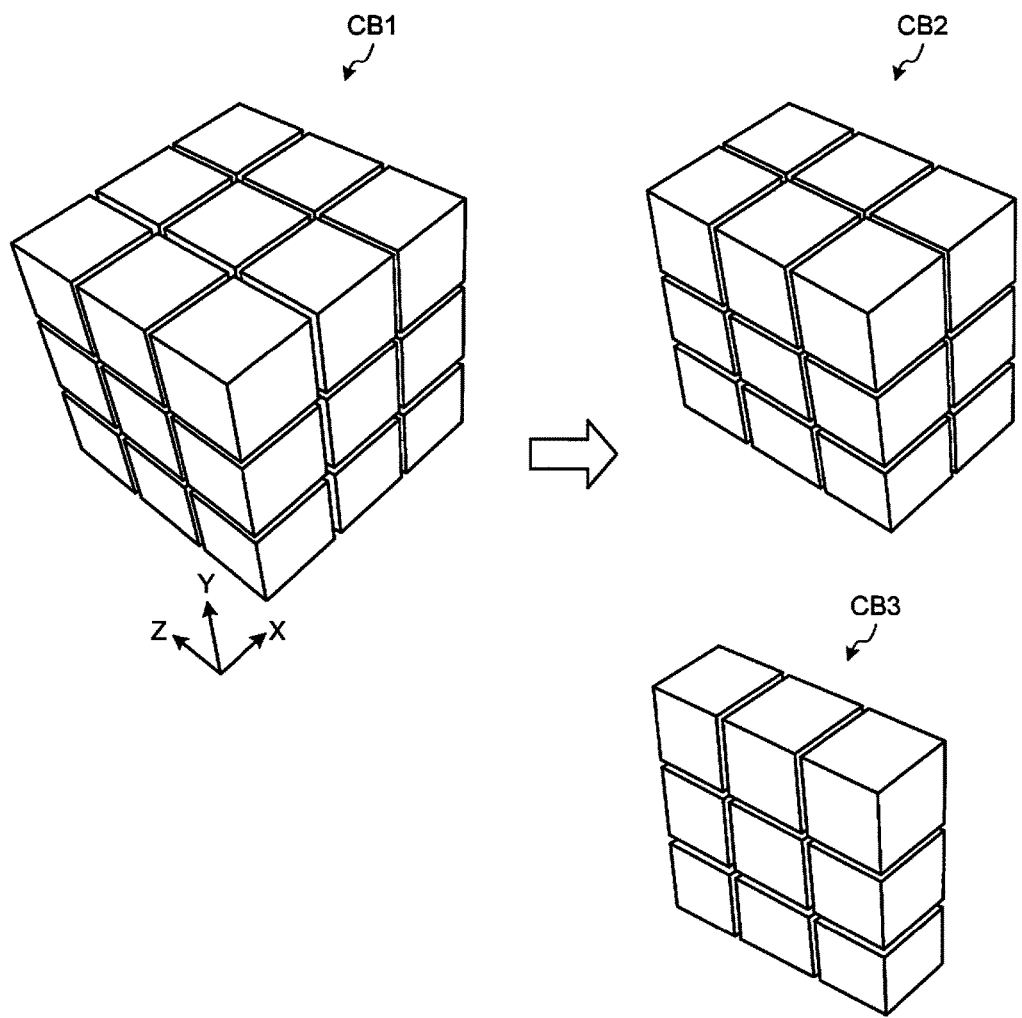
FIG. 70 is a diagram illustrating a concept of division of the cube.

FIG. 70 is a diagram illustrating a concept of division of the cube CB1. When detecting operation to break the cube CB1 with the hand, for example, the display device 1 may display the cube CB1 as if divided into a cube CB2 and a cube CB3, as illustrated in FIG. 70. For example, the display device 1 detects a portion inside the cube CB1 vertically cut in the Z-axis direction (+) by the palm of the hand H1 of the user moving in the Z-axis direction (+), and divides the cube CB1 from the portion. The operation for displaying the cube CB1 as if divided is not limited to the operation to break the cube CB1 with the hand, and arbitrary operation may be employed.

At the same time, the display device 1 updates the data stored in the spreadsheet data 24e, based on the rule No. 3 illustrated in FIG. 61. That is, the display device 1 updates configuration information (the number of worksheets, the number of cells included in the worksheets, the number of columns and rows, and the like) of the worksheets according to the division of the cube.

Figure 71:
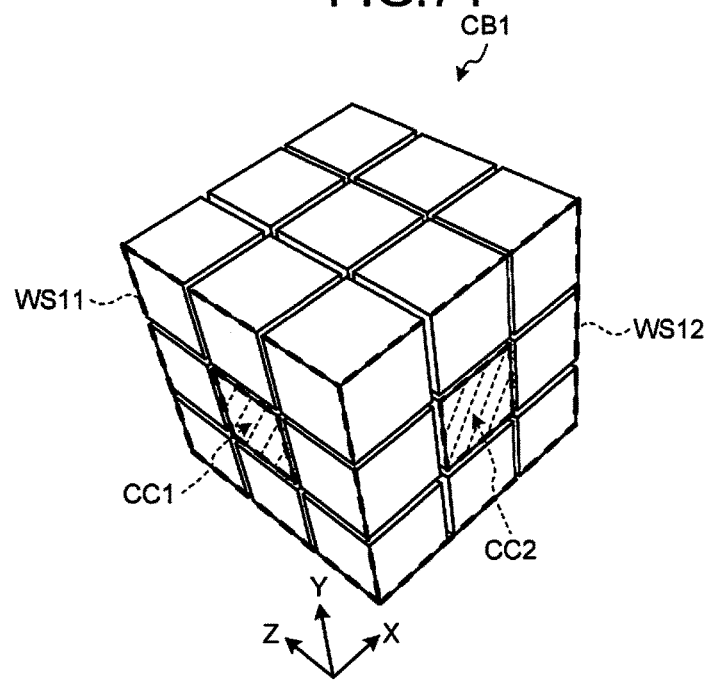
FIG. 71 is a diagram illustrating a concept of selection of cell cubes on the worksheet that configures the cube.

FIG. 71 is a diagram illustrating a concept of selection of cell cubes on the worksheet that configures the cube CB1. When the worksheet WS11 that configures one face of the cube CB1 and the worksheet WS12 that configures another one face of the cube CB1 are displayed to face the front of the user half and half (for example, see Step S193 of FIG. 63), the display device 1 enables selection of the cell cube CC1 of the worksheet WS11 and a cell cube CC2 of the worksheet WS12 at the same time.

Then, when detecting operation to hold and move the cell cube CC1 and the cell cube CC2 to collide with each other in the X-axis direction, for example, the display device 1 causes the both cell cubes to disappear at timing when the cell cube CC1 and the cell cube CC2 collide with each other. Then, the display device 1 displays a calculation result in a predetermined cell cube of the worksheet, in which calculation is defined in advance, at the timing when the cells disappear. The calculation of the cells is executed in parallel with control of display style of the cell cubes.

At the same time, the display device 1 updates the data stored in the spreadsheet data 24e, based on the rule No. 4 illustrated in FIG. 61. The display device 1 automatically replaces "cells" in the detected operation of the rule No. 4 illustrated in FIG. 61 with "cell cubes", to execute the processing. That is, the display device 1 multiplies numerical data of the cells, and updates the data with a result of the multiplication.

Figure 72:
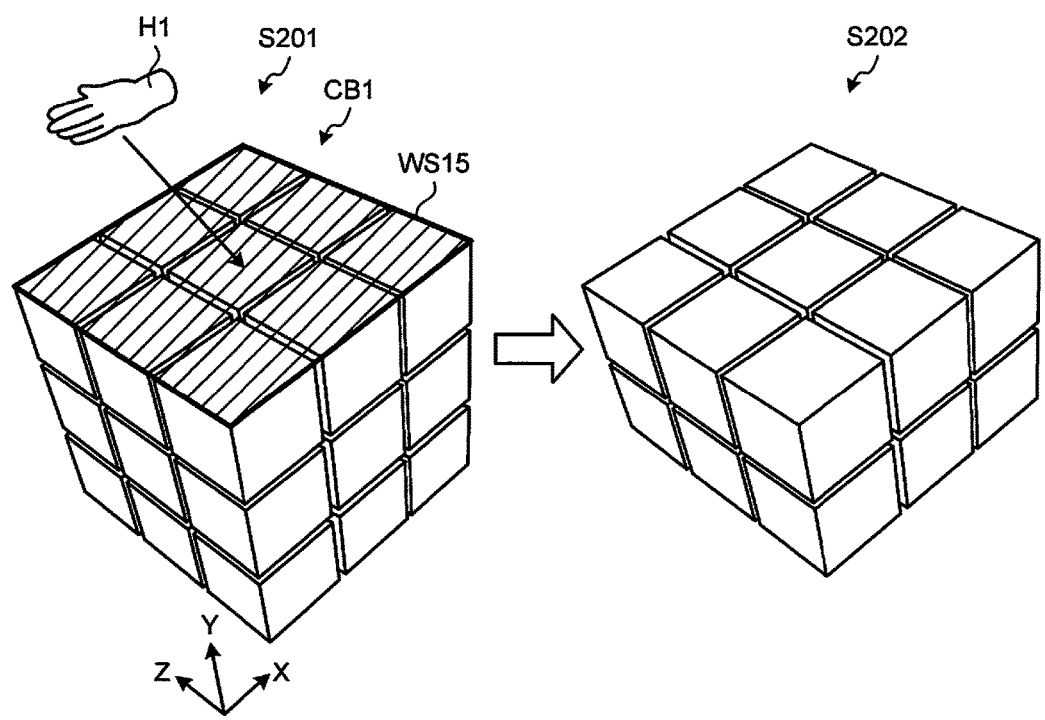
FIG. 72 is a diagram illustrating a concept of squashing the cube.

FIG. 72 is a diagram illustrating a concept of squashing the cube CB1. As illustrated in Step S201 of FIG. 72, when detecting operation to squash the cube CB1 from the side of the worksheet WS15 that configures one face of the cube CB1, in the Y-axis direction (−), the display device 1 causes nine cell cubes, which exist at a side opposite to the side where the squashing operation is performed, to disappear as if the cube CB1 is squashed, as illustrated in Step S202 of FIG. 72. The display device 1 may adjust the amount of cell cubes to disappear, according to a moving amount of the palm of the hand H1 of the user in the Y-axis direction (−).

At the same time, the display device 1 updates the data stored in the spreadsheet data 24e, based on the rule No. 6 illustrated in FIG. 61. That is, the display device 1 deletes the data of the worksheet corresponding to the cell cubes to disappear. In the example of FIG. 72, a part of the cell data of the worksheets WS11 to WS14, and the entire data of the worksheet WS16 are deleted.

Figure 73:
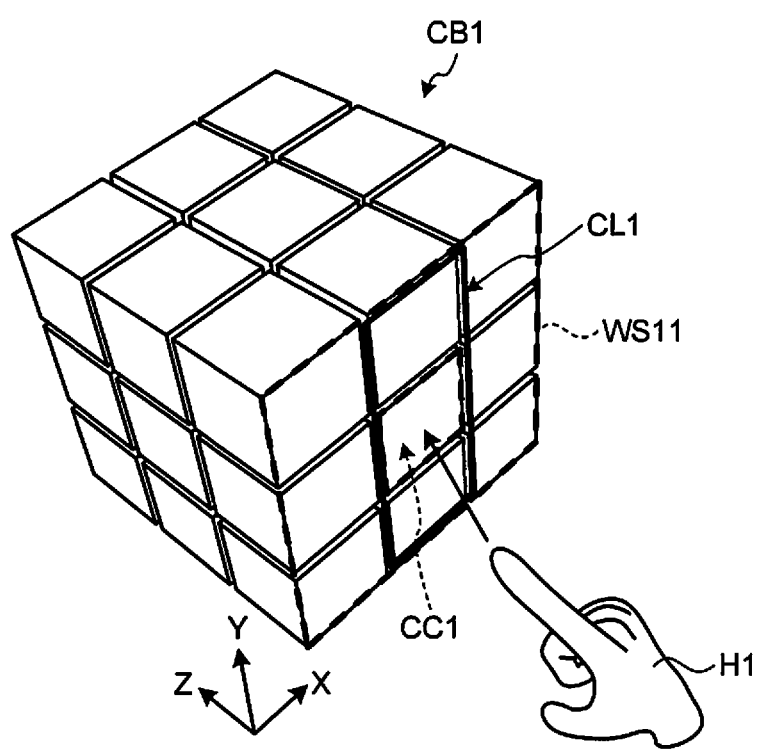
FIG. 73 is a diagram illustrating a concept of causing one column of the cube to disappear.

FIG. 73 is a diagram illustrating a concept of causing one column of the cube CB1 to disappear. As illustrated in FIG. 73, when detecting operation to push the cell cube CC1 of the worksheet WS11 that configures one face of the cube CB1, in the Z-axis direction (+), the display device 1 causes a column CL1 of the worksheet WS11 including the cell cube CC1 to disappear. For example, when a certain time or more has passed in a state where the hand H1 of the user is in contact with the cell cube CC1, the display device 1 determines that the cell cube CC1 is selected, and determines the column CL1 including the cell cube CC1 as an object to disappear. At this time, the display device 1 may distinguish whether causing the column itself to disappear, or whether deleting only data written in the cells that configure the column, according to the detected operation. The display device 1 may execute disappearance of a column, with respect to the worksheet WS11 only, so as not to have influence on other worksheets. In this case, the display device 1 automatically generates a new column as a substitute for the deleted column.

At the same time, the display device 1 updates the data stored in the spreadsheet data 24e, based on the rule No. 7 illustrated in FIG. 61. That is, the display device 1 deletes cells of the column or the row that includes the cell pushed by the hand H1 of the user.

Figure 74:
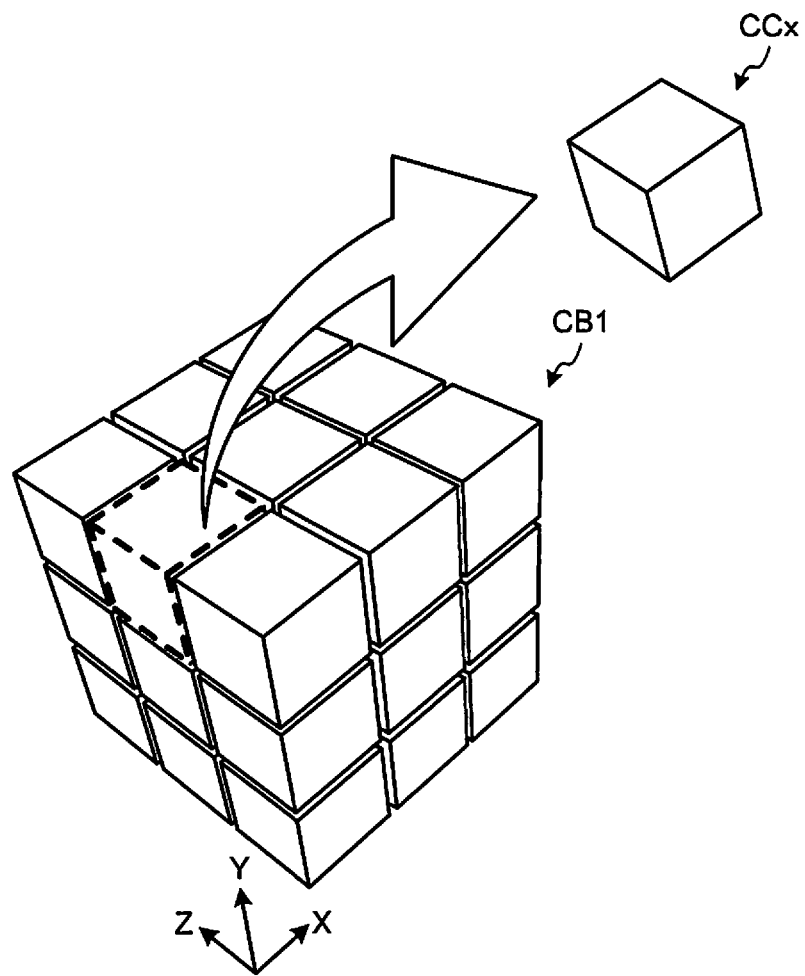
FIG. 74 is a diagram illustrating a concept of separation of a cell cube from the cube.

FIG. 74 is a diagram illustrating a concept of separation of a cell cube from the cube CB1. As illustrated in FIG. 74, when detecting operation to hold and pull a cell cube CCx included in the worksheet that configures one face of the cube CB1, the display device 1 displays the cell cube CCx as if separated from the cube CB1. Subsequently, when detecting operation to cause the cell cube CCx displayed as if separated to collide with another worksheet, for example, the display device 1 displays data of the cell cube CCx in the worksheet with which the cell cube CCx has collided, as if the data of the cell cube CCx is copied.

At the same time, the display device 1 updates the data stored in the spreadsheet data 24e, based on the rule No. 8 illustrated in FIG. 61. That is, the display device 1 updates the data of the worksheet from which the cell is separated, and the data of the worksheet with which the cell collides.

In addition to the above examples, when data written in a cell cannot be fully displayed in an area of the displayed cell, the display device 1 may scroll the data written in the cell according to operation to cause the finger of the user to slide on a surface of the cell.

The display device 1 may automatically adjust and display an up and down direction of data (characters, numerals, and the like) written in the worksheet positioned in front of the user, so as not to provide a feeling of strangeness to the user, even if the cube CB1 is rotated around an arbitrary axis according to the operation of the user.

FIG. 75 is a flowchart illustrating a processing procedure according to the third embodiment. The processing procedure illustrated in FIG. 75 is realized by the control unit 22 executing the control program 24*a*.

As illustrated in FIG. 75, at Step SK01, the control unit 22*c* displays the cube CB1 having the worksheets on the six faces in a composite manner.

Subsequently, at Step SK02, the control unit 22 determines whether operation to the worksheets has been detected. When the operation to the worksheets has been detected as a result of the determination (Yes at Step SK02), then at Step SK03, the control unit 22 executes processing according to the detected operation. For example, examples of the processing executed in Step SK03 include control of the processing related to spreadsheet determined by the rule according to the operation detected with respect to the cube CB1 (worksheets that configure six faces of the cube), and control of the processing of changing the display style of the worksheets according to the operation detected with respect to the cube CB1 (worksheets that configure six faces of the cube) (see FIGS. 62 to 74, and the like).

Subsequently, at Step SK04, the control unit 22 determines whether operation termination has been detected. The operation termination is detected when predetermined operation to an operating unit 13 is performed. When the operation termination has been detected (Yes at Step SK04), the control unit 22 terminates the processing procedure illustrated in FIG. 75. When the operation termination has not been detected (No at Step SK04), the control unit 22 re-executes Step SK02 and the subsequent steps.

When the operation to the worksheets has not been detected as a result of the determination at Step SK02 (No at Step SK02), the control unit 22 proceeds to the processing procedure of Step SK04.

The form of the present invention illustrated in the embodiments can be arbitrarily changed without departing from the gist of the present invention. Further, the embodiments can be appropriately combined. For example, the control program described in the embodiments may be divided into a plurality of modules, or may be integrated with another program.

In the embodiments, one of examples in which the user himself/herself operates the three-dimensional object has been described. However, the display device may detect movement of another person, an animal, a machine, or the like in the image range of the imaging units, as the real body. Further, the display device may share the virtual space with another device. That is, the display device may be configured such that a person other than the user of the display device can see and operate the three-dimensional object in the virtual space through another device.

In the embodiments, the operation to the three-dimensional object is detected by the display device by itself. However, the display device may detect the operation to the three-dimensional object in cooperation with a server. In this case, the display device sequentially transmits images captured by the imaging units or information detected by the detection units to the server, the server detects the operation, and notifies the display device of the detection result. With such a configuration, a load of the display device can be decreased.

The various types of control executed by the display device described in the embodiments can be executed also by mobile type devices such as a smart phone and a tablet.

The invention claimed is:

1. A display device, comprising:
a display unit configured to stereoscopically display a three-dimensional object for executing processings related to spreadsheet, by displaying images respectively corresponding to both eyes of a user by being worn;
a storage unit configured to store a rule in which a user's operation to the object and a processing included in the processings are associated with each other;
a sensor configured to detect the user's operation; and
a processor configured to determine the processing to be executed according to the operation detected by the sensor, based on the rule,
wherein:
the stereoscopically displayed three-dimensional object for performing the processings related to spreadsheet has a plurality of cells arranged along an X-axis, a Y-axis, and a Z-axis respectively, and each of the plurality of cells includes input data, and
the processor is configured to
cause the display unit to display an arrangement of the plurality of cells which extends on an XY-plane on a foremost front of the display unit,
in response to a detection of the user's operation on the stereoscopically displayed three-dimensional object, cause the stereoscopically displayed three-dimensional object to rotate about the X-axis, and
cause the display unit to display an arrangement of the plurality of cells which extends on an XZ-plane on the foremost of the front of the display unit,
stereoscopically display the three-dimensional object which includes a plurality of planar objects stacked on one top of another along the Z-axis, said plurality of planar objects including a first planar object and a second planar object placed below the first planar object in the Z-axis, and
stereoscopically display the second planar object by displaying a part of the first planar object as being transparent, in response to a detection, by the sensor, that a physical body is positioned between the first and second planar objects.

2. The display device according to claim 1, wherein
the display unit is configured to display the three-dimensional object which includes a plurality of planar objects, each of which extends on the XY-plane and is arranged along a depth in the Z-axis direction, and
the processor is configured to determine the processing to be simultaneously executed with respect to the plurality of planar objects according to the operation detected by the sensor, based on the rule.

3. The display device according to claim 2, wherein the processor is configured to execute a processing of simultaneously displaying data input in the cells arranged in a first planar object, and data input in the cells arranged in a second planar object, of the plurality of planar objects, according to the operation detected by the sensor.

4. The display device according to claim 1, wherein the processor is configured to cause the display unit to not display the first planar object in response to a detection, by the sensor, that a second physical body different from the first physical body passes through the first planar object.

5. The display device according to claim 1, wherein the sensor is configured to detect the user's operation including rotating the stereoscopically displayed three-dimensional object about the X-axis.

6. A control method executed by a display device including a display unit that stereoscopically displays an object for executing processings related to spreadsheet, by displaying images respectively corresponding to both eyes of a user by being worn, the method comprising:
- stereoscopically displaying a three-dimensional object by the display unit; detecting a user's operation to the object; and
- storing a rule in which the user's operation and a processing included in the processings are associated with each other; and
- determining the processing to be executed according to the detected operation, based on the rule, wherein
the stereoscopically displayed three-dimensional object for performing the processings related to spreadsheet has a plurality of cells arranged along an X-axis, a Y-axis, and a Z-axis respectively, and each of the plurality of cells includes input data,
the control method further comprising:
- causing the display unit to display an arrangement of the plurality of cells which extends on an XY-plane on a foremost front of the display unit,
- in response to a detection of the user's operation on the stereoscopically displayed three-dimensional object, causing the stereoscopically displayed three-dimensional object to rotate about the X-axis, and
- causing the display unit to display an arrangement of the plurality of cells which extends on an XZ-plane is displayed on the foremost front of the display unit,
- stereoscopically displaying the three-dimensional object which includes a plurality of planar objects stacked on one too of another along the Z-axis, said plurality of planar objects including a first planar object and a second planar object placed below the first planar object in the Z-axis, and
- stereoscopically displaying the second planar object by displaying a part of the first planar object as being transparent, in response to a detection, by the sensor, that a physical body is positioned between the first and second planar objects.

7. A display device, comprising:
- a display unit configured to stereoscopically display a three-dimensional object for executing processings related to spreadsheet, by displaying images respectively corresponding to both eyes of a user by being worn;
- a storage unit configured to store a rule in which a user's operation to the object and a processing included in the processings are associated with each other;
- a sensor which is provided in a server configured to detect the operation; and
- a processor configured to determine the processing to be executed according to the operation detected by the sensor, based on the rule, wherein
the stereoscopically displayed three-dimensional object for performing the processings related to spreadsheet has a plurality of cells arranged along an X-axis, a Y-axis, and a Z-axis respectively, wherein each of the plurality of cells includes input data, and
the processor is configured to
- cause the display unit to display an arrangement of the plurality of cells which extends on an XY-plane on a foremost front of the display unit,
- in response to a detection of the user's operation on the stereoscopically displayed three-dimensional object, cause the stereoscopically displayed three-dimensional object to rotate about the X-axis, and
- cause the display unit to display an arrangement of the plurality of cells which extends on an XZ-plane is displayed on the foremost front of the display unit,
stereoscopically display the three-dimensional object which includes a plurality of planar objects stacked on one too of another along the Z-axis, said plurality of planar objects including a first planar object and a second planar object placed below the first planar object in the Z-axis, and
stereoscopically display the second planar object by displaying a part of the first planar object as being transparent, in response to a detection, by the sensor, that a physical body is positioned between the first and second planar objects.

* * * * *